United States Patent
Bailor et al.

(10) Patent No.: US 9,760,862 B2
(45) Date of Patent: Sep. 12, 2017

(54) CONFLICT RESOLUTION

(75) Inventors: Jonathan Beckett Bailor, Bellevue, WA (US); Ethan Joseph Bernstein, Mercer Island, WA (US); Kelly Michael Krout, Redmond, WA (US); Matthew Eric Mizulo, Kirkland, WA (US); Jonathan Ian Gordner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1112 days.

(21) Appl. No.: 13/544,310

(22) Filed: Jul. 9, 2012

(65) Prior Publication Data

US 2013/0013997 A1 Jan. 10, 2013

Related U.S. Application Data

(63) Continuation of application No. 12/111,174, filed on Apr. 28, 2008, now Pat. No. 8,352,870.

(51) Int. Cl.
*G06Q 10/10* (2012.01)
*G06F 17/30* (2006.01)

(52) U.S. Cl.
CPC ....... *G06Q 10/10* (2013.01); *G06F 17/30873* (2013.01)

(58) Field of Classification Search
CPC . G06F 17/2211; G06Q 10/101; G06Q 10/103
See application file for complete search history.

(56) References Cited

U.S. PATENT DOCUMENTS

| | | |
|---|---|---|
| 4,855,580 A | 8/1989 | Van Maanen, Jr. |
| 5,107,443 A | 4/1992 | Smith |
| 5,142,619 A | 8/1992 | Webster, III |
| 5,313,394 A | 5/1994 | Clapp |
| 5,339,389 A | 8/1994 | Bates |
| 5,446,842 A | 8/1995 | Schaeffer |

(Continued)

FOREIGN PATENT DOCUMENTS

| | | |
|---|---|---|
| CN | 1276568 A | 12/2000 |
| CN | 1489075 A | 4/2004 |

(Continued)

OTHER PUBLICATIONS

Antonovich, Michael, "Office and SharePoint 2007 User's Guide: Integrating SharePoint with Excel, Outlook, and Word," Feb. 2009, Apress, Section 6.5.*

(Continued)

*Primary Examiner* — Alvin Tan
(74) *Attorney, Agent, or Firm* — Merchant & Gould

(57) ABSTRACT

Embodiments of a collaborative authoring environment enable a user to resolve editing conflicts arising when synchronizing a user copy of a data file with a master copy of the data file. Content updates may be synchronized separately from metadata updates. Metadata updates may be synchronized automatically, whereas content updates may be synchronized only when any identified editing conflicts are resolved. When an editing conflict is identified, the user interface of the authoring application may be configured to toggle between displaying and hiding the identified editing conflicts.

20 Claims, 29 Drawing Sheets

(56) References Cited

U.S. PATENT DOCUMENTS

| | | |
|---|---|---|
| 5,486,686 A | 1/1996 | Zdybel |
| 5,535,332 A | 7/1996 | Ishida |
| 5,568,640 A | 10/1996 | Nishiyama |
| 5,623,659 A | 4/1997 | Shi et al. |
| 5,630,138 A | 5/1997 | Raman |
| 5,664,186 A | 9/1997 | Bennett |
| 5,671,428 A | 9/1997 | Muranaga |
| 5,692,178 A | 11/1997 | Shaughnessy |
| 5,729,734 A | 3/1998 | Parker |
| 5,751,958 A | 5/1998 | Zweben |
| 5,758,079 A | 5/1998 | Ludwig et al. |
| 5,781,732 A | 7/1998 | Adams |
| 5,781,908 A | 7/1998 | Williams |
| 5,787,262 A | 7/1998 | Shakib |
| 5,835,950 A | 11/1998 | Cho et al. |
| 5,893,126 A | 4/1999 | Drews et al. |
| 5,920,694 A | 7/1999 | Carleton et al. |
| 5,963,931 A | 10/1999 | Fagg |
| 5,966,512 A | 10/1999 | Bates et al. |
| 5,999,208 A | 12/1999 | McNerney et al. |
| 6,000,945 A | 12/1999 | Sanchez-Lazer |
| 6,006,239 A | 12/1999 | Bhansali |
| 6,026,461 A | 2/2000 | Baxter et al. |
| 6,049,334 A | 4/2000 | Bates et al. |
| 6,055,546 A | 4/2000 | Pongracz |
| 6,065,026 A | 5/2000 | Cornelia |
| 6,067,551 A | 5/2000 | Brown |
| 6,073,161 A | 6/2000 | DeBoskey |
| 6,088,702 A | 7/2000 | Plantz |
| 6,175,853 B1 | 1/2001 | Stracke, Jr. |
| 6,202,085 B1 | 3/2001 | Benson |
| 6,209,010 B1 | 3/2001 | Gauthier |
| 6,209,128 B1 | 3/2001 | Gerard |
| 6,240,414 B1 | 5/2001 | Beizer |
| 6,244,575 B1 | 6/2001 | Vaartstra et al. |
| 6,275,935 B1 | 8/2001 | Barlow |
| 6,317,777 B1 | 11/2001 | Skarbo |
| 6,324,544 B1 | 11/2001 | Alam et al. |
| 6,327,584 B1 | 12/2001 | Xian |
| 6,327,611 B1 | 12/2001 | Everingham |
| 6,341,291 B1 | 1/2002 | Bentley |
| 6,342,906 B1 | 1/2002 | Kumar |
| 6,351,271 B1 | 2/2002 | Mainwaring et al. |
| 6,363,352 B1 | 3/2002 | Dailey |
| 6,411,965 B2 | 6/2002 | Klug |
| 6,430,576 B1 | 8/2002 | Gates et al. |
| 6,437,778 B1 | 8/2002 | Matsui et al. |
| 6,438,548 B1 | 8/2002 | Grim, III |
| 6,438,563 B1 | 8/2002 | Kawagoe |
| 6,438,564 B1 | 8/2002 | Morton et al. |
| 6,446,093 B2 | 9/2002 | Tabuchi |
| 6,502,113 B1 | 12/2002 | Crawford et al. |
| 6,507,865 B1 | 1/2003 | Hanson et al. |
| 6,526,434 B1 | 2/2003 | Carlson et al. |
| 6,529,905 B1 | 3/2003 | Corsberg et al. |
| 6,560,614 B1 | 5/2003 | Barboy |
| 6,560,620 B1 | 5/2003 | Ching |
| 6,564,246 B1 | 5/2003 | Varma et al. |
| 6,574,377 B1 | 6/2003 | Cahill |
| 6,587,870 B2 | 7/2003 | Takagi et al. |
| 6,594,664 B1 | 7/2003 | Estrada et al. |
| 6,610,104 B1 | 8/2003 | Lin |
| 6,629,129 B1 | 9/2003 | Bookspan et al. |
| 6,662,209 B2 | 12/2003 | Potts, Jr. |
| 6,678,882 B1 | 1/2004 | Hurley et al. |
| 6,681,371 B1 | 1/2004 | Devanbu |
| 6,681,382 B1 | 1/2004 | Kakumani |
| 6,687,878 B1 | 2/2004 | Eintracht |
| 6,711,718 B2 | 3/2004 | Pfeil |
| 6,751,618 B1 | 6/2004 | Germscheid |
| 6,757,678 B2 | 6/2004 | Myllymaki |
| 6,757,696 B2 | 6/2004 | Multer et al. |
| 6,757,767 B1 | 6/2004 | Kelleher |
| 6,757,871 B1 | 6/2004 | Sato |
| 6,760,840 B1 | 7/2004 | Shimbo |
| 6,772,165 B2 | 8/2004 | O'Carroll |
| 6,842,768 B1 | 1/2005 | Shaffer et al. |
| 6,854,087 B1 | 2/2005 | Takeo |
| 6,925,476 B1 | 8/2005 | Multer |
| 6,976,213 B1 | 12/2005 | Letourneau et al. |
| 6,983,416 B1 | 1/2006 | Bae |
| 6,993,522 B2 | 1/2006 | Chen et al. |
| 7,007,235 B1 | 2/2006 | Hussein |
| 7,024,429 B2 | 4/2006 | Ngo et al. |
| 7,024,430 B1 | 4/2006 | Ingraham et al. |
| 7,035,839 B2 | 4/2006 | Gillespie |
| 7,039,679 B2 | 5/2006 | Mendez |
| 7,047,407 B2 | 5/2006 | Itoh et al. |
| 7,053,839 B2 | 5/2006 | Cassel et al. |
| 7,058,663 B2 | 6/2006 | Johnston |
| 7,065,633 B1 | 6/2006 | Yates et al. |
| 7,069,505 B2 | 6/2006 | Tamano |
| 7,086,005 B1 | 8/2006 | Matsuda |
| 7,089,278 B1 | 8/2006 | Churchill et al. |
| 7,099,919 B2 | 8/2006 | Kusumoto et al. |
| 7,110,936 B2 | 9/2006 | Hiew |
| 7,111,237 B2 | 9/2006 | Chan |
| 7,117,278 B2 | 10/2006 | Avery |
| 7,124,151 B1 | 10/2006 | Choi |
| 7,124,164 B1 | 10/2006 | Chemtob |
| 7,124,362 B2 | 10/2006 | Tischer |
| 7,127,501 B1 | 10/2006 | Beir |
| 7,149,776 B1 | 12/2006 | Roy |
| 7,155,465 B2 | 12/2006 | Lee et al. |
| 7,185,277 B1 | 2/2007 | Bernstein |
| 7,200,668 B2 | 4/2007 | Mak |
| 7,203,708 B2 | 4/2007 | Liu et al. |
| 7,209,948 B2 | 4/2007 | Srinivasa |
| 7,225,189 B1 | 5/2007 | McCormack |
| 7,237,006 B1 | 6/2007 | Prell |
| 7,240,091 B1 | 7/2007 | Hopmann et al. |
| 7,242,389 B1 | 7/2007 | Stern |
| 7,249,314 B2 | 7/2007 | Walker |
| 7,293,049 B2 | 11/2007 | Kadyk et al. |
| 7,310,657 B2 | 12/2007 | Nakamura |
| 7,315,978 B2 | 1/2008 | Giles et al. |
| 7,328,243 B2 | 2/2008 | Yeager |
| 7,346,705 B2 | 3/2008 | Hullot et al. |
| 7,356,393 B1 | 4/2008 | Schlatre et al. |
| 7,401,291 B2 | 7/2008 | Ramaley |
| 7,478,129 B1 | 1/2009 | Chemtob |
| 7,487,471 B2 | 2/2009 | Wu |
| 7,496,577 B2 | 2/2009 | Williamson |
| 7,529,780 B1 | 5/2009 | Braginsky et al. |
| 7,536,641 B2 | 5/2009 | Rosenstein et al. |
| 7,565,603 B1 | 7/2009 | Jones et al. |
| 7,577,906 B2 | 8/2009 | Friedrichowitz |
| 7,594,163 B2 | 9/2009 | Slack-Smith |
| 7,603,357 B1 | 10/2009 | Gourdol |
| 7,610,287 B1 | 10/2009 | Dean et al. |
| 7,647,292 B2 | 1/2010 | Hayashi |
| 7,650,336 B1 | 1/2010 | Herrmann |
| 7,664,750 B2 | 2/2010 | Frees |
| 7,694,217 B2 | 4/2010 | Croft |
| 7,698,660 B2 | 4/2010 | Sanchez et al. |
| 7,714,222 B2 | 5/2010 | Taub |
| 7,761,784 B2 | 7/2010 | Parks |
| 7,769,810 B1 | 8/2010 | Kaufman |
| 7,779,347 B2 | 8/2010 | Christiansen et al. |
| 7,788,326 B2 | 8/2010 | Buchheit et al. |
| 7,792,788 B2 | 9/2010 | Melmon |
| 7,797,274 B2 | 9/2010 | Strathearn et al. |
| 7,801,951 B2 | 9/2010 | Fishkin et al. |
| 7,818,678 B2 | 10/2010 | Massand |
| 7,831,679 B2 | 11/2010 | Apacible et al. |
| 7,839,532 B2 | 11/2010 | Brawn |
| 7,912,811 B2 | 3/2011 | Hodel-Widmer |
| 7,933,952 B2 | 4/2011 | Parker et al. |
| 7,941,399 B2 | 5/2011 | Bailor |
| 7,949,633 B1 | 5/2011 | Shaver et al. |
| 7,962,853 B2 | 6/2011 | Bedi et al. |
| 7,966,556 B1 | 6/2011 | Bourdev |
| 8,019,780 B1 | 9/2011 | Pinkerton et al. |
| 8,028,229 B2 | 9/2011 | Bailor et al. |

(56) References Cited

U.S. PATENT DOCUMENTS

| | | |
|---|---|---|
| 8,082,277 B1 | 12/2011 | O'Brien et al. |
| 8,122,341 B1 | 2/2012 | Dayan et al. |
| 8,352,870 B2 | 1/2013 | Bailor et al. |
| 8,453,052 B1 | 5/2013 | Newman et al. |
| 9,071,615 B2 | 6/2015 | Sanchez et al. |
| 2001/0018697 A1 | 8/2001 | Kunitake |
| 2001/0042075 A1 | 11/2001 | Tabuchi |
| 2002/0007287 A1 | 1/2002 | Straube |
| 2002/0022122 A1 | 2/2002 | Hirata |
| 2002/0059325 A1 | 5/2002 | Beizer et al. |
| 2002/0065848 A1 | 5/2002 | Walker |
| 2002/0069192 A1 | 6/2002 | Aegerter |
| 2002/0083183 A1 | 6/2002 | Pujare et al. |
| 2002/0188598 A1 | 12/2002 | Myllymaki |
| 2003/0028600 A1 | 2/2003 | Parker |
| 2003/0093760 A1 | 5/2003 | Suzuki |
| 2003/0097410 A1 | 5/2003 | Atkins |
| 2003/0097638 A1 | 5/2003 | Tamano |
| 2003/0105979 A1 | 6/2003 | Itoh et al. |
| 2003/0115481 A1 | 6/2003 | Baird |
| 2003/0140067 A1 | 7/2003 | Sesek et al. |
| 2003/0159105 A1 | 8/2003 | Hiebert |
| 2003/0167281 A1 | 9/2003 | Cohen et al. |
| 2003/0172113 A1 | 9/2003 | Cameron |
| 2003/0172168 A1 | 9/2003 | Mak et al. |
| 2003/0208534 A1 | 11/2003 | Carmichael |
| 2004/0003090 A1 | 1/2004 | Deeds |
| 2004/0039829 A1 | 2/2004 | Bucher |
| 2004/0068505 A1 | 4/2004 | Lee |
| 2004/0085354 A1 | 5/2004 | Massand |
| 2004/0107224 A1 | 6/2004 | Bera |
| 2004/0122870 A1 | 6/2004 | Park et al. |
| 2004/0122898 A1 | 6/2004 | Srinivasa |
| 2004/0122912 A1 | 6/2004 | Kim et al. |
| 2004/0133858 A1 | 7/2004 | Barnett |
| 2004/0143630 A1 | 7/2004 | Kaufmann et al. |
| 2004/0161150 A1 | 8/2004 | Cukierman et al. |
| 2004/0172395 A1 | 9/2004 | Edelstein |
| 2004/0177343 A1 | 9/2004 | McVoy et al. |
| 2004/0199550 A1 | 10/2004 | Ito |
| 2004/0205539 A1 | 10/2004 | Mak |
| 2004/0205653 A1 | 10/2004 | Hadfield |
| 2004/0225715 A1 | 11/2004 | Gottfried |
| 2004/0230903 A1 | 11/2004 | Elza |
| 2004/0237033 A1 | 11/2004 | Woolf et al. |
| 2004/0239700 A1 | 12/2004 | Baschy |
| 2004/0243644 A1 | 12/2004 | Steere et al. |
| 2004/0250201 A1 | 12/2004 | Caspi |
| 2005/0004985 A1 | 1/2005 | Stochosky |
| 2005/0004990 A1 | 1/2005 | Durazo |
| 2005/0022122 A1 | 1/2005 | Barrus et al. |
| 2005/0033811 A1 | 2/2005 | Bhogal et al. |
| 2005/0033813 A1 | 2/2005 | Bhogal et al. |
| 2005/0039116 A1 | 2/2005 | Slack-Smith |
| 2005/0044492 A1 | 2/2005 | Ramaley et al. |
| 2005/0064858 A1 | 3/2005 | Makela et al. |
| 2005/0071386 A1 | 3/2005 | Wolfgang et al. |
| 2005/0083907 A1 | 4/2005 | Fishler |
| 2005/0097440 A1 | 5/2005 | Lusk |
| 2005/0132288 A1 | 6/2005 | Kirn et al. |
| 2005/0138110 A1 | 6/2005 | Redlich et al. |
| 2005/0177617 A1 | 8/2005 | Banginwar et al. |
| 2005/0198132 A1 | 9/2005 | Vellante et al. |
| 2005/0198385 A1 | 9/2005 | Aust et al. |
| 2005/0203962 A1 | 9/2005 | Zhou et al. |
| 2005/0210392 A1 | 9/2005 | Koide |
| 2005/0216524 A1 | 9/2005 | Gomes et al. |
| 2005/0223012 A1 | 10/2005 | Ohkohchi |
| 2005/0223066 A1 | 10/2005 | Buchheit et al. |
| 2005/0234943 A1 | 10/2005 | Clarke |
| 2005/0240858 A1 | 10/2005 | Croft |
| 2005/0251738 A1 | 11/2005 | Hirano et al. |
| 2005/0256907 A1 | 11/2005 | Novik et al. |
| 2005/0262203 A1 | 11/2005 | Buchheit et al. |
| 2005/0289512 A1 | 12/2005 | Matsusaka |
| 2006/0010240 A1 | 1/2006 | Chuah |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0026502 A1 | 2/2006 | Dutta |
| 2006/0031264 A1 | 2/2006 | Bosworth et al. |
| 2006/0041579 A1 | 2/2006 | Miyashita et al. |
| 2006/0041596 A1 | 2/2006 | Stirbu et al. |
| 2006/0047656 A1 | 3/2006 | Dehlinger et al. |
| 2006/0053194 A1 | 3/2006 | Schneider |
| 2006/0053195 A1 | 3/2006 | Schneider |
| 2006/0053380 A1 | 3/2006 | Spataro et al. |
| 2006/0080432 A1 | 4/2006 | Spataro |
| 2006/0085402 A1 | 4/2006 | Brown |
| 2006/0095514 A1 | 5/2006 | Wang et al. |
| 2006/0101328 A1 | 5/2006 | Albornoz |
| 2006/0106879 A1 | 5/2006 | Zondervan et al. |
| 2006/0112343 A1 | 5/2006 | Ducheneaut et al. |
| 2006/0123010 A1 | 6/2006 | Landry et al. |
| 2006/0123033 A1 | 6/2006 | Livshits |
| 2006/0136511 A1 | 6/2006 | Ngo et al. |
| 2006/0136809 A1 | 6/2006 | Fernstrom |
| 2006/0174207 A1 | 8/2006 | Deshpande |
| 2006/0200755 A1 | 9/2006 | Melmon |
| 2006/0218476 A1 | 9/2006 | Gombert |
| 2006/0242549 A1 | 10/2006 | Schwier |
| 2006/0248038 A1 | 11/2006 | Kaplan |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0050720 A1 | 3/2007 | Sharp et al. |
| 2007/0055926 A1 | 3/2007 | Christiansen et al. |
| 2007/0066293 A1 | 3/2007 | Peng |
| 2007/0073809 A1 | 3/2007 | Sangem et al. |
| 2007/0118598 A1 | 5/2007 | Bedi |
| 2007/0118794 A1 | 5/2007 | Hollander et al. |
| 2007/0130334 A1 | 6/2007 | Carley |
| 2007/0136662 A1 | 6/2007 | Khaba |
| 2007/0156672 A1 | 7/2007 | Wolff et al. |
| 2007/0186157 A1 | 8/2007 | Walker |
| 2007/0186171 A1 | 8/2007 | Junuzovic |
| 2007/0198952 A1 | 8/2007 | Pittenger |
| 2007/0203917 A1 | 8/2007 | Du |
| 2007/0226320 A1 | 9/2007 | Hager |
| 2007/0226604 A1 | 9/2007 | Chalasani |
| 2007/0271502 A1 | 11/2007 | Bedi |
| 2007/0283321 A1 | 12/2007 | Hegde |
| 2008/0028300 A1 | 1/2008 | Krieger |
| 2008/0052634 A1 | 2/2008 | Fishkin et al. |
| 2008/0059187 A1 | 3/2008 | Roitblat et al. |
| 2008/0059539 A1 | 3/2008 | Chin |
| 2008/0072141 A1 | 3/2008 | Hodel-Widmer |
| 2008/0086718 A1 | 4/2008 | Bostic |
| 2008/0097993 A1 | 4/2008 | Nanba |
| 2008/0098294 A1 | 4/2008 | Le |
| 2008/0114740 A1 | 5/2008 | Vergottini |
| 2008/0114884 A1 | 5/2008 | Hewes et al. |
| 2008/0126953 A1 | 5/2008 | Davidson et al. |
| 2008/0147590 A1 | 6/2008 | Bechtel |
| 2008/0177782 A1 | 7/2008 | Poston |
| 2008/0180740 A1 | 7/2008 | Kimura et al. |
| 2008/0195800 A1 | 8/2008 | Lee |
| 2008/0222159 A1 | 9/2008 | Aranha et al. |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1 | 11/2008 | Bodner |
| 2008/0320384 A1 | 12/2008 | Nagarajan |
| 2009/0006936 A1 | 1/2009 | Parker |
| 2009/0006946 A1 | 1/2009 | Hanson |
| 2009/0006948 A1 | 1/2009 | Parker |
| 2009/0063489 A1 | 3/2009 | Neumann |
| 2009/0094231 A1 | 4/2009 | Marvit et al. |
| 2009/0094242 A1 | 4/2009 | Lo et al. |
| 2009/0125518 A1 | 5/2009 | Bailor et al. |
| 2009/0150761 A1 | 6/2009 | Sawicki et al. |
| 2009/0157811 A1 | 6/2009 | Bailor et al. |

(56) References Cited

U.S. PATENT DOCUMENTS

| | | |
|---|---|---|
| 2009/0171987 A1 | 7/2009 | Coppinger et al. |
| 2009/0193331 A1 | 7/2009 | Croft |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0254572 A1 | 10/2009 | Redlich et al. |
| 2009/0271696 A1 | 10/2009 | Bailor et al. |
| 2009/0282041 A1 | 11/2009 | Skaria et al. |
| 2009/0282462 A1 | 11/2009 | Skaria |
| 2009/0327294 A1 | 12/2009 | Bailor |
| 2010/0023562 A1 | 1/2010 | Kreuch et al. |
| 2010/0070464 A1 | 3/2010 | Aymeloglu et al. |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0153857 A1 | 6/2010 | Sanchez et al. |
| 2010/0169092 A1 | 7/2010 | Backes et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2011/0209052 A1 | 8/2011 | Parker et al. |
| 2012/0254315 A1 | 10/2012 | Skaria et al. |
| 2012/0278276 A1 | 11/2012 | Bailor et al. |
| 2013/0151466 A1 | 6/2013 | Skaria et al. |
| 2013/0297559 A1 | 11/2013 | Bailor et al. |
| 2014/0373108 A1 | 12/2014 | Bailor et al. |
| 2015/0067467 A1 | 3/2015 | Bailor et al. |
| 2015/0212996 A1 | 7/2015 | Plante et al. |
| 2015/0256574 A1 | 9/2015 | Sanchez et al. |

FOREIGN PATENT DOCUMENTS

| | | |
|---|---|---|
| CN | 1804836 | 7/2006 |
| CN | 1971553 A | 5/2007 |
| CN | 101042702 A | 9/2007 |
| DE | 19844071 A1 | 4/1999 |
| EP | 1132847 A2 | 9/2001 |
| EP | 1290575 B1 | 6/2005 |
| EP | 1657649 A2 | 5/2006 |
| EP | 1681652 A2 | 7/2006 |
| EP | 1681652 A3 | 7/2006 |
| JP | 01113849 A | 5/1989 |
| JP | 07085020 A | 3/1995 |
| JP | 11161535 A | 6/1999 |
| JP | 2000076109 A | 3/2000 |
| JP | 2000259623 A | 9/2000 |
| JP | 2001-265704 A | 9/2001 |
| JP | 2001290690 A | 10/2001 |
| JP | 2002288029 A | 10/2002 |
| JP | 2003233520 A | 8/2003 |
| JP | 200478535 A | 3/2004 |
| JP | 2004065193 A | 3/2004 |
| JP | 2004265193 A | 9/2004 |
| JP | 2004326176 A | 11/2004 |
| JP | 2005074724 A | 3/2005 |
| JP | 2005267021 A | 9/2005 |
| JP | 2005301838 A | 10/2005 |
| JP | 2005310158 A | 11/2005 |
| JP | 2006195972 A | 7/2006 |
| JP | 2006236350 A | 9/2006 |
| JP | 2007115131 A | 5/2007 |
| JP | 2007-518146 A | 7/2007 |
| JP | 2007518330 A | 7/2007 |
| JP | 2007257629 A | 10/2007 |
| JP | 2008210192 A | 9/2008 |
| JP | 2009009410 A | 1/2009 |
| KR | 10-0331685 B1 | 4/2002 |
| KR | 1020060026409 A | 3/2006 |
| KR | 1020060034786 A | 4/2006 |
| KR | 10-2006-0047218 A | 5/2006 |
| KR | 1020070023640 A | 2/2007 |
| KR | 1020080014747 A | 2/2008 |
| RU | 2250492 C2 | 4/2005 |
| RU | 2272316 C2 | 4/2005 |
| RU | 50695 U1 | 1/2006 |
| RU | 2005135951 A | 5/2007 |
| RU | 2304803 C2 | 8/2007 |
| RU | 2327206 C1 | 6/2008 |
| RU | 2344468 C2 | 1/2009 |
| RU | 2359321 C2 | 6/2009 |
| TW | 200424868 A | 11/2004 |
| TW | 1248002 | 1/2006 |
| TW | 200627221 A | 8/2006 |
| TW | 200627259 A | 8/2006 |
| TW | 200627274 | 8/2006 |
| TW | I276325 B | 3/2007 |
| TW | 200817998 A | 4/2008 |
| TW | 200910880 A | 3/2009 |
| WO | WO 01/25986 | 4/2001 |
| WO | WO 01/33362 A1 | 5/2001 |
| WO | WO 01/88750 | 11/2001 |
| WO | WO 02/033575 | 4/2002 |
| WO | 03058374 A2 | 7/2003 |
| WO | WO 2005/114467 A2 | 12/2005 |
| WO | WO 2007/034858 A1 | 3/2007 |
| WO | 2007064480 A1 | 6/2007 |
| WO | WO 2007/062949 | 6/2007 |
| WO | 2008/063833 A1 | 5/2008 |
| WO | 2009005922 A1 | 1/2009 |
| WO | WO 2009/061638 | 5/2009 |
| WO | WO 2009/076010 | 6/2009 |
| WO | WO 2009/079116 | 6/2009 |
| WO | WO 2009/134548 | 11/2009 |
| WO | 2009158172 A2 | 12/2009 |
| WO | WO 2009/154842 | 12/2009 |
| WO | WO 2009/158108 | 12/2009 |

OTHER PUBLICATIONS

U.S. Appl. No. 12/276,874, Office Action mailed Sep. 10, 2013, 24 pgs.
Japanese Notice of Rejection in Application 2010-533160, mailed Aug. 20, 2013, 4 pgs.
U.S. Appl. No. 12/117,025, Notice of Allowance mailed Nov. 22, 2013, 13 pgs.
Japanese Final Rejection in Application 2010-536967, mailed Oct. 9, 2013, 6 pgs.
Chinese Decision on Rejection in Application 200980147769.3, mailed Nov. 7, 2013, 9 pgs.
Chinese Notice of Allowance in Application 201080019470.2, mailed Aug. 7, 2013, 4 pgs.
U.S. Appl. No. 12/117,025, Notice of Allowance mailed Jan. 8, 2014, 11 pgs.
Chinese Notice of Allowance in Application 2008801212195.0, mailed Sep. 5, 2013, 4 pgs.
Chinese Notice of Allowance in Application 200980116872.1, mailed Dec. 26, 2013, 4 pgs.
Chinese Notice of Allowance in Application 200980124935.8, mailed Nov. 11, 2013, 4 pgs.
U.S. Appl. No. 13/539,473, Notice of Allowance mailed Sep. 4, 2014, 8 pgs.
U.S. Appl. No. 13/760,224, Amendment and Response filed Sep. 8, 2014, 11 pgs.
U.S. Appl. No. 13/539,473, Supplemental Notice of Allowance mailed Sep. 30, 2014, 2 pgs.
U.S. Appl. No. 12/276,874, Amendment and Response filed Sep. 30, 2014, 12 pgs.
Taiwanese Notice of Allowance in Application 97144208, mailed Sep. 5, 2014, 4 pgs.
Australian Notice of Allowance in Application 2009241535, mailed Aug. 7, 2014, 2 pgs.
U.S. Appl. No. 13/495,659, Amendment and Response filed Oct. 9, 2014, 8 pgs.
Taiwanese Office Action and Search Report in Application 98139984, mailed Sep. 16, 2014, 12 pages.
U.S. Appl. No. 13/539,473, Notice of Allowance mailed Nov. 14, 2014, 8 pgs.
U.S. Appl. No. 13/539,473, Amendment filed Nov. 24, 2014, 8 pgs.

(56) References Cited

OTHER PUBLICATIONS

U.S. Appl. No. 13/495,659, Office Action mailed Nov. 20, 2014, 7 pgs.
Preston, Jon A, et al., "An efficient synchronous collaborative editing system deploying dynamic locking of varying granularity in generalized document trees", Nov. 17-20, 2006, pp. 1-10.
U.S. Appl. No. 13/760,224, Notice of Allowance mailed Dec. 8, 2014, 11 pgs.
U.S. Appl. No. 12/276,874, Office Action mailed Dec. 4, 2014, 26 pgs.
Taiwanese Notice of Allowance in Application 98139984, mailed Jan. 27, 2015, 4 pgs.
Korean Notice of Final Rejection in Application 10-2015-7002346, mailed Aug. 19, 2015, 18 pgs.
Taiwanese Search Report in application 103135218, mailed Aug. 26, 2015, 1 page.
Israel Office Action in Patent Application 212007, Mailed Date: Mar. 31, 2015, 3 Pages.
Canadian Office Action in Application 2718106, mailed Sep. 14, 2015, 6 pgs.
Korean Notice of Preliminary Rejection in Application 10-2015-7019793, mailed Sep. 11, 2015, 11 pgs. (with English translation).
Malaysian Adverse Report in Application PI 2010001575, mailed Jul. 31, 2015, 3 pgs.
Malaysian Adverse Report in Application PI 2010001887, mailed Jul. 31, 2015, 3 pgs.
Malaysian Adverse Report in Application PI 2010002084, mailed Jul. 31, 2015, 3 pgs.
Canadian Office Action in Application 2724679, mailed Oct. 14, 2015, 3 pgs.
Korean Office Action in Application 10-2015-7019912, mailed Sep. 11, 2015, 6 pgs.
U.S. Appl. No. 14/534,384, Amendment and Response filed Sep. 21, 2015, 12 pgs.
U.S. Appl. No. 14/474,481, Amendment and Response filed Oct. 8, 2015, 16 pgs.
U.S. Appl. No. 13/859,631, Amendment and Response filed Oct. 29, 2015, 15 pgs.
"Search Report Issued in European Patent Application No. 097706436", Mailed Date: Mar. 16, 2015, 6 Pages.
"First Office Action Issued in Malaysian Patent Application No. PI 2010004653", Mailed Date: Jan. 30, 2015, 3 Pages.
Israeli Office Action in Application 212007, mailed Jan. 31, 2015, 6 pgs. (partially in English).
"Office Action Issued in Korean Patent Application No. 10-2010-7012783", Mailed Date: Feb. 5, 2015, 4 Pages. (W/O English Translation).
European Communication in Application 09770643.6, mailed Apr. 2, 2015, 1 page.
Malaysian Adverse Report in Application PI 2010005579, mailed Mar. 31, 2015, 3 pgs.
Korean Office Action in Application 10-2015-7002346, mailed Mar. 31, 2015, 7 pgs.
U.S. Appl. No. 13/859,631, Office Action mailed Apr. 29, 2015, 110 pgs.
European Decision to Refuse and a Copy of the Minutes of the Oral Hearing in EP Application 09739350.8, mailed Dec. 4, 2013, 36 pgs.
Japanese Notice of Allowance in Application 2011-507506, mailed Nov. 20, 2013, 4 pgs.
Japanese Notice of Allowance in Application 2011-508530, mailed Nov. 29, 2013, 4 pgs.
U.S. Appl. No. 12/117,025, Notice of Allowance mailed Feb. 20, 2014, 10 pgs.
Japanese Notice of Allowance in Application 2010-533160, mailed Jan. 14, 2014, 4 pgs.
European Notice of Appeal in Application 09739350.8, filed Feb. 14, 2014, 2 pgs.
Japanese Notice of Allowance in Application 2010536967, mailed Mar. 5, 2014, 4 pgs.
Australian First Office Action in Application 2009241535, mailed Mar. 13, 2014, 4 pgs.
Australian First Office Action in Application 2009262859, mailed Mar. 7, 2014, 3 pgs.
Australian First Office Action in Application 2009318022, mailed Mar. 11, 2014, 3 pgs.
U.S. Appl. No. 11/957,010, Notice of Allowance mailed Mar. 12, 2014, 9 pgs.
U.S. Appl. No. 12/117,025, Notice of Allowance mailed Apr. 14, 2014, 11 pgs.
Taiwanese Search Report in Application 097144208, mailed Feb. 8, 2014, 13 pgs.
European Submission of Grounds of Appeal in Application 09739350.8, filed Apr. 14, 2014, 4 pgs.
Taiwanese Search Report in Application 098117528, mailed Mar. 20, 2014, 10 pgs.
Australian Office Action in Application 2010241814, mailed Apr. 11, 2014, 4 pgs.
U.S. Appl. No. 12/276,874, Office Action mailed May 30, 2014, 25 pgs.
Taiwanese Search Report in Application 097139413, mailed Mar. 17, 2014, 13 pgs.
Australian Notice of Acceptance in Application 2009262859, mailed May 1, 2014, 2 pgs.
Japanese Final Rejection in Application 2012-508556, mailed May 7, 2014, 6 pgs.
Russian Notice of Allowance in Application 2011143794, mailed Apr. 11, 2014, 21 pgs.
U.S. Appl. No. 11/957,010, Notice of Allowance mailed Jun. 10, 2014, 6 pgs.
U.S. Appl. No. 13/760,224, Office Action mailed Jun. 6, 2014, 14 pgs.
Australian Notice of Acceptance in Application 2010241814, mailed May 21, 2014, 2 pgs.
U.S. Appl. No. 13/539,473, Notice of Allowance mailed Jul. 9, 2014, 9 pgs.
U.S. Appl. No. 13/495,659, Office Action mailed Jul. 9, 2014, 8 pgs.
Taiwanese Notice of Allowance in Application 097139413, mailed Jun. 27, 2014, 4 pgs.
European Extended Search Report in Application 10770166.6, mailed Jun. 30, 2014, 7 pgs.
Taiwanese Notice of Allowance in Application 98117528, mailed Jul. 7, 2014, 4 pgs.
Australian Second Office Action in Application 2009241535, mailed May 16, 2014, 4 pgs.
Israeli Office Action in Application 2043295, mailed Dec. 25, 2013, 8 pgs.
Japanese Notice of Allowance in Application 2011516385, mailed Feb. 13, 2014, 7 pgs.
Australian Notice of Allowance in Application 2009318022, mailed Jun. 5, 2014, 2 pgs.
European Office Action Communication, in Application EP 10770166.6, mailed Jul. 17, 2014, 1 page.
Venolia, G. D. et al., "Understanding Sequence and Reply Relationships within Email Conversations: A Mixed-Model Visualization", abbreviated paper submitted to CHI 2--3, 2003, 4 pgs.
Canadian Office Action in Application 2720732, mailed Jun. 5, 2015, 6 pgs.
Korean Notice of Preliminary Rejection in Application 10-2010-7029113, mailed May 21, 2015, 5 pgs. (with English translation).
Korean Notice of Preliminary Rejection in Application 10-2011-7011228, mailed May 21, 2015, 15 pgs. (with English translation).
U.S. Appl. No. 14/534,384, Office Action mailed Jun. 19, 2015, 20 pgs.
"ACE (editor)", Wikipedia, Mar. 1, 2006, obtained online at https://en.wikipedia.org/wiki/ACE_(editor) on Jun. 23, 2015, 4 pgs.
"Gobby", Wikipedia, Aug. 24, 2014, obtained online at: https://en.wikipedia.org/wiki/Gobby on Jun. 19, 2015, 2 pgs.
"CoWord", Wikipedia, May 15, 2007, obtained online at: https://en.wikipedia.org/wiki/CoWord on Jun. 19, 2015, 2 pgs.
U.S. Appl. No. 14/474,481, Office Action mailed Jul. 8, 2015, 26 pgs.

(56) References Cited

OTHER PUBLICATIONS

U.S. Appl. No. 13/495,659, Office Action mailed Jun. 29, 2015, 9 pgs.
Korean Final Rejection in Application 1020107012220, mailed Jun. 30, 2015, 4 pgs.
Japanese Appeal Decision to Grant Patent in Application 2012-508556, mailed Jul. 10, 2015, 4 pgs.
U.S. Appl. No. 13/539,473, USPTO Response after Amendment after Allowance mailed Dec. 10, 2014, 2 pgs.
Korean Office Action in Application 10-2010-700797, mailed Nov. 28, 2014, 5 pgs.
Korean Office Action in Application 10-2010-7012220, mailed Nov. 28, 2014, 7 pgs.
"How to Track and Manage Changes in a Word 2002 and a Word 2003 Document," Microsoft Corporation, Mar. 8, 2007, 4 pages.
"Track Changes in Word 2007 Tutorial," Florida Gulf Coast University, copyright 2007, 2 pages.
Grover, Chris, "Word 2007: The Missing Manual," O'Reilly Media, Inc., copyright 2007, 11 pages.
Jalbert, Peter, "Real Time Collaboration with Google Docs and Spreadsheets," Jan. 23, 2008, 5 pages.
Murray et al., "Compare and combine documents in Word 2007," Microsoft Corporation, copyright 2012, 5 pages.
Tyson, Herb, "Microsoft Project 2000 Bible," Wiley Publishing, Inc., copyright 2007, 4 pages.
Willden, Andrew, "Track Changes in Word 2007," Fall 2007, 2 pages.
U.S. Appl. No. 11/957,010, Office Action mailed Aug. 12, 2013, 28 pgs.
U.S. Appl. No. 12/117,025, Office Action mailed Jul. 23, 2013, 12 pgs.
Russian Notice of Allowance in Application 2010118615, mailed Jul. 1, 2013, 6 pgs.
European Oral Hearing Summons in Application 09739350.8, mailed Jun. 27, 2013, 6 pgs.
Russian Notice of Allowance in Application 2010145165, mailed Jun. 20, 2013, 6 pgs.
Japanese Notice of Rejection in Application 2011516385, mailed Jul. 9, 2013, 6 pgs.
Notice of Allowance mailed Aug. 20, 2012, in co-pending U.S. Appl. No. 12/117,040, 14 pgs.
Notice of Allowance mailed Aug. 29, 2012, in co-pending U.S. Appl. No. 12/111,174, 27 pgs.
Office Action mailed Sep. 27, 2012, in co-pending U.S. Appl. No. 12/276,874, 22 pgs.
Notice of Allowance mailed Oct. 22, 2012, in co-pending U.S. Appl. No. 13/079,605, 9 pgs.
Office Action mailed Oct. 11, 2012, in co-pending U.S. Appl. No. 13/539,473, 23 pgs.
Office Action mailed Oct. 31, 2012, in co-pending U.S. Appl. No. 12/117,025, 11 pgs.
Notice of Allowance mailed Aug. 6, 2012, in co-pending U.S. Appl. No. 12/432,817, 5 pgs.
Australian Office Action in Application 2008324973, mailed Jul. 4, 2012, 3 pgs.
Chinese 1st Office Action in Application 201080019470.2, mailed Aug. 31, 2012, 8 pgs.
Australian Notice of Acceptance in Application 2008324973, mailed Aug. 22, 2012. 3 pgs.
Chinese 3rd Office Action in Application 200880115943.1, mailed Aug. 30, 2012, 6 pgs.
Taiwanese Notice of Allowance in Application 97142418, mailed Aug. 16, 2012, 4 pgs.
Australian Office Action in Application 2008335565, mailed Aug. 30, 2001, 3 pgs.
Chinese 2nd Office Action in Application 200880119647.9, mailed Aug. 13, 2012, 6 pgs.
Chinese 2nd Office Action in Application 200880121295.0, mailed Oct. 23, 2012, 10pgs.
Chinese 1st Office Action in Application 200980116872.1, mailed Oct. 9, 2012, 14 pgs.
Australian Notice of Allowance in Application 2008335565, mailed Sep. 18, 2012, 3 pgs.
Notice of Allowance mailed Jun. 21, 2012, U.S. Appl. No. 12/044,744, 8 pgs.
Notice of Allowance mailed Jun. 28, 2012, in co-pending U.S. Appl. No. 13/079,605, 9 pgs.
Notice of Allowance mailed Jun. 21, 2012, in co-pending U.S. Appl. No. 12/117,040, 9 pgs.
"Codeville," http://codeville.org/, Date Retrieved Oct. 9, 2007, 2 pgs.
"File Locks-GNU Emacs Lisp Reference Manual"; www.gnu.org/software/emacs/elisp/html_node/File-Locks.html; Mar. 28, 2006; 2 pages.
"Google, Google Docs & Spreadsheets Tour" downloaded from http://www.google.com/google-d-s/intl/en/tour2.html on Nov. 9, 2007, 1 page.
"Status of Software Reuse 577," http://www.plex86.org/Computer_Folklore/Status-of-Software-Reuse-577.html, Date Retrieved Oct. 9, 2007, 2 pgs.
"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
Adkins et al., "GSS Collaboration in Document Development: Using Group Writer to Improve the Process", Proceedings of the 32nd Hawaii International Conference on System Sciences, 1999, 11 pages.
Adler et al., "Evaluating and Implementing a Collaborative Office Document System," 2005, http://www.sce.carleton.ca/faculty/adler/publications/2005/adler-nash-noel-2005-Collab-Office.pdf, pp. 1-18.
Appleton, Brad, "ClearView: Associating Attributes and Notes With a View", ClearCase International User's Group Conference, Sep. 1996, 16 pgs.
Badouel, Eric et al., "Merging Hierarchically-Structured Documents in Workflow Systems", Electronic Notes in Theoretical Computer Science 203, (2008), 3-24.
Bellagio, David et al., "Software Configuration Management Strategies and IBM Rational ClearCase a Practical Introduction, Second Edition" In: "Software Configuration Management Strategies and IBM Rational ClearCase a Practical Introduction, Second Edition", May 23, 2005 (May 23, 2005), IBM Press, XP55009093, ISBN: 978-0-32-120019-8 pp. 173-178.
Byfield, Bruce, "Ooo Off the Wall: That's Your Version—Document Control in Ooo Writer", published on Linux Journal, Mar. 7, 2006, 6 pgs.
Chinese 1st Office Action in Application 200880121295.0, mailed Jan. 18, 2012, 6 pgs.
Chinese 1st Office Action in Application 200980115758.7, mailed Mar. 28, 2012, 10 pgs.
Chinese 2nd Office Action in Application 200880115943.1, mailed Jun. 1, 2012, 7 pgs.
Chinese Office Action in Application 200880115943.1, mailed Oct. 25, 2011, 13 pgs.
Chinese Office Action in Application 200880119647.9, mailed Nov. 24, 2011, 7 pgs.
Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, http://www.crpit.com/confpapers/CRPITV62Citro.pdf, pp. 1-10.
Dekeyser, Stijin, et al., "Path Locks for XML Document Collaboration", University of Antwerp, Dec. 12, 2002, pp. 105-114.
Ellis et al., "Groupware—Some Issues and Experiences", vol. 34, No. 1, Jan. 1, 1991, pp. 38-58.
European Extended Search Report in EP Application 09739350.8, mailed Nov. 9, 2011, 10 pgs.
European Extended Search Report in EP Application 09767155.6, mailed Mar. 26, 2012, 10 pgs.

(56) References Cited

OTHER PUBLICATIONS

Feise, Joachim; "A Survey of Distributed Hypermedia Systems," ISR Institute for Software Research, University of California, Irvine, Apr. 2005, 39 pages.
Galli, R., "Journal File Systems in Linux," http://bulma.net/impresion.phtml?nIdNoticia=1154, Jan. 24, 2002, 15 pgs.
Google, "Share and Collaborate in Real Time," 2008, http://www.google.com/google-d-s/intl/en/tour2.html, 1 pg.
Green, Bob, "Converting Qedit to the Client/Server Model", http://www.robelle.com/library/papers/client-server/, Copyright 2004, 14 pages.
Hawke et al., "Collaborative Authoring of Hypermedia Documents," 1993, http://www/pi6.fernuni-hagen.de/publ/MT-93.pdf, pp. 41-58.
Hebsgarrd, Poul J; Process Driven Document Management™, Version 6.1, Feb. 2007, http://www.brain-technology.com/upload/file_vk306c6tr779p9gntgho_16467.pdf, pp. 1-13.
Heckel, Paul; "A Technique for Isolating Differences between Files" copyright 1978, 5 pages.
Ignat et al., "Extending Real-Time Collaborative Editing Systems with Asynchronous Communication," Institute for Information Systems, ETH Zurich, (at least as early as Oct. 4, 2007), http://www.inf.ethz.ch/personal/ignat/Publications/cscwd_04.pdf, pp. 1-6.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
International Preliminary Report and Written Opinion for PCT/US/2008/083069 / MS 321999.02 mailed Jun. 24, 2010, 6 pages.
International Search Report and Written Opinion for PCT/US2008/081456 / MS 321449.02 mailed Mar. 31, 2009, 12 pages.
International Search Report and Written Opinion for PCT/US2008/083862 / MS 321998.02 mailed Mar. 31, 2009, 11 pages.
International Search Report and Written Opinion for PCT/US2009/037920 mailed Nov. 30, 2009, 11 pages.
International Search Report and Written Opinion for PCT/US2009/039316 / MS 323384.02 mailed Jan. 18, 2010, 11 pages.
International Search Report and Written Opinion for PCT/US2009/045558 mailed Nov. 30, 2009, 11 pages.
Koch, Michael, "Design Issues and Model for a Distributed Multi-User Editor" (pp. 1-21), from *Computer Supported Cooperative Work, An International Journal*, 3(3-4), 19995, pp. 359-378.
La Fontaine, Robin, Monsell EDM Ltd., Merging XMLFiles: a new approach providing intelligent merge of XML data sets, Presented at XML Europe 2002, http://www.deltaxml.com/dxml/93/version/default/part/AttachmentData/data/merging-xml-files.pdf, 21 pgs.
Lu et al., "Merging Retrieval Results in Hierarchical Peer-to-Peer Networks" SIGIR '04, Jul. 25-29, 2004, 2 pages.
McKechan et al., "Design Considerations for Creditor: A Collaborative Report Writing Editor," accessed May 16, 2008, http://userpages.umbc.edu/~jcampbel/Group01/McKechan_paper_iwces3.pdf, 10 pgs.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
Microsoft Corporation, Compare and Merge Mechanisms, © 2007, http://msdn2.microsoft.com/en-us/library/ek8hk7e2(VS.80,d=printer).aspx, 1 page.
Miller et al.; "Interactive Simultaneous Editing of Multiple Text Regions"; www.co-ode.org/resources/papers/k-cap2007-seidenberg.pdf; Jun. 2001; 15 pages.
Ohst et al., "Difference Tools for Analysis and Design Documents" copyright 2003, 10 pages.
Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.
PCT International Search Report and Written Opinion in Application PCT/US2010/032309, mailed Dec. 1, 2010, 9 pgs.

PCT International Search Report for PCT/US2009/062364 dated May 31, 2010, 11 pgs.
Preston et al., "Synchronous Editing via Web Services: Combining Heterogeneous Client and Server Technologies," Department of Computer Science, Georgia State University, Atlanta, Georgia, *CSCW* 2006, Nov. 4-8, 2006, Banff, Alberta, Canada, http://cims.clayton.edu/jpreston/PhD/Research/Preston%20-%20CSCW%20Demo%20Extended%20Abstract.pdf, pp. 1-2.
Russian Notice of Allowance in Application 2010123793, mailed Apr. 13, 2012, 7 pgs.
Samiei et al., "EzMail: Using Information Vizualization Techniques to Help Manage Email", Proceedings of the 8th National Conference on Information Vizualization, 2004, 6 pgs.
Seidenberg et al; "A Methodology for Asynchronous MultiUser Editing of Semantic Web Ontologies"; www.xmpp.org/extensions/xep-0058.html; Mar. 28, 2006; 8 pages.
Shchepin, "XEP-0058: Multi-User Text Editing", http://groups.csail.mit.edu/uid/projects/simuledit/usenix01.pdf, Oct. 9, 2007, 5 pages.
Shepler et al., "Network File 1-15 Systems (NFS)," Version 4, Apr. 1, 2003, retrieved from http://rsync.tools.ietf.org/html/rfc3530 on Mar. 7, 2012, 275 pgs.
Shiro Sakata, "Development and Evaluation on an in-house multimedia desktop conference system", Apr. 1990, IEEE Journal on selected areas in communications, vol. 8.
Synchronous Collaborative Text Document Editing Online: MoonEdit, reviewed Sep. 13, 2007, http://www.masternewmedia.org/news/2005/02/20/synchronous_collaborative_text_document-editing.htm, pp. 1-4.
Taiwan Search Report and Office Action in Application 97142418, mailed Feb. 21, 2012, 13 pgs.
Tanebaum, Andrew S., "Moderne Betriebssysteme", 2003 Pearson, pp. 786-787.
Tichy, Walter F., RCS—A System for Version Control, Jan. 3, 1991, http://www.svlug.org/teams/rcs.pdf, 20 pgs.
US Final Office Action for U.S. Appl. No. 11/938,082, mailed Jun. 29, 2010, 30 pgs.
US Final Office Action for U.S. Appl. No. 11/957,010, mailed Aug. 18, 2010, 26 pgs.
US Final Office Action for U.S. Appl. No. 12/044,744, mailed Nov. 22, 2010, 14 pgs.
US Final Office Action for U.S. Appl. No. 12/145,536, mailed Apr. 26, 2011, 32 pgs.
US Non-Final Office Action for U.S. Appl. No. 11/938,082, mailed Dec. 28, 2009, 20 pgs.
US Non-Final Office Action for U.S. Appl. No. 11/951,973, mailed Jan. 19, 2011, 11 pages.
US Non-Final Office Action for U.S. Appl. No. 11/957,010, mailed Mar. 18, 2010, 24 pgs.
US Non-Final Office Action for U.S. Appl. No. 12/044,744, mailed Jul. 26, 2010, 15 pgs.
US Non-Final Office Action for U.S. Appl. No. 12/044,744, mailed Mar. 25, 2011, 16 pgs.
US Non-Final Office Action for U.S. Appl. No. 12/111,174, mailed Jun. 8, 2011, 18 pgs.
US Non-Final Office Action for U.S. Appl. No. 12/117,025, mailed Sep. 21, 2010, 13 pgs.
US Non-Final Office Action for U.S. Appl. No. 12/145,536, mailed Nov. 8, 2010, 28 pgs.
US Notice of Allowance for U.S. Appl. No. 11/938,082, mailed Jan. 4, 2011, 18 pgs.
US Notice of Allowance for U.S. Appl. No. 12/117,025, mailed Dec. 28, 2011, 11 pgs.
US Notice of Allowance for U.S. Appl. No. 12/117,025, mailed Apr. 14, 2011, 10 pgs.
U.S. Appl. No. 11/951,973, Notice of Allowance mailed Jun. 21, 2011, 9 pgs.
U.S. Appl. No. 11/957,010, Office Action mailed Jan. 27, 2012, 25 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.

(56) References Cited

OTHER PUBLICATIONS

U.S. Appl. No. 12/044,744, Notice of Allowance mailed May 7, 2012, 12 pgs.
U.S. Appl. No. 12/044,744, Office Action mailed Dec. 30, 2011, 17 pgs.
U.S. Appl. No. 12/111,174, Notice of Allowance mailed Apr. 12, 2012, 11 pgs.
U.S. Appl. No. 12/111,174, Office Action mailed Nov. 21, 2011, 20 pgs.
U.S. Appl. No. 12/117,025, Notice of Allowance mailed Sep. 15, 2011, 9 pgs.
U.S. Appl. No. 12/117,040, Notice of Allowance mailed Mar. 29, 2012, 11 pgs.
U.S. Appl. No. 12/117,040, Office Action mailed Oct. 4, 2011, 15 pgs.
U.S. Appl. No. 12/145,536, Office Action mailed Mar. 12, 2012, 52 pgs.
U.S. Appl. No. 12/276,874, Final Office Action mailed Aug. 3, 2011, 15 pgs.
U.S. Appl. No. 12/276,874, Office Action mailed Oct. 26, 2011, 18 pgs.
U.S. Appl. No. 12/276,874, Office Action mailed Feb. 22, 2011, 15 pgs.
U.S. Appl. No. 12/276,874, Office Action mailed Apr. 26, 2012, 20 pgs.
U.S. Appl. No. 12/432,817, Notice of Allowance mailed May 2, 2012, 6 pgs.
U.S. Appl. No. 12/432,817, Office Action mailed Jan. 25, 2012, 27 pgs.
U.S. Appl. No. 12/432,817, Office Action mailed Sep. 12, 2011, 25 pgs.
U.S. Appl. No. 13/079,605, Notice of Allowance mailed Apr. 20, 2012, 9 pgs.
U.S. Appl. No. 13/079,605, Office Action mailed Dec. 5, 2011, 31 pgs.
U.S. Appl. No. 12/117,025, Notice of Allowance mailed Jul. 21, 2011, 10 pgs.
U.S. Appl. No. 12/145,536, Office Action mailed Aug. 1, 2011, 37 pgs.
U.S. Appl. No. 11/938,082, filed Nov. 9, 2007, Confirmation No. 3133.
U.S. Appl. No. 11/951,973, filed Dec. 6, 2007, Confirmation No. 9364.
U.S. Appl. No. 11/957,010, filed Dec. 14, 2007, Confirmation No. 8535.
U.S. Appl. No. 12/044,744, filed Mar. 7, 2008, Confirmation No. 7862.
U.S. Appl. No. 12/111,174, filed Apr. 28, 2008, Confirmation No. 6839.
U.S. Appl. No. 12/117,025, filed May 8, 2008, Confirmation No. 8234.
U.S. Appl. No. 12/117,040, filed May 8, 2008, Confirmation No. 8262.
U.S. Appl. No. 12/145,536, filed Jun. 25, 2008, Confirmation No. 3462.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Wilde, Erik, "Multi-User Multimedia Editing with the MultimETH System," Swiss Federal Institute of Technology, CH 8092, Zurich, (at least as early as Oct. 10, 2007), http://dret.net/netdret/docs/wilde-tikrep18.pdf, pp. 1-9.
Williams, Tim, "Version Control on the Cheap: A User-Friendly, Cost-Effective Revision Control System for SAS", 10 pgs., no date.
ZEND Corporation, the PHP Company, "Team Development With Zend Studio for Eclipse", White Paper, Jan. 2008, 17 pgs.
U.S. Appl. No. 13/539,473, Office Action mailed Oct. 25, 2013, 17 pgs.
U.S. Appl. No. 13/495,659, Office Action mailed Oct. 25, 2013, 8 pgs.
Taiwan Notice of Allowance in Application 99108780, mailed Oct. 21, 2013, 4 pgs.
Japanese Notice of Rejection in Application 2012-508556, mailed Oct. 21, 2013, 7 pgs.
U.S. Appl. No. 14/534,384, Amendment and Response filed Apr. 5, 2016, 14 pgs.
European Communication in Application 08848473.8, mailed Mar. 8, 2016, 1 page.
Taiwan Office Action and Search Report in Application 103126243, mailed Mar. 1, 2016, 5 pgs.
Canadian Office Action in Application 2718106, mailed Mar. 17, 2016, 5 pgs.
Malaysian Notice of Allowance in Application PI2010004653, mailed Nov. 30, 2015, 2 pgs.
Canadian Office Action in Application 2724679, mailed Mar. 23, 2016, 5 pgs.
European Notice of Allowance in Application 09770643.6, mailed Feb. 22, 2016, 8 pgs.
Malaysian Adverse Report in Application PI2011001841, mailed Mar. 15, 2016, 3 pgs.
Canadian Notice of Allowance in Application 2756863, mailed Mar. 16, 2016, 1 page.
Korean Office Action in Application 1020117025682, mailed Mar. 14, 2016, 5 pgs.
Chinese Notice on Reexamination in Application 200980147769.3, mailed Apr. 5, 2016, 10 pgs.
Canadian Office Action in Application 2,666,340, mailed Apr. 21, 2016, 13 pgs.
Korean Final Rejection in Application 10-2010-7029113, mailed Mar. 31, 2016, 12 pgs.
Israeli Office Action in Patent Application No. 208040, mailed May 31, 2015, 2 pgs.
U.S. Appl. No. 14/534,384, Office Action mailed Jan. 5, 2016, 20 pgs.
U.S. Appl. No. 13/859,631, Office Action mailed Dec. 8, 2015, 34 pgs.
Taiwanese Notice of Allowance in Application 103135218, mailed Nov. 30, 2015, 4 pgs.
Malaysian Notice of Allowance in Application PI 2010005579, mailed Oct. 30, 2015, 2 pgs.
Korean Notice of Preliminary Rejection in Application 1020157025969, mailed Nov. 17, 2015, 7 pgs.
Korean Notice of Preliminary Rejection in Application 1020157025970, mailed Nov. 11, 2015, 11 pgs.
Brinck et al., "A Collaborative Medium for the Support if Conversational Props", Nov. 1992 CSCW 92 Proceedings, pp. 171-178.
Farella et al., "Multi-Client Cooperation and Wireless Pda Interaction in Immersive Virtual Environment", http://www-micrel.deis.unibo.it/~farella/doc/Farella115def.pdf—(Publicly known at least as early as Aug. 2006).
Geyer et al., "A Team Collaboration Space Supporting Capture and Access of Virtual Meetings", Proceedings of the 2001 International ACM Siggroup Conference on Supporting Group Work, ACM, pp. 188-196.
http://www.geimaginationcubed.com, 5 pages (Publicly known at least as early as Mar. 2005).
Kolland et al., "Information Sharing in Collaborative Environments, Enabling Technologies: Infrastructure for Collaborative Enterprises", 1994, pp. 140-154.
Leung et al., "Creating a multiuser 3-D virtual environment", Date: May 2001, On pp. 9-16, vol. 18, Issue: 3, http://ieeexplore.ieee.org/xpl/abs_free.jsp?arNumber=924884.
Roseman et al., "TeamRooms: Network Places for Collaboration, Proceeding of the 1996 ACM Conference on Computer Supported Cooperative Work", pp. 325-333.
Roussel, Nicolas, "Mediascape: a Web-based Mediaspace", http://citeseer.ist.psu.edu/cache/papers/cs/25847/http:zSzzSzwww-ihm.lri.frzSzzCz7erousselzSzpublicationszSzmultimedia.pdf/roussel99mediascape.pdf—(Publicly known at least as early as Aug. 2006).

(56) References Cited

OTHER PUBLICATIONS

PCT International Search Report in International Application No. PCT/US2007/083024, mailed Apr. 29, 2008, 11 pgs.
Chinese First Office Action for Application No. 200780042038.3 mailed Jun. 23, 2010, 20 pgs.
Chinese Second Office Action for Application No. 200780042038.3 mailed Apr. 28, 2011, 10 pgs.
Australian Office Action for Application No. 2007324103 mailed May 27, 2011, 2 pgs.
Chinese Notice of Allowance for Application No. 200780042038.3 mailed Aug. 25, 2011, 4 pgs.
Australian Notice of Acceptance in Application No. 2007324103 mailed Sep. 14, 2011, 3 pgs.
Russian Notice of Allowance for Application No. 2009117840/08 mailed Feb. 7, 2012, 22 pgs.
Japanese Office Action for Application No. 2009-537263 mailed Feb. 21, 2012, 8 pgs.
Japanese Notice of Allowance for Application No. 2009-537263 mailed Jun. 22, 2012, 6 pgs.
European Search Report for Application No. PCT/US2007083024 mailed Mar. 28, 2013, 8 pgs.
Korean Notice of Preliminary Rejection for Application No. 10-2009-7010393 mailed Feb. 28, 2014, 16 pgs.
Korean Notice of Allowance received for Patent Application No. 10-2009-7010393, mailed May 20, 2014, 2 pages. (w/o English Translation).
Canadian Office Action Issued in Patent Application No. 2666340, Mailed Nov. 28, 2014, 5 pages.
Canadian Office Action Issued in Patent Application No. 2666340, mailed Sep. 14, 2015, 6 pages.
U.S. Appl. No. 11/599,599, Office Action mailed Jun. 11, 2009, 15 pgs.
U.S. Appl. No. 11/599,599, Amendment and Response filed Aug. 27, 2009, 10 pgs.
U.S. Appl. No. 11/599,599, Notice of Allowance mailed Dec. 17, 2009, 13 pgs.
U.S. Appl. No. 12/713,582, Office Action mailed Dec. 24, 2013, 17 pgs.
U.S. Appl. No. 12/713,582, Amendment and Response mailed Mar. 24, 2014, 10 pgs.
U.S. Appl. No. 12/713,582, Notice of Allowance mailed Feb. 13, 2015, 17 pgs.
European Communication in Application 07863665.1, mailed Apr. 16, 2013, 1 page.
Malaysian Notice of Allowance in Application PI 20091514, mailed Oct. 30, 2007, 3 pgs.
Notice of Allowance Issued in Korean Patent Application No. 10-2010-7029113, Mailed Date: Dec. 31, 2015, 2 Pages. (W/O English Translation).
U.S. Appl. No. 14/474,481, Office Action mailed Jan. 15, 2016, 25 pgs.
European extended Search Report in Application 08848473.8, mailed Feb. 18, 2016, 11 pgs.
Ruixuan Li et al., "P2P-based Locking in Real-Time Collaborative Editing Systems", Computer Supported ooperative Work in Design, 2007, CSCWD, 11th Int'l. Conf. on IEEE, PI, Apr. 1, 2007, pp. 24-29.
Malaysian Notice of Allowance in Application PI 2010001887, mailed Jan. 15, 2016, 2 pgs.
Korean Office Action in Application 10-2011-7011228, mailed Dec. 31, 2015, 4 pgs.
U.S. Appl. No. 14/534,384, Notice of Allowance mailed May 20, 2016, 11 pgs.
Korean Final Rejection in Application 10-2015-7025970, mailed May 23, 2016, 5 pgs.
U.S. Appl. No. 13/859,631, Amendment and Response filed Jun. 3, 2016, 15 pgs.
Korean Notice of Preliminary Rejection in Application 10-2015-7019912, mailed Mar. 31, 2016, 10 pgs.
Korean Office Action in Application 10-2015-7025969, mailed Jun. 29, 2016, 13 pgs.
U.S. Appl. No. 14/474,481, Amendment and Response filed Jun. 15, 2016, 18 pgs.
U.S. Appl. No. 13/859,631, Office Action mailed Jun. 30, 2016, 24 pgs.
U.S. Appl. No. 14/474,481, Office Action mailed Aug. 12, 2016, 28 pgs.
U.S. Appl. No. 14/534,384, Amendment after Allowance filed Aug. 4, 2016, 8 pgs.
European Office Action in Application 08848473.8, mailed Sep. 2, 2016, 9 pgs.
Taiwan Notice of Allowance in Application 103126243, mailed Jul. 7, 2016, 4 pgs.
Korean Office Action in Application 1020107012220, mailed Sep. 13, 2016, 4 pgs.
Chinese Decision on Reexamination in Application 200980147769.3, mailed Sep. 30, 2016, 18 pgs.
Korean Notice of Preliminary Rejection in Application 10-2015-7019912, mailed Oct. 20, 2016, 13 pgs.
U.S. Appl. No. 14/474,481, Amendment and Response filed Dec. 12, 2016, 15 pgs.
U.S. Appl. No. 13/859,631, Amendment and Response filed Nov. 30, 2016, 14 pgs.
European Extended Search Report in Application 09827960.7, mailed Dec. 13, 2016, 8 pgs.
Anonymous, "A.nnotate: Annotate PDF, Word, Excel and Web Pages Online", May 20, 2008, retrieved from the Internet at: http://www.makeuseof.com/tag/annotate/, retrieved on Nov. 14, 2016, 4 pgs.
Murray, Katherine et al., "Microsoft Office Word 2007 inside out", Jun. 20, 2007, retrieved from the Internet at: https://www.microsoftpressstore.com/, retrieved on Nov. 14, 2016, 40 pgs.
Norwegian Office Action and Search Report in Application 20091461, mailed Nov. 30, 2016, 5 pgs.
Korean Office Action in Application 10-2015-7025969, mailed Jan. 31, 2017, 8 pgs.
Canadian Office Action in Application 2739621, mailed Jan. 5, 2017, 7 pgs.
Israel Office Action in Patent Application 212007, dated Nov. 15, 2016, 6 Pages, (with English translation).
U.S. Appl. No. 14/474,481, Office Action dated Mar. 9, 2017, 28 pgs.
Canadian Office Action in Application 2718106, dated Mar. 3, 2017, 4 pgs.
Korean Office Action in Application 10-2015-7019912, dated Feb. 20, 2017, 6 pgs.
Indian Office Action in Application 02868/CHENP/2009, dated Feb. 27, 2017, 8 pgs.
Canadian Office Action in Application 2724679, dated Mar. 7, 2017, 5 pages.
Malaysian Notice of Allowance in Application PI 2010002084, dated Feb. 15, 2017, 2 pgs.
Indian Office Action in Application 3034/CHENP/2010, dated Mar. 31, 2017, 7 pgs.
Canadian Notice of Allowance Issued in Patent Application No. 2666340, dated Mar. 28, 2017, 1 page.
U.S. Appl. No. 13/859,361, Office Action dated Apr. 7, 2017, 27 pgs.
U.S. Appl. No. 13/859,631, Office Action dated Apr. 7, 2017, 27 pgs.
U.S. Appl. No. 15/248,158, Office Action dated Jun. 6, 2017, 20 pages.
European Notice of Allowance in Application 08848473.8, dated Jun. 6, 2017, 8 pgs.
Korean Office Action in Application 10-2015-7025969, dated May 8, 2017, 8 pgs.
Korean Office Action in Application 10-2017-7006064, dated May 19, 2017, 18 pgs.
Korean Notice of Final Rejection in Application 10-2015-7019912, dated Jun. 20, 2017, 5 pages.
U.S. Appl. No. 14/683,394, Office Action dated Jul. 21, 2017, 13 pgs.

(56) References Cited

OTHER PUBLICATIONS

U.S. Appl. No. 14/711,300, Office Action dated Jun. 26, 2017, 25 pgs.
Chinese 1st Office Action in Application 200980124935.8, dated Oct. 30, 2012, 10 pgs.
European Examination Report in Application 09739350.8, dated Sep. 25, 2012, 7 pgs.
Tanenbaum, Andrew S., "Modern Operating Systems", 2nd Edition, Prentice Hall, New Jersey, 2001, pp. 735-737.
U.S. Appl. No. 12/111,174, Notice of Allowance dated Nov. 19, 2012, 2 pgs.
U.S. Appl. No. 13/079,605, Notice of Allowance dated Nov. 19, 2012, 2 pgs.
U.S. Appl. No. 13/495,659, Office Action dated Nov. 21, 2012, 7 pgs.
U.S. Appl. No. 12/117,040, Notice of Allowance dated Dec. 6, 2012, 14 pgs.
U.S. Appl. No. 13/079,605, Notice of Allowance dated Dec. 5, 2012, 2 pgs.
U.S. Appl. No. 12/111,174, Notice of Allowance dated Dec. 4, 2012, 2 pgs.
U.S. Appl. No. 12/145,536, Notice of Allowance dated Nov. 23, 2012, 18 pgs.
Russian Notice of Allowance in Application 2010122968, dated Nov. 6, 2012, 27 pgs.
Australian Office Action in Application 2008338826, dated Oct. 24, 2012, 3 pgs.
Chinese 2nd Office Action in Application 200980115758.7, dated Dec. 5, 2012, 7 pgs.
Chinese 1st Office Action in Application 200980147769.3, dated Jan. 29, 2012, 12 pgs.
Japanese Notice of Rejection in Application 2011-507506, dated May 21, 2013, 6 pgs.
Chinese 2nd Office Action in Application 200980116872.1, dated Jun. 18, 2013, 6 pgs.
Japanese Notice of Rejection in Application 2011508530, dated Jun. 18, 2013, 6 pgs.
Australian Notice of Allowance in Application 2008338826, dated Dec. 5, 2012, 2 pgs.
Japanese Notice of Rejection dated Dec. 28, 2012, in Application No. 2010-533160, 8 pages.
Chinese Notice on the Second Office Action dated Mar. 1, 2013, in Application No. 201080019470.2, 6 pages.
Chinese Notice of Allowance in Application 200880115943.1, dated Jan. 15, 2013, 4 pgs.
U.S. Appl. No. 13/539,473, Office Action dated Apr. 2, 2013, 26 pgs.
Chinese 2nd Office Action in Application 200980124935.8, dated Jun. 19, 2013, 7 pgs.
U.S. Appl. No. 12/276,874, Office Action dated Mar. 28, 2013, 24 pgs.
Chinese Notice of Allowance in Application 200880119647.9, dated Feb. 28, 2013, 4 pgs.
Japanese Notice of Rejection in Application 2010-536967, dated Feb. 8, 2013, 6 pgs.
Chinese 3rd Office Action in Application 200880121295.0, dated Apr. 9, 2013, 9 pgs.
Japanese Notice of Allowance in Application 2010-538018, dated Mar. 15, 2013, 6 pgs.
Russian Notice of Allowance in Application 2010144042, dated Feb. 27, 2013, 7 pgs.
Lloyd, Zach et al., "Collaboration Goes One Level Deeper", obtained online at: http://googledocs.blogspot.in/2008/03/collaboration-goes-one-level-deeper.html, published Mar. 19, 2008, 2 pgs.
"Emerging from a Highly Praised Private Beta, Zoho Notebook is a One-Stop Destination for Accessing and Sharing Content—Creation, Aggregation and Collaboration", obtained online at: http://www.zoho.com/news/zoho_notebook_public_beta.html, published May 22, 2007, 3 pgs.
"Apple Introduces iWork'08", obtained online at: https://www.apple.com/pr/library/2007/08/07Apple-Introduces-iWork-08.html, published Aug. 7, 2007, 2 pgs.
Russian Notice of Allowance in Application 2010153320, dated Apr. 17, 2013, 23 pgs.
Chinese 2nd Office Action in Application 200980147769.3, dated Jun. 7, 2013, 10 pgs.
Chinese 3rd Office Action in Application 201080019470.2, dated May 31, 2013, 6 pgs.
U.S. Appl. No. 13/495,659, Office Action dated Jul. 5, 2013, 8 pgs.
Taiwanese Office Action and Search Report in Application 099108780, dated Jun. 19, 2013, 5 pgs.
Chinese Notice of Allowance in Application 200980115758.7, dated Jun. 6, 2013, 4 pgs.

* cited by examiner

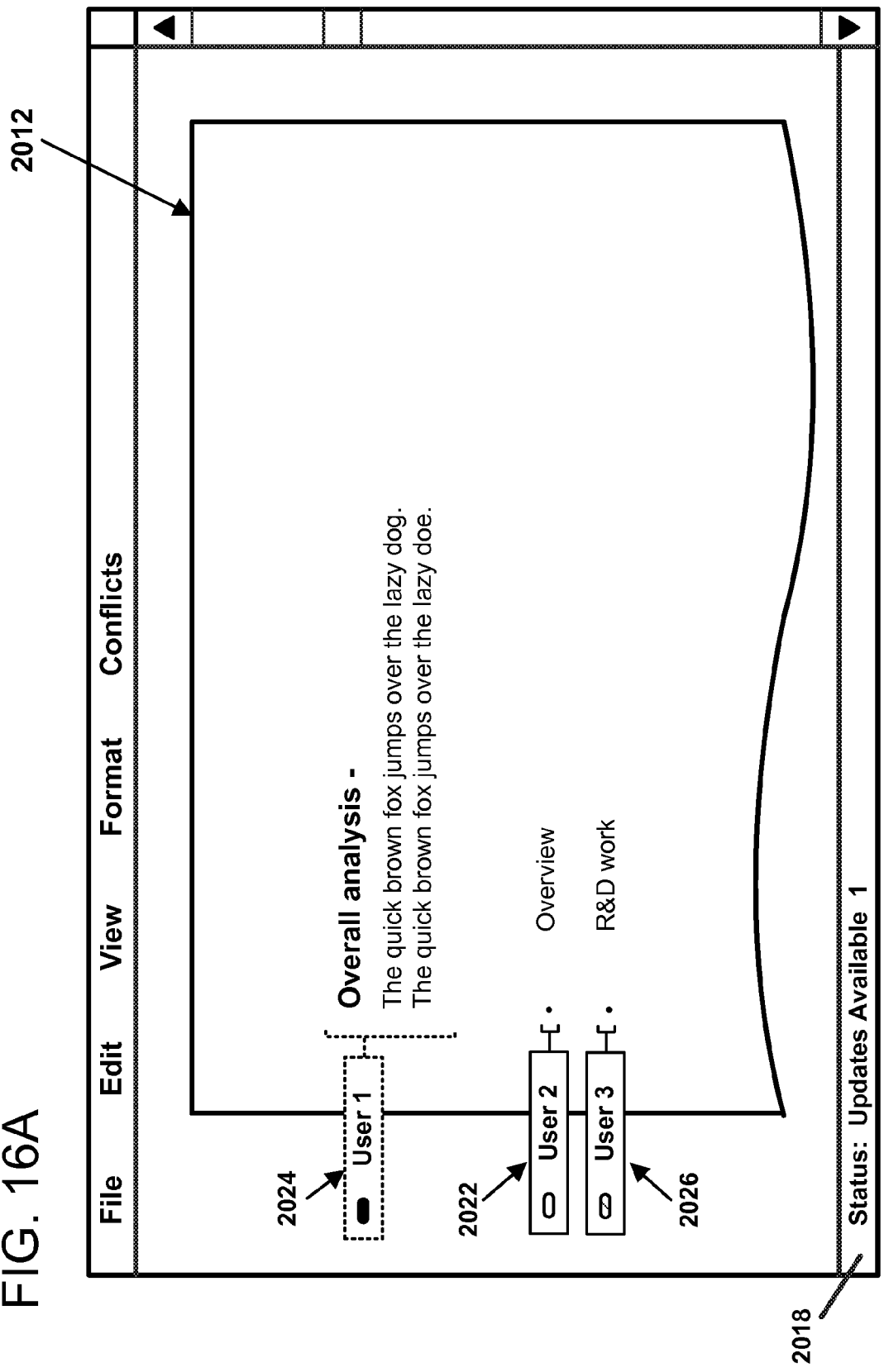

CONFLICT RESOLUTION

CROSS-REFERENCE TO RELATED APPLICATIONS

This application is a continuation application of U.S. Ser. No. 12/111,174, entitled CONFLICT RESOLUTION, and filed on Apr. 28, 2008, which is incorporated herein by reference in their entirety.

BACKGROUND

Traditional collaborative editing tends to be performed serially. Users take turns accessing a document, editing the document, and storing their edits. To inhibit editing conflicts, the accessing user may place a lock on the file to inhibit other users from editing the document when the accessing user is editing the document. The iterative editing process can cause delays since each user may wait for a turn at editing the document. In addition, the iterative editing process may be difficult to manage. For example, each user may need to keep track of who is editing which portions of the document, which version of the document is the most recent, and when the user will have a turn.

In other types of traditional collaborative editing, each user can edit a different copy of a document. Subsequently, all of the edited copies may be merged into a single document. This large scale merge also may cause delays, lead to numerous editing conflicts, and/or be difficult to manage. For example, the user responsible for merging the documents may be required to track the relationship between the documents. The user also may be responsible for resolving conflicts among two or more of the edited copies.

It is with respect to these and other considerations that the present disclosure has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present disclosure are generally directed to enabling a user to resolve editing conflicts arising when synchronizing a data file in a collaborative environment. Each user authoring a user copy of a data file may resolve editing conflicts between a master copy of the data file and the user copy. Updates from the user copy of the data file may be incorporated into the master copy after editing conflicts have been resolved.

According to aspects of the disclosure, an authoring application enables a user to selectively show and hide editing conflicts within a user copy of a data file. The authoring application enables free editing of the user copy regardless of whether or not editing conflicts are shown or hidden. According to other aspects, authoring application provides a contextual user interface that enables a user to resolve the displayed editing conflicts.

In some embodiments, showing editing conflicts includes annotating conflicting content. In one embodiment, annotating conflicting content indicates how the content conflicts. In another embodiment, only conflicting content inserted, revised, and/or deleted within the user copy is annotated.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
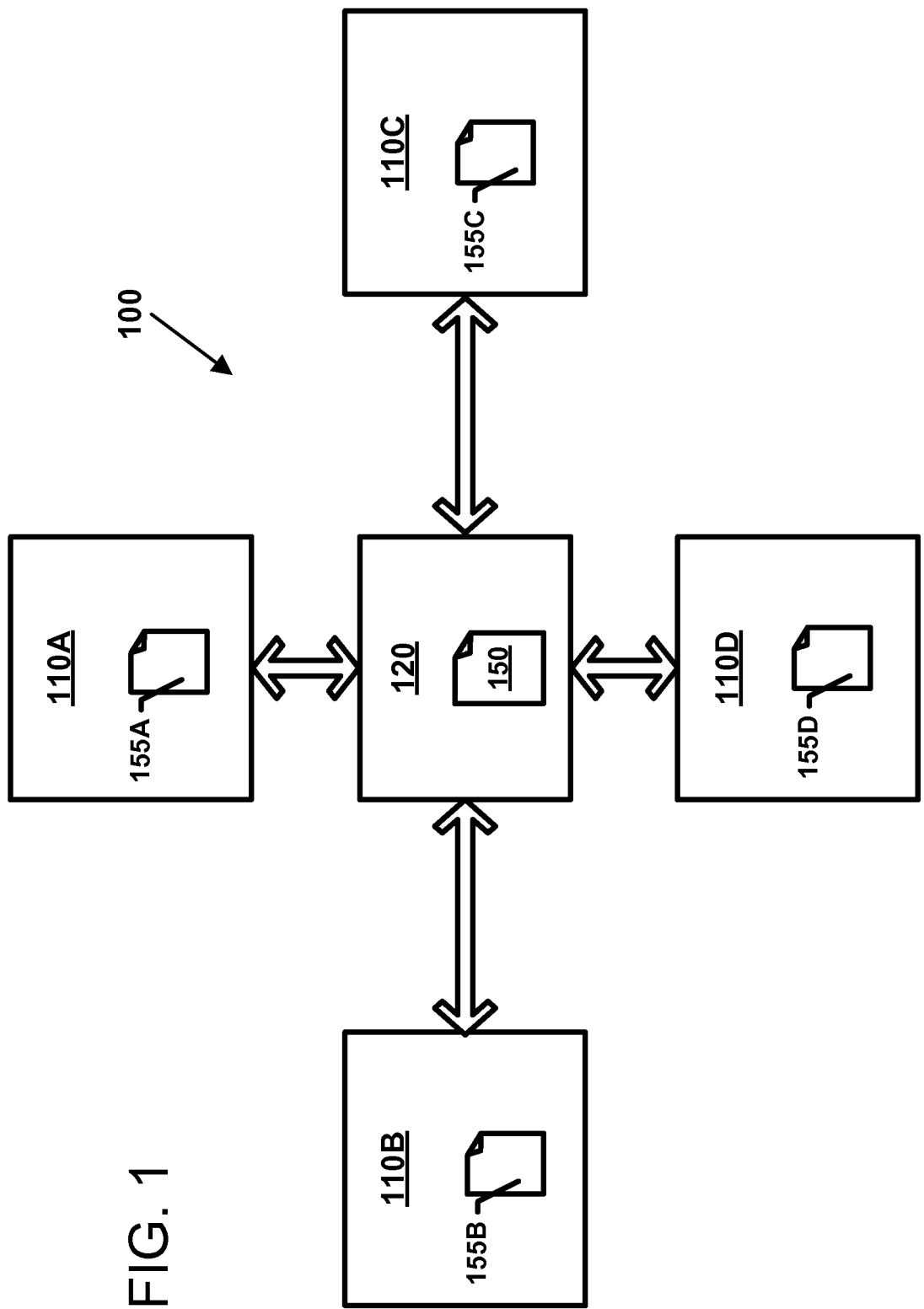
FIG. 1 illustrates an example authoring system having features that are examples of inventive aspects of the disclosure.

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

In accordance with the principles of the present disclosure, a collaborative authoring application provides an authoring environment in which one or more users can edit one or more data files (e.g., word processing documents, presentation documents, spreadsheet documents, pictures or other images, sound files, software applications, executable code, etc.) via editing operations (e.g., insertion, revision, and/or deletion of content and/or metadata). Each user obtains a user copy of the data file based on a version of the data file represented by a master copy. A user may edit the user copy of the data file to create a new version of the data file and periodically synchronize the new version with the master copy.

Synchronization, as the term is used herein, refers to the sending and/or receiving of one or more version updates between the master copy of the data file and a user copy of the data file to create a common version of the data file. For example, each user periodically may send to the master copy a version update representing the new version of the data file and periodically may receive from the master copy a version update representing a current version of the master copy (e.g., which may reflect edits performed by other users).

As briefly described above, embodiments of the present disclosure are directed to enabling a user to resolve editing conflicts arising when synchronizing a data file in a collaborative environment. In general, editing conflicts may arise when the master copy of the data file changes (e.g., editing operations are performed on the master copy) between when a user copy is obtained and the user copy is synchronized with the master copy or between synchronizations. Such changes to the master copy will be referred to herein as "intervening changes."

An editing operation performed on a user copy of the data file results in an editing conflict, as the term is used herein, when the editing operation interferes with an intervening change made to the master copy (i.e., or vice versa). For example, if a user performs an editing operation in a user copy of a data file to revise a first data unit that was deleted in a master copy of the data file by an intervening change, then the editing operation resulting in the revision of the first data unit would conflict with the editing operation resulting in the deletion of the first data unit in the master copy.

Referring now to the drawings, FIG. 1 illustrates an example authoring system 100 having features that are examples of inventive aspects of the disclosure. The authoring system 100 includes a storage device 120 storing a master copy 150 of a data file (e.g., word processing documents, presentation documents, spreadsheet documents, pictures or other images, sound files, software applications, executable code, etc.). In one embodiment, the storage device 120 can include one or more storage devices (e.g., a network of storage devices). In another embodiment, the storage device 120 can include one or more computing devices.

The authoring system 100 also includes at least one user computing device 110 that may be communicatively coupled to the storage device 120. As the term is used herein, a user computing device 110 includes any device configured to obtain and author a user copy 155 of a data file from a master copy 150 of the data file. As the term is used herein, authoring a data file may include creating the data file and/or editing the data file via editing operations. Each of the user computing devices 110 can author the data file by creating a user copy 155 of the data file based on the master copy 150. The user device 110 may edit the user copy 155 when the user device 110 is communicatively coupled to the storage device 120 (i.e., online) or when the user device 110 is disconnected from the storage device 120 (i.e., offline).

The user copy 155 of the data file may be synchronized when the user computing device 110 communicatively couples to the storage device 120 (i.e., is online) and periodically sends to the storage device 120 one or more updates to be incorporated into the master copy 150 and, thereby, shared with other user computing devices. Synchronization of the user copy 155 also includes periodically obtaining from the storage device 120 updates from the master copy 150 that originated from other user computing devices. When a user computing device 110 is offline, the user computing device does not synchronize with the storage device 120 and, hence, the other user computing devices.

Additional details pertaining to synchronization of a user copy of a data file with a master copy can be found in co-pending application Ser. No. 11/938,082, filed Nov. 9, 2007, and entitled "Collaborative Authoring," the disclosure of which is hereby incorporated herein in its entirety. Additional details pertaining to synchronization when the user computing device is offline can be found in co-pending application Ser. No. 11/957,010, filed Dec. 14, 2007, and entitled "Collaborative Authoring Modes," the disclosure of which is hereby incorporated herein in its entirety.

In the example shown in FIG. 1, four user computing devices 110A, 110B, 110C, and 110D are communicatively coupled to a storage device 120. In other embodiments, however, any number of user computing devices 110 may be coupled to the storage device 120. In the example shown, each user computing device 110A, 110B, 110C, 110D can send to the storage device 120 updates generated by the user of the user computing device and can request from the storage device 120 updates generated by the users of the other user computing devices. The computing devices 110A, 110B, 110C and 110D each contain a user copy (155A, 155B, 155C and 155D, respectively) of the data file.

The user computing devices 110A, 110B, 110C, 110D can be a different device from the storage device 120 or can include different user accounts implemented on the storage device 120. In one embodiment, a device that acts as a storage device 120 for one data file may act as a user computing device 110 for a different data file and vice versa. In one embodiment, the storage device 120 can be a server computing device and the user computing devices 110A, 110B, 110C, 110D can be client computing devices.

According to aspects of the disclosure, updates to the data file include content updates and/or metadata updates. As the term is used herein, content updates refer to any editing operation made to the substantive content of a data file. For example, content updates for a word processing document can include added paragraphs (i.e., or sections thereof), deleted paragraphs (i.e., or section thereof), revised paragraphs (i.e., or sections thereof), and additions, deletions, and/or changes to tables, charts, images, or other such objects. In another embodiment, content updates for a presentation document can include added, deleted, and/or revised pictures, text, animations, sounds, and other such data objects.

As the term is used herein, metadata updates refer to any editing operation made to metadata of the data file. Non-limiting examples of metadata include content locks, presence information, and other such data. Presence information indicates which users have indicated an intention to edit the document. Content locks inhibit editing of any content within the lock by users that do not own the lock. For example, content locks may inhibit editing conflicts by indicating which portions of a document or other data file have been claimed by another user. In some embodiments, the content locks can prevent (i.e., bar) a user from editing a portion of a document that has been claimed by another user. In other embodiments, however, the user can choose to break the content lock and edit the portion of the data file. In such cases, the authoring application can warn the user that conflicts may arise when editing the locked portion.

Figure 2:
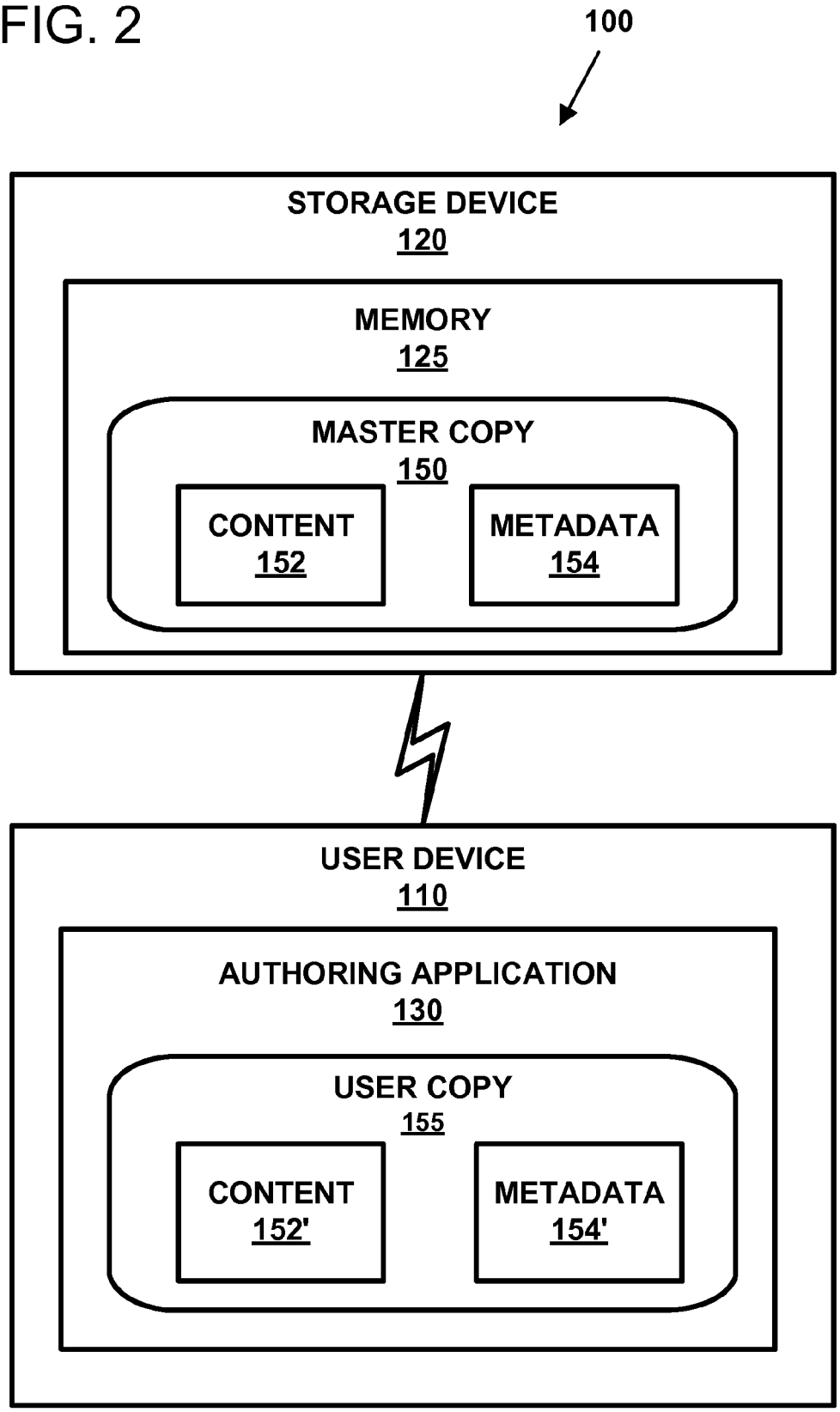
FIG. 2 is a schematic block diagram illustrating an example authoring system including a storage device, which stores a master copy of a data file, communicatively coupled to a user device, which stores a user copy of the data file, in accordance with the principles of the disclosure.

As shown in FIG. 2, content 152 and metadata 154 of a data file can be stored in memory 125 of the storage device 120. In some embodiments, the metadata 154 of the data file can be stored separately from the content 152. For example, the content 152 can be stored in the data file 150 and the metadata 154 can be stored in a table (not shown) separate from the data file 150. In other embodiments, however, the metadata 154 can be stored within the data file 150. Content 152' and metadata 154' of the user copy 155 of the data file can be stored in a cache (see cache 426 in FIG. 4) on a user computing device 110. One or more authoring applications 130 on the user computing device 110 process and manipulate the content 152' and/or the metadata 154' of the user copy 155 of the data file.

In general, the user computing devices 110 can synchronize content updates separately from metadata updates. In some embodiments, metadata updates are automatically synchronized among the storage device 120 and user computing devices 110, whereas content updates from each user computing device 110 are synchronized at the request of the respective user. In one embodiment, the authoring environment 100 may synchronize content updates only when editing conflicts do not exist (i.e., or have been resolved), but may synchronize metadata updates regardless of existing editing conflicts.

In one embodiment, an editing conflict may stem from a content update received from the master copy. In such an embodiment, changes to content 152' and/or metadata 154' of the user copy 155 interfere with intervening changes to the content 152 of the master copy 150. Such editing conflicts are referred to herein as mergeable conflicts. For example, in one embodiment, the same data unit may have been edited differently in the user copy and the master copy of the data file in between synchronizations. In another embodiment, the data unit may have been edited in the master copy 150 before a content lock obtained on the data unit in the user copy 155 was synchronized with the master copy 150.

In another embodiment, an editing conflict may stem from a metadata update received from the master copy 150. In such an embodiment, changes to the content 152' and/or metadata 154' of the user copy 155 interfere with intervening changes to the metadata 154 of the master copy 150 (e.g., the addition of content locks). Such editing conflicts are referred to herein as unmergeable conflicts. For example, the user device 110 may receive a metadata update from the master copy 150 of a data file indicating that content revised in the user copy 155 has already been locked by another user.

In one embodiment, changes to the metadata 154' of a user copy 155 of a data file that interfere with intervening changes to the master copy 150 are overridden by the intervening changes to the master copy 150. For example, if the storage device 120 receives a metadata update from a first user device 110A (FIG. 1) requesting a content lock on a first data unit of a data file and determines the corresponding first data unit of the master copy 150 is locked already to a second user device 110B (FIG. 1), then the storage device 120 will deny the lock request of the first user device 110A.

Figure 3:
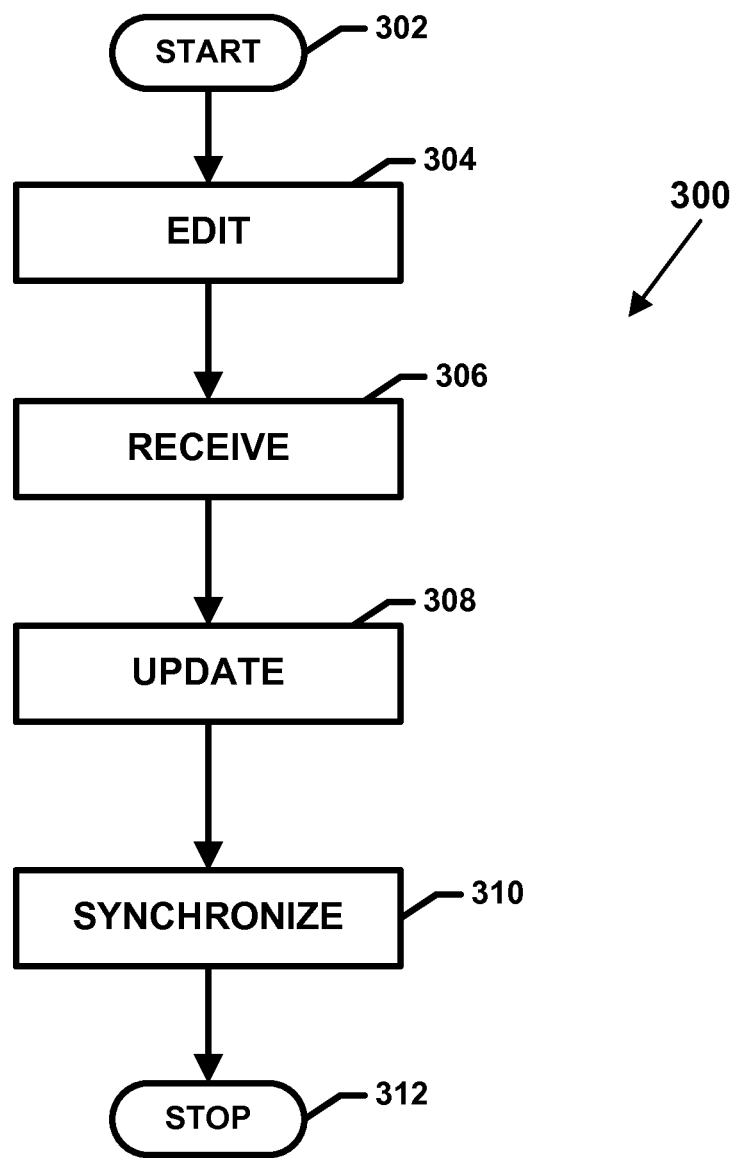
FIG. 3 is a flowchart illustrating an operational flow for an example authoring process by which a user copy of a data file may be authored in accordance with the principles of the disclosure.

FIG. 3 is a flowchart illustrating an operational flow for an example authoring process 300 by which an authoring application may author a user copy of a data file, such as user copy 155 of FIG. 2. The authoring process 300 initializes and begins at a start module 302 and proceeds to an author operation 304. In general, the author operation 304 edits the user copy of the data file. In one embodiment, the author operation 304 obtains a user copy of the data file based on a master copy of an existing data file (e.g., from a storage device). In another embodiment, the author operation 304 creates and edits a new data file, generates a master copy of the data file (e.g., periodically or when editing is completed), and stores the master copy of the data file (e.g., on a storage device).

A receive operation 306 obtains at the authoring application updates indicating intervening changes made to the master copy of the data file. For example, in one embodiment, the receive operation 306 obtains a content update indicating any intervening changes made to the content of the master copy by one or more other users authoring the data file. In another embodiment, the receive operation 306 obtains a metadata update indicating any intervening changes made to the metadata of the master copy by one or more other users authoring the data file. In another embodiment, the receive operation 306 obtains both content and metadata updates.

In one embodiment, the receive operation 306 receives updates from the master copy at predetermined intervals. In another embodiment, the receive operation 306 receives an update from the master copy when a threshold amount of editing has been performed on the master copy. In another embodiment, the receive operation 306 receives an update from the master copy in response to a request for the update. For example, the receive operation 306 may request an update from the master copy in order to update the data file before saving the data file. In such an embodiment, the receive operation 306 requests an update from the master copy when instructions to synchronize the data file are received from the user.

An update operation 308 instantiates the intervening changes into the user copy of the document (e.g., by merging the intervening changes into the user copy of the document). In one embodiment, the update operation 308 instantiates intervening metadata changes differently from intervening content changes. In one embodiment, the update operation 308 may instantiate content updates and metadata updates automatically. In another embodiment, the update operation 308 may instantiate metadata updates automatically and may instantiate content updates at the request of the user. For example, the update operation 308 may present a button or other interface tool to the user indicating the availability of updates that may be instantiated by selecting the button or other interface tool.

The update operation 308 also may determine whether any editing conflicts exist. In some embodiments, the update operation 308 may instantiate the intervening changes differently depending on whether editing conflicts are identified. For example, in one embodiment, the update operation 308 may inhibit instantiation of content updates when editing conflicts are identified, but may continue to instantiate metadata updates automatically despite the existence of editing conflicts. Advantageously, synchronizing the metadata updates despite the existence of editing conflicts may mitigate the creation of further editing conflicts. For example, synchronizing lock data may inhibit concurrent editing of the same data unit by different users.

A synchronize operation 310 attempts to synchronize the user copy with the master copy by forwarding to the master copy updates indicating changes made to the user copy of the data file. In one embodiment, the synchronize operation 310 forwards the updates for distribution to other users collaboratively authoring the data file. The synchronize operation 310 only stores the user copy as the master copy (i.e., overwrites the master copy) if no editing conflicts between the user copy and the master copy are identified. In one embodiment, the synchronize operation 310 obtains the most recent version of the master copy and determines whether editing conflicts exist between the user copy and the most recent version of the master copy.

According to aspects of the disclosure, the synchronize operation 310 may enable the user to initiate resolution of the editing conflicts at any time after the editing conflict has been identified at the discretion of the user. The synchronize operation 310 may enable the user to continue freely editing the user copy of the data file even though one or more editing conflicts have been determined to exist. In one embodiment, the synchronize operation 310 may continue to edit the user copy with editing conflicts being hidden from the user. In another embodiment, the synchronize operation 310 may continue to edit the user copy with editing conflicts being presented to the user. If editing of the user copy is continued despite the existence of one or more editing conflicts, then content updates indicating changes to the user copy may be stored locally until the editing conflicts are resolved instead of being forwarded to the master copy for synchronization as will be discussed in greater detail herein.

The synchronize operation 310 may synchronize metadata updates differently from content updates. For example, in one embodiment, the synchronize operation 310 may forward content updates only if all editing conflicts have been resolved and may forward metadata updates regardless of whether editing conflicts have been resolved. As noted above, synchronizing the metadata updates despite the existence of editing conflicts may mitigate the creation of further editing conflicts. Furthermore, ceasing to synchronize content updates when editing conflicts exist may inhibit introducing the editing conflicts into the master copy of the data file. The authoring process 300 completes and ends at a stop module 312.

In general, an authoring environment having features that are examples of inventive aspects in accordance with the principles of the disclosure can be implemented on a user computing device (e.g., a personal computer, a server computer, a notebook computer, a PDA, a Smartphone, or any other such computing device). A non-limiting embodiment of a user computing system 400 configured to implement an authoring environment and perform authoring processes, such as authoring process 300 of FIG. 3, is described herein with reference to FIG. 4.

Figure 4:
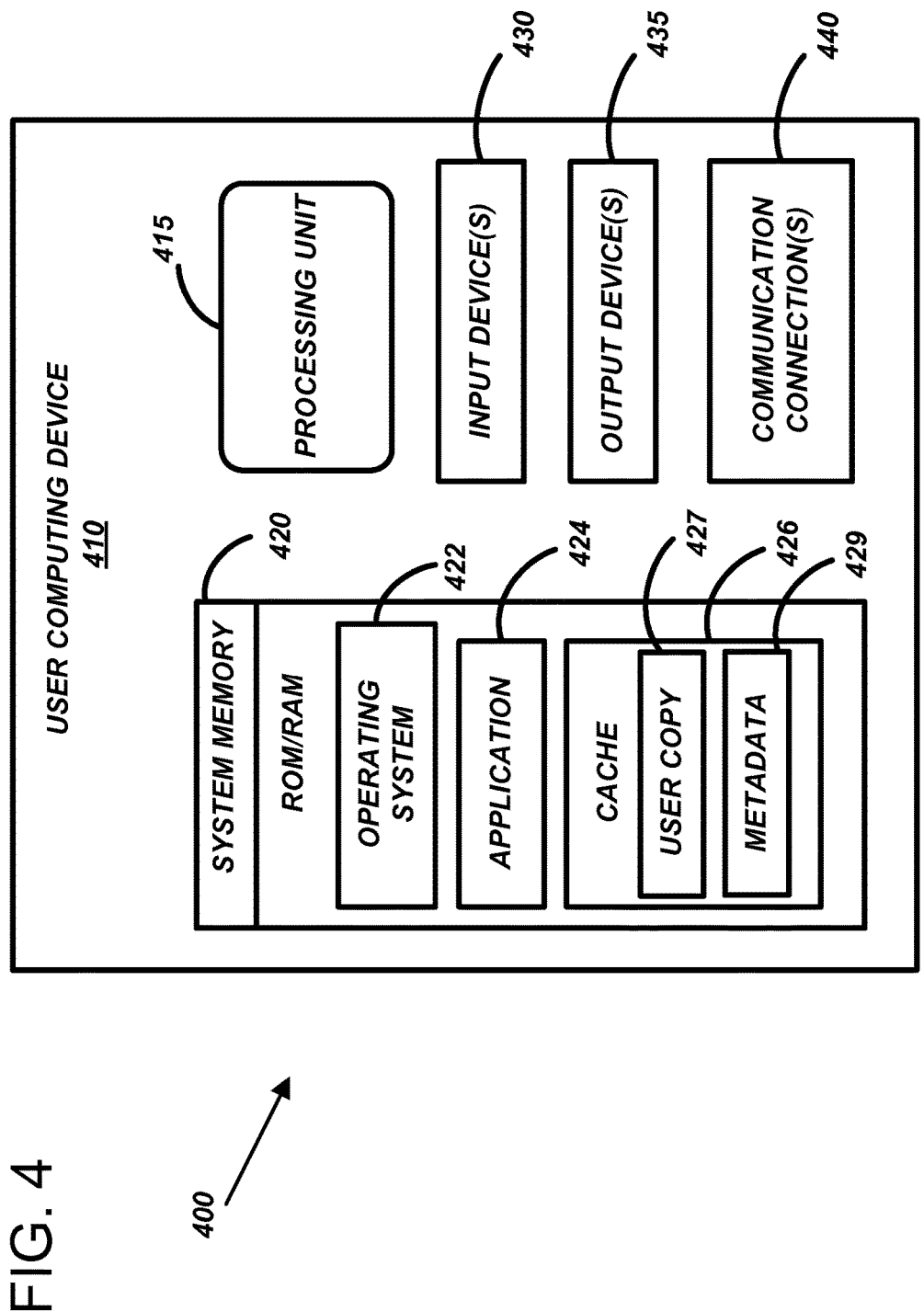
FIG. 4 is a schematic block diagram of a user computing system configured to implement an authoring environment in accordance with the principles of the disclosure.

In FIG. 4, the exemplary computing system 400 for implementing the principles of the disclosure includes a user computing device, such as user computing device 410. In a basic configuration, the user computing device 410 typically includes at least one processing unit 415 for executing applications and programs stored in system memory 420. Depending on the exact configuration and type of computing device 910, the system memory 420 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 420 typically stores an operating system 422, such as the WINDOWS® operating systems from MICROSOFT CORPORATION of Redmond, Wash., suitable for controlling the operation of the computing device 410. System memory 420 also may include a data file cache 426 in which a user copy 427 of a document can be stored. Metadata 429 of the data file also can be stored within the user cache 426.

The system memory 420 also may store one or more software applications, such as authoring applications 424 for creating and editing data files. One non-limiting example of an authoring application 424 suitable for authoring documents in accordance with the principles of the present disclosure is MICROSOFT® OFFICE WORD authoring software from MICROSOFT CORPORATION of Redmond, Wash. Other non-limiting examples of authoring applications include POWERPOINT® presentation software and VISIO® drawing and diagramming software, both also from MICROSOFT CORPORATION of Redmond, Wash.

Computing device 410 also may have input device(s) 430, such as a keyboard, mouse, pen, voice input device, touch input device, etc., for entering and manipulating data. Output device(s) 435, such as a display screen, speakers, printer, etc., also may be included. These output devices 435 are well known in the art and need not be discussed at length herein.

The computing device 410 also may contain communication connections 440 that allow the device 410 to communicate with other computing devices, for example, the storage device 120 of FIG. 1, over a network in a distributed computing environment (e.g., an intranet or the Internet). By way of example, and not limitation, communication device media 440 includes wired media such as a wired network or direct-wired connection, and wireless media, such as acoustic, RF, infrared and other wireless media.

Figure 5:
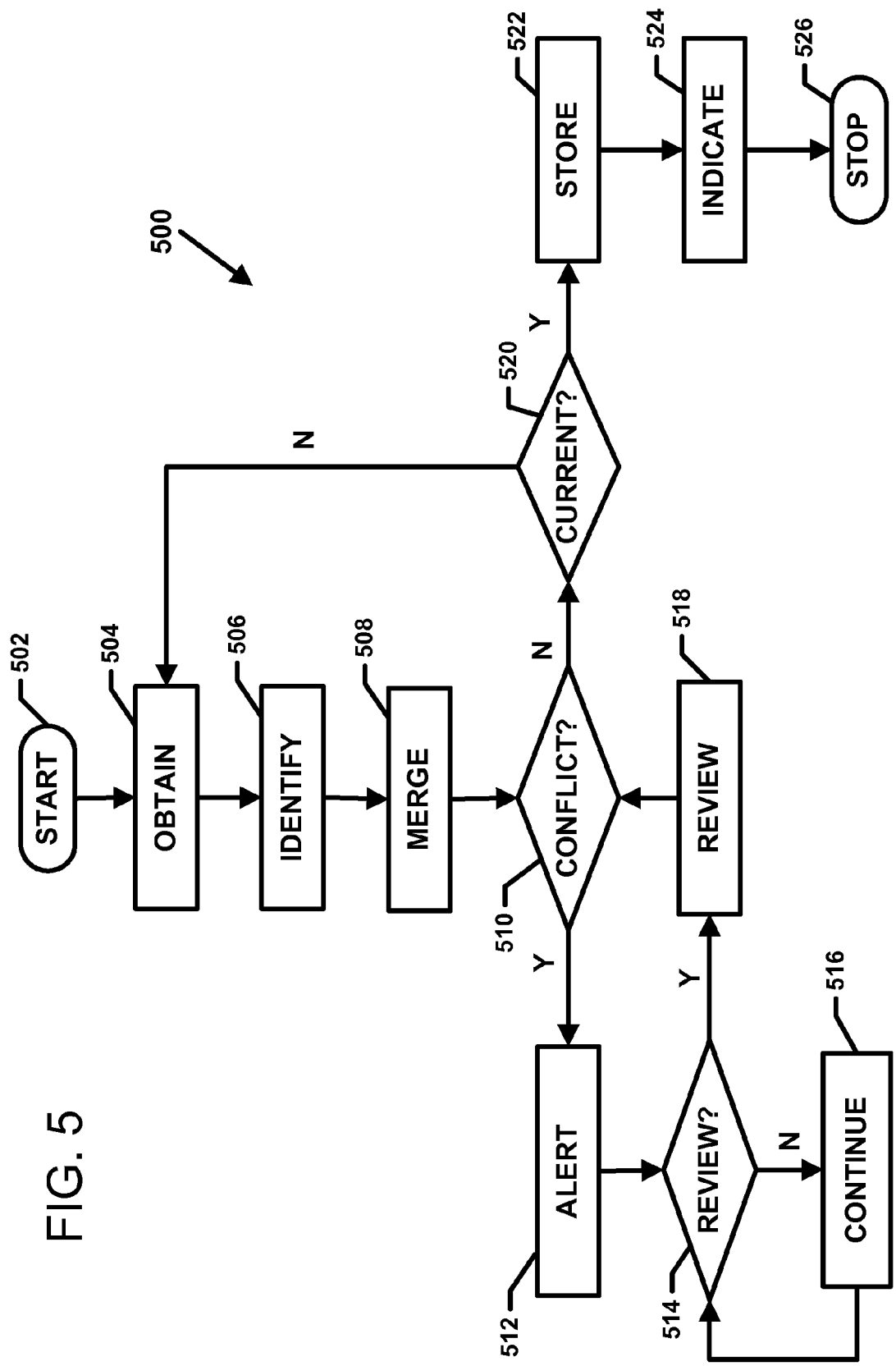
FIG. 5 is a flowchart illustrating an operational flow for an example synchronize process by which the synchronize operation of FIG. 3 may be implemented in accordance with the principles of the disclosure.

FIG. 5 is a flowchart illustrating an operational flow for an example synchronize process 500 by which the synchronize operation 310 of FIG. 3 may be implemented. The synchronize process 500 initializes and begins at a start module 502 and proceeds to an obtain operation 504. The obtain operation 504 acquires a version update from the master copy. For example, in one embodiment, the obtain operation 504 may request the version update from the master copy. In another embodiment, the receive operation 504 may receive periodic version updates from the master copy (e.g., at predetermined intervals).

An identify operation 506 determines whether editing conflicts exist between the current version of the master copy and the user copy. More specifically, the identify operation 506 determines whether any intervening changes to the master copy and any editing operations performed on the user copy since the most recent synchronization (i.e., or since the user copy was obtained) interfere with one other.

A merge operation 508 combines the user copy and the master copy into a merged version of the data file and presents the merged version to the user. In one embodiment, the merge operation 508 integrates the intervening changes into the user copy of the data file. In another embodiment, the merge operation 508 integrates the user changes into the master copy of the data file. In another embodiment, the merge operation 508 integrates the intervening changes and the user changes into the most recently synchronized version of the master copy (i.e., the version of the master copy that was obtained and edited by the user).

A first determination module 510 splits the flow of the synchronize process 500 based on whether any editing conflicts were identified by the identify operation 506 and/or whether any identified editing conflicts from previously received updates remain unresolved. If the first determination module 510 determines at least one editing conflict has been identified, then an alert operation 512 indicates the presence of the editing conflict to the user. For example, the alert operation 512 may present a message to the user indicating the existence of one or more editing conflicts. In one embodiment, the alert operation 512 also may indicate consequences of having unresolved, identified editing conflicts (e.g., the inability to fully synchronize the user copy with the master copy until the editing conflict is resolved).

A second determination module 514 enables the user to choose when to review and resolve the identified editing conflict. In the example shown, the second determination module 514 presents to the user an option of reviewing the editing conflict or continuing to edit the user copy of the data file without viewing the editing conflict. If the second determination module 514 determines the continued editing option has been selected by the user, then a continue operation 516 enables the user to edit the data file freely as will be discussed in greater detail herein.

If the second determination module 514 determines the review option has been selected by the user, however, then a review operation 518 enables the user to review and optionally to resolve the editing conflict using a resolution process that will be discussed in greater detail herein. When the review operation 518 completes, the synchronize process 500 proceeds back to the first determination module 510 to determine whether any editing conflicts remain unresolved. The operation flow described above repeats until the first determination module 510 determines no editing conflicts exist.

When the first determination module 510 determines no editing conflicts exist, then a third determination module 520 determines whether all intervening changes from the master copy have been obtained and instantiate into the user copy. For example, the third determination module 520 may determine whether any intervening changes have been made to the master copy since the most recent update. In one embodiment, the third determination module 520 compares a version number of the current version of the master copy with a version number of the version of the master copy represented by the most recently received update.

If the third determination module 520 determines additional intervening changes exist (i.e., that the most recently received update does not reflect the current state of the master copy), then the synchronize process 500 returns to the obtain operation 504 and the synchronize process 500 begins again. If the third determination module 520 determines no additional intervening changes exist (i.e., that the most recently received update reflects the current state of the master copy), however, then an indicate operation 522 provides an indication the editing conflict has been resolved. For example, in one embodiment, the indicate operation 522 may display a message to the user indicating that all editing conflicts have been resolved. In another embodiment, the indicate operation 522 may display a graphic, icon, or other indicia to the user indicating the editing conflicts have been resolved. A store operation 524 overwrites the master copy of the data file with the user copy. The synchronize process 500 completes and ends at a stop module 526.

Figure 6:
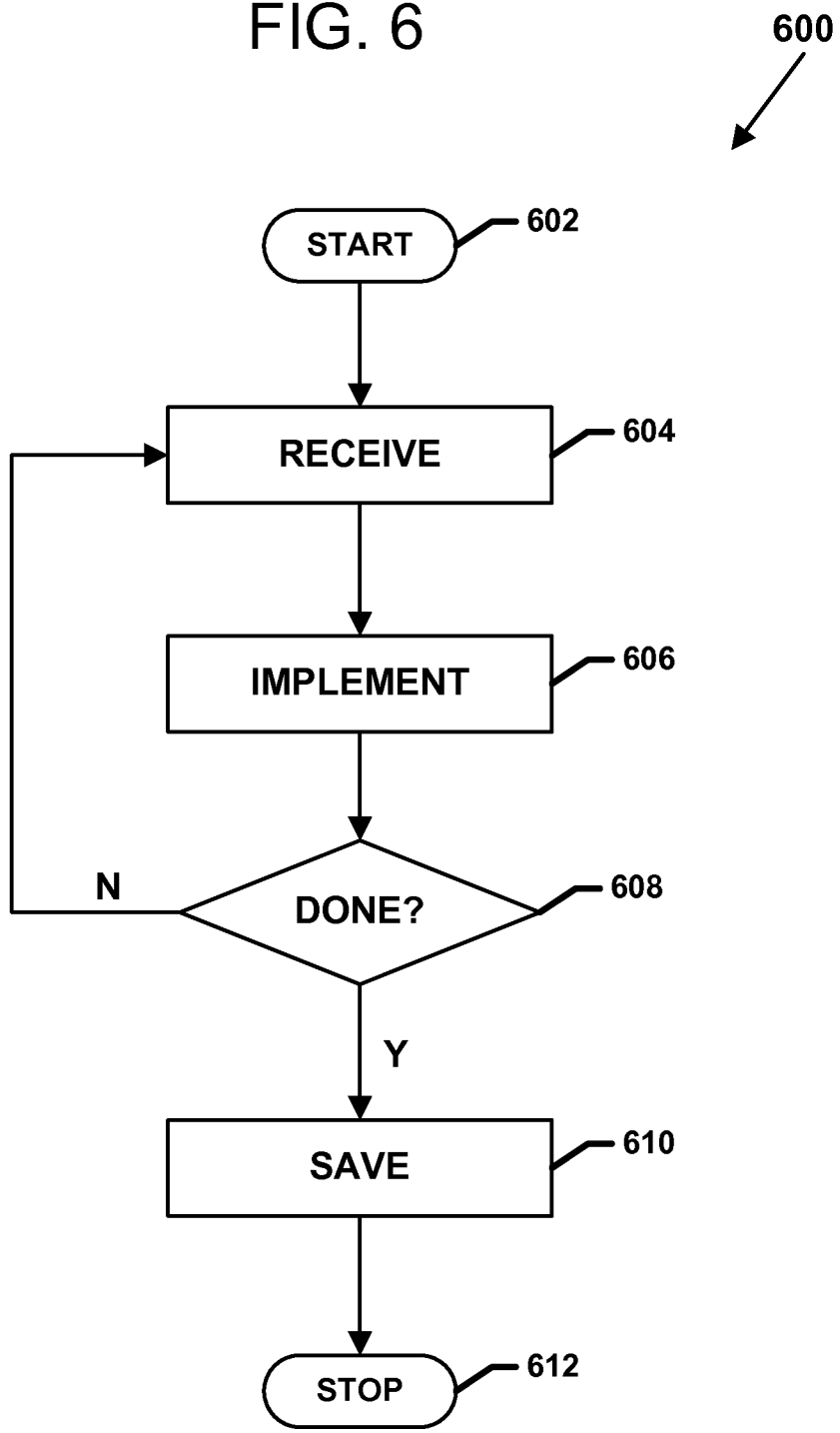
FIG. 6 is a flowchart illustrating an operational flow for an example editing process by which the continuation operation of FIG. 5 may be implemented in accordance with the principles of the disclosure.

FIG. 6 is a flowchart illustrating an operational flow for an example editing process 600 by which the continuation operation 516 of FIG. 5 may be implemented. The editing process 600 initializes and begins at a start module 602 and proceeds to a receive operation 604. The receive operation 604 obtains editing instructions from the user. For example, the receive operation 604 may receive user input through an input device, such as input device 430 of FIG. 4.

The editing instructions indicate changes to content and/or metadata of the merged version of the user copy of the data file. For example, the editing instructions may indicate a data unit (e.g., a paragraph, a column, a table, a slide, a graphic, etc.) of the new data file should be added, deleted, or revised. The editing instructions also may indicate a change in metadata (e.g., a change in content locks, etc.). An implement operation 606 performs the editing operation on the new copy of the document.

A determination module 608 determines whether the user has indicated a desire to stop editing. For example, in a first embodiment, the determination module 608 may determine the user has chosen to resolve editing conflicts. In another embodiment, the determination module 608 determines the user has chosen to close the new copy of the data file or to synchronize the new copy with the master copy of the data file. In another embodiment, the determination module 608 may determine the user has chosen to continue editing the new copy of the data file.

If the determination module 608 determines the user has chosen to continue editing the data file, then the editing process 600 cycles back to the receive operation 604 and begins again. If the determination module 608 determines the user has chosen to stop editing the data file, however, then a save operation 610 stores any changes made by the user. Generally, the save operation 610 stores the merged version of the data file including any changes made by the user in a location other than the master copy of the data file. In one embodiment, the save operation 610 stores the merged version of the data file in local memory (e.g., a local cache). In another embodiment, the save operation 610 may store the merged version of the data file on a storage device separate from the master copy. The editing process 600 completes and ends at a stop module 612.

Figure 7:
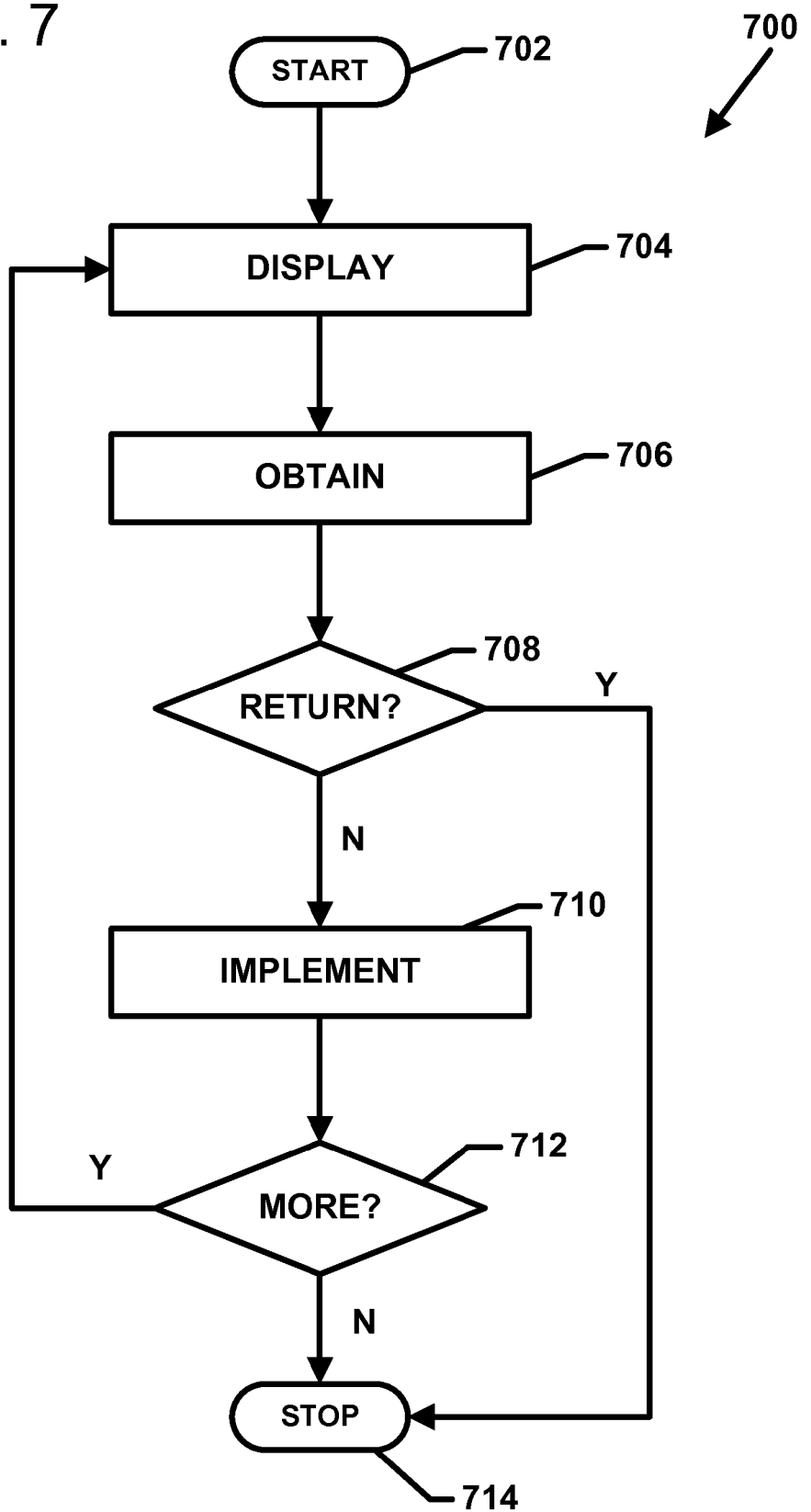
FIG. 7 is a flowchart illustrating an operational flow for an example review process by which one or more editing conflicts may be reviewed and optionally resolved in accordance with the principles of the disclosure.

FIG. 7 is a flowchart illustrating an operational flow for an example review process 700 by which one or more editing conflicts may be reviewed and optionally resolved. For example, the review process 700 is one example process for implementing the review process 518 of FIG. 5. The review process 700 initializes and begins at a start module 702 and proceeds to a display operation 704. The display operation 704 presents the editing conflicts to the user. In one embodiment, the editing conflicts are provided within the context of the merged version of the data file.

In some embodiments, the display operation 704 displays all conflicting edits from both the master copy and the user copy. For example, in one embodiment, the display operation 704 may display content resulting from the conflicting editing operations as merged into the user copy of the data file. In another embodiment, the display operation 704 may display content resulting from the conflicting editing operations as merged into the master copy of the data file. In another embodiment, the display operation 704 may display content resulting from the conflicting editing operations as merged into the version of the data file prior to any intervening changes.

In one embodiment, if conflicting editing operations are made to the same object (e.g., a character, a word, a paragraph, a graphic, a slide, a cell, a row, a column, etc.) within the data file, then the display operation 704 will display the object transformed by both editing operations. In another embodiment, the display operation 704 will display two copies of the object, one copy representing the version of the object found in the master copy of the data file and the other copy representing the version of the object found in the user copy of the data file.

In one embodiment, the display operation 704 displays the conflicting content as annotations to the non-conflicting content of the merged version of the data file. For example, in one embodiment, conflicting content added to the data file, either in the master copy or in the user copy, may be shown added to the non-conflicting content and annotated to indicate the conflicting content was inserted in one version of the data file. In another embodiment, conflicting content removed from the data file, either in the master copy or in the user copy, may be shown added to the non-conflicting content and annotated to indicate the conflicting content was deleted in one version of the data file. Additional disclosure relating to the display of conflicting edits will be provided herein.

An obtain operation 706 receives authoring instructions from the user. For example, the obtain operation 706 may receive user input through an input device, such as input device 430 of FIG. 4. A first determination module 708 determines whether the user has provided instructions to return to continuing to edit the data file freely instead of continuing to review editing conflicts. For example, in one embodiment, the first determination module 708 may determine the user has selected a toggle interface, which will be disclosed in greater detail herein. In another embodiment, the first determination module 708 may determine the user has provided instructions to accept or reject one or more of the conflicting editing operations.

If the first determination module 708 determines the user has provided instructions to return to editing, then the review process 700 completes and ends at a stop module 714 even if identified editing conflicts remain unresolved. If the first determination module 708 determines the user has not provided instructions to return to editing, however, then an implement operation 710 performs the user instructions. In general, the implement operation 710 may accept or reject each editing operation in accordance with the instructions provided by the user. For example, in one embodiment, the implement operation 710 may instantiate a conflicting editing operation into the merged version of the data file if the user provides instructions to accept the editing operation. In another embodiment, the implement operation 710 may remove the effects of a rejected editing operation from the merged version of the data file. Additional details regarding performance of the implement operation 710 are provided herein.

A second determination module 712 determines whether any identified editing conflicts remain unresolved. In one embodiment, the second determination module 712 does not determine whether any new editing conflicts have been created since the most recent identification of editing conflicts (e.g., through updates received from the master copy, through additional editing operations performed by the user, etc.). Rather, the second determination module 712 determines whether any of the editing conflicts already identified remain unresolved. In another embodiment, the second determination module 712 determines whether any new editing conflicts exist.

If the second determination module 712 determines at least one identified editing conflict remains unresolved, then the resolution process 700 cycles back to the first determination module 708. If the second determination module 712 determines the identified editing conflicts have been resolved, however, then the resolution process 700 completes and ends at the stop module 714.

In general, the user interface displayed by the authoring application on the user device, such as authoring application 130 on user device 110 of FIG. 2, may change based on whether one or more editing conflicts have been identified by the authoring application. In some embodiments, the authoring application may display alerts indicating the existence of editing conflicts to the user. For example, in one embodiment, a status bar may indicate the existence of editing conflicts. In another embodiment, a message box providing indicia indicating consequences of the editing conflicts may be displayed to the user. For example, the message box may indicate content cannot be synchronized until the identified editing conflicts are resolved.

In addition, when an editing conflict is identified, the user interface of the authoring application may be configured to toggle between showing editing conflicts and hiding editing conflicts at the discretion of the user. In general, the user interface of the authoring application enables free editing of the data file both when editing conflicts are shown and when editing conflicts are hidden. The user interface enables additional functionality enabling review and resolution of editing conflicts when the user chooses to view editing conflicts.

Figure 8:
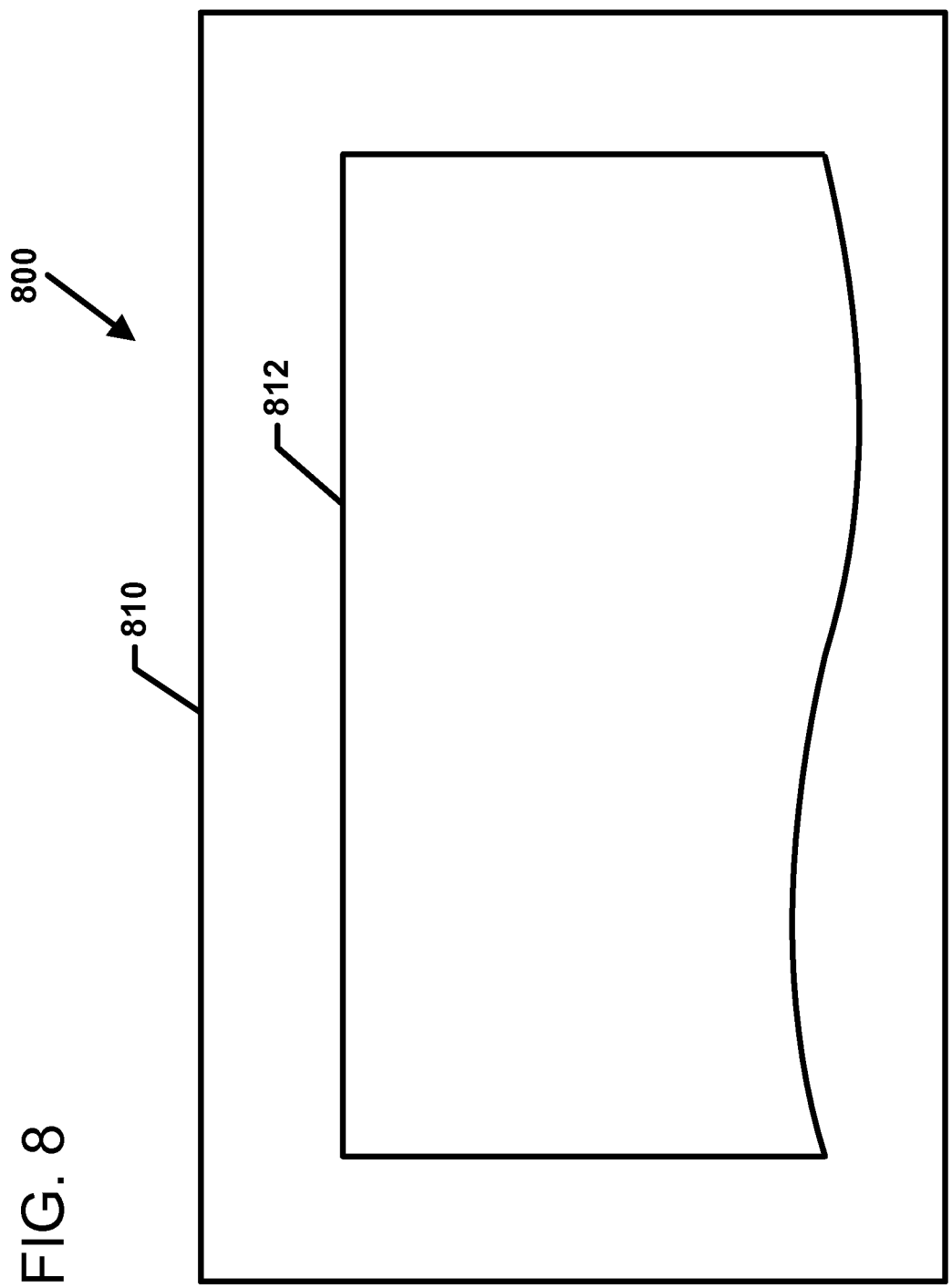
FIG. 8 illustrates an example user interface that is displayed to a user when no unresolved editing conflicts have been identified in accordance with the principles of the disclosure.
Figure 9:
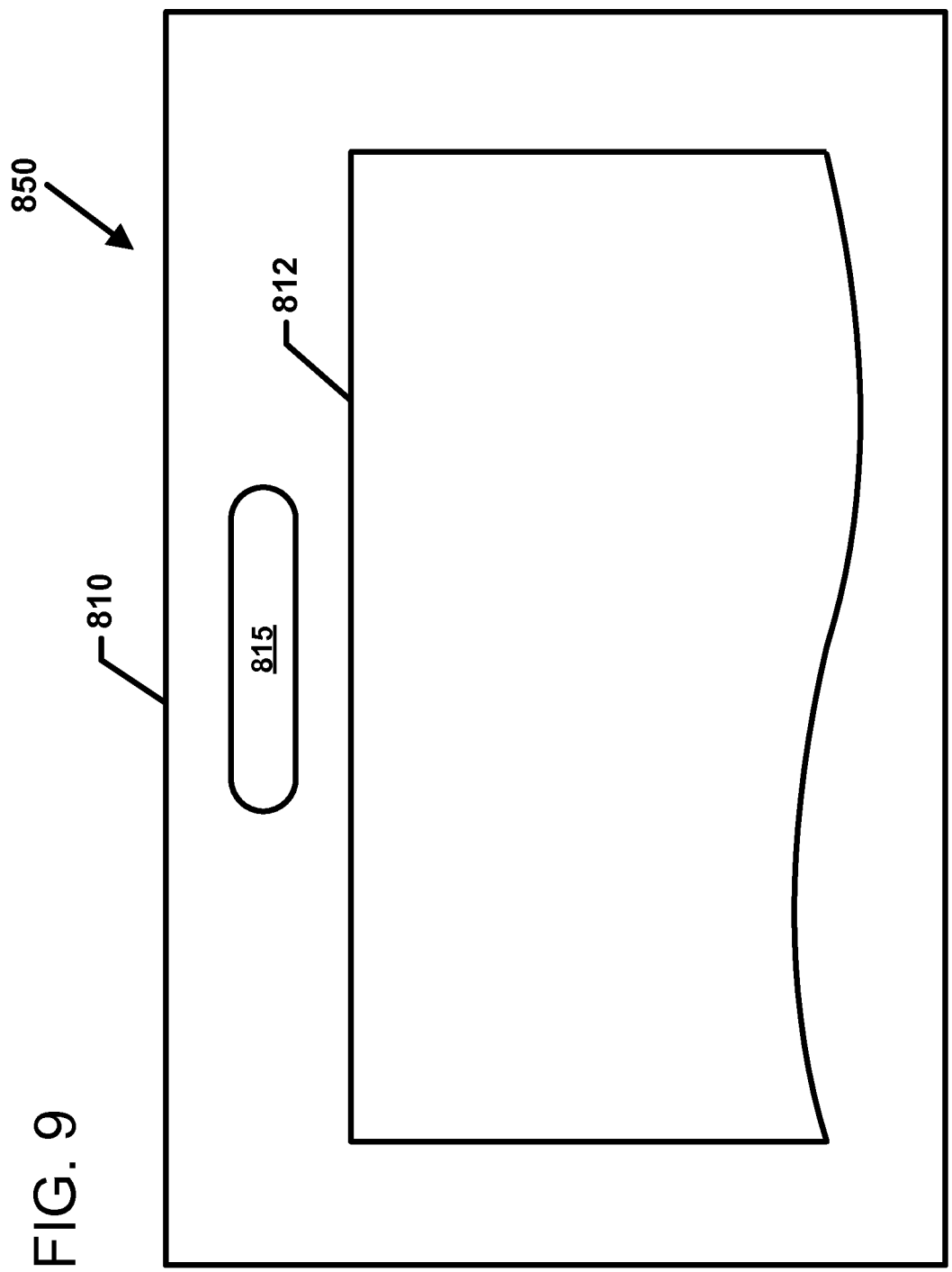
FIG. 9 illustrates an example user interface displayed to a user when at least one editing conflict has been identified in accordance with the principles of the disclosure.
Figure 10:
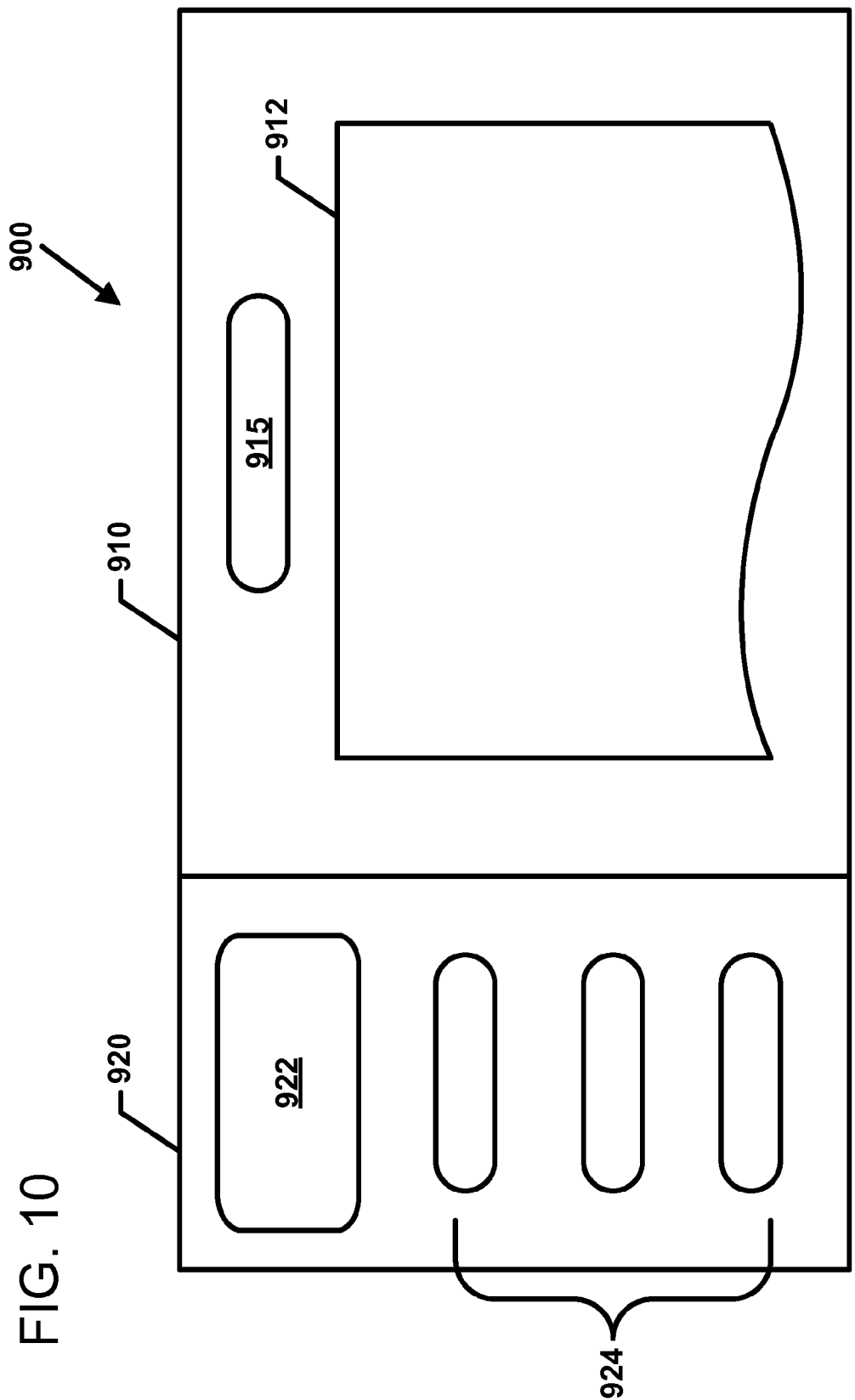
FIG. 10 illustrates an example user interface that is displayed to a user when at least one editing conflict has been identified and the user has chosen to review the identified editing conflict in accordance with the principles of the disclosure.

FIGS. 8-10 are schematic block diagrams illustrating example user interfaces that an authoring application may display to a user to enable authoring and synchronization of a data file. FIG. 8 illustrates an example user interface 800 that is displayed to a user when no unresolved editing conflicts have been identified. For example, the authoring application may display user interface 800 when the editing operation 304 of FIG. 3 is being performed.

The user interface 800 includes an authoring window 810 in which the user copy of the data file may be displayed. In one embodiment, the authoring window 810 includes an editing area 812 in which the content of the user copy is displayed. Metadata of the data file (e.g., content locks) also may be displayed in the editing area 812. The user of the authoring application may interact with the content in the editing area 812 to add, delete, or revise the displayed content.

FIG. 9 illustrates an example user interface 850 displayed to a user when at least one editing conflict has been identified. For example, the authoring application may display the user interface 850 when the user chooses to continue editing the data file instead of resolving conflicts (e.g., see first determination module 516 of FIG. 5). In one embodiment, the user interface 850 is displayed when the editing process 600 of FIG. 6 is being performed.

The user interface 850 includes the authoring window 810 of FIG. 8 having the editing area 812 in which the content and metadata of the data file may be displayed and/or edited. The user interface 850 also includes a toggle interface 815. In general, selection of the toggle interface 815 by the user will cause the user interface to display identified editing conflicts. In one embodiment, selection of the toggle interface 815 also will activate a conflict resolution interface.

FIG. 10 illustrates an example user interface 900 that is displayed to a user when at least one editing conflict has been identified and the user has chosen to review the identified editing conflict. The user interface 900 also may enable resolution of the identified editing conflicts. For example, the authoring application may display the user interface 900 when the user chooses to review editing conflicts (see first determination module 514 of FIG. 5). Accordingly, in one embodiment, the user interface 900 is displayed when the review process 700 of FIG. 7 is being performed.

The user interface 900 also includes a toggle interface 915 by which the user may hide identified editing conflicts. In one embodiment, selection of the toggle interface 915 also will deactivate the conflict resolution interface 920. For example, selection of the toggle interface 915 may cause the user interface 850 of FIG. 9 to be displayed to the user instead of the user interface 900.

The user interface 900 includes an authoring window 910 having an editing area 912 in which the content and metadata of the data file may be displayed and/or edited. The editing area 912 also displays identified editing conflicts or content resulting from identified editing conflicts. For example, in one embodiment, the editing area 912 may display a merged version of the data file generated by merging the user copy with the master copy.

In some embodiments, the identified editing conflicts displayed within the editing area 912 are indicated via annotations to the content resulting from the conflicting editing operations. In one embodiment, the annotations indicate how of the resulting content conflicts. For example, in one embodiment, a section of content (e.g., a word, a paragraph, a table, a column, a graphic, etc.) may be annotated to indicate the section was inserted, deleted, and/or revised in the user copy and/or the master copy. Example annotations indicating such insertion, deletion, and/or revision may include a predetermined color, a strikethrough, underlining, a predetermined opacity, highlighting, or other such indicia.

The user interface 900 also can include a summary window 920 in which the authoring application may communicate information about identified editing conflicts to the user. In some embodiments, the summary window 920 can include a summary information area 922. For example, the summary information area 922 may display the number of editing conflicts identified by the authoring application and remaining unresolved. The summary information area 922 also may indicate the number of mergeable and unmergeable editing conflicts. In one embodiment, the summary information area 922 may be refreshed (i.e., updated) as the editing conflicts are resolved.

In some embodiments, the summary window 920 also may display a listing 924 of any unresolved editing conflicts. For example, in one embodiment, all conflicting content (e.g., content added, deleted, and/or revised in the user copy or the master copy) is listed within the summary window 920. In one embodiment, the listed content may be annotated to indicate an origin of the content (e.g., the user copy or the master copy). In another embodiment, the listed content may be annotated to indicate a type of editing action (e.g., revision, insertion, deletion, etc.) yielding the content.

The user interface 900 may be configured to enable a user to resolve the displayed editing conflicts. For example, the user interface 900 may enable the user to provide resolution instructions for one or more displayed editing conflicts. In one embodiment, the user interface 900 enables the user to provide resolution instructions for the displayed editing conflicts in accordance with a sequence. In another embodiment, the user interface 900 enables the user to provide resolution instructions for any displayed editing conflict selected by the user.

Examples of resolution instructions include an accept instruction by which the user indicates a given editing operation should be instantiated into the merged version of the data file and a reject instruction by which the user indicates the editing operation should not be performed on the merged version of the data file. Other examples of resolution instructions may include a next instruction by which the user proceeds to a subsequent editing conflict without resolving the currently selected editing conflict and a back instruction by which the user returns to a previous editing conflict without resolving the currently selected editing conflict.

In some embodiments, the user may provide a resolution instruction by interacting with one or more resolution interfaces 930. Non-limiting examples of resolution interfaces include buttons (e.g., an accept button, a reject button, a next button, etc.), drop-down menus, tabs, and other such interface tools. In one embodiment, the user interface 900 displays one or more resolution interfaces to the user when the editing conflicts are displayed. In another embodiment, the user interface 900 displays one or more resolution interfaces to the user when conflicting content is selected by the user.

For example, the user may provide a resolution instruction by selecting (e.g., via a cursor or other input interface) content within the editing area 912 that results from one of the conflicting editing operations and interacting with a resolution interface. In other embodiments, the user may provide a resolution instruction by selecting an editing operation displayed within the summary window 920 and interacting with a resolution interface to provide or select a resolution instruction.

Figure 11:
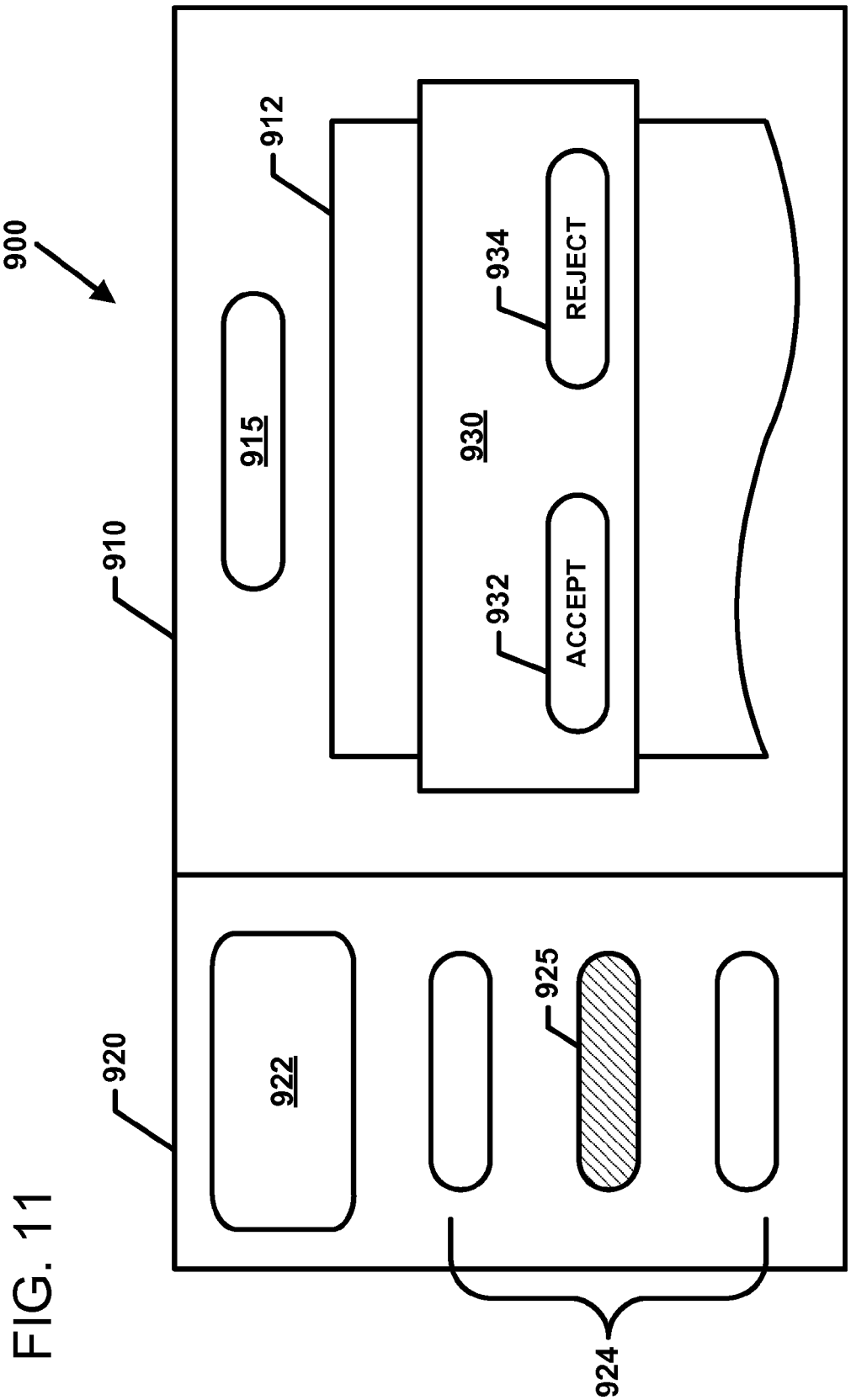
FIG. 11 is a schematic diagram of a user interface including a resolution interface that is displayed when an editing conflict is selected from the listing in the summary window in accordance with the principles of the present disclosure.

For example, in FIG. 11, the user interface 900 includes a resolution interface 930 that is displayed when an editing conflict 925 is selected from the listing 924 in the summary window 920. The resolution interface 930 shown in FIG. 11 includes an accept button 932 and a reject button 934. In other embodiments, however, the resolution interface 930 may include any desired interface tool. In the example shown in FIG. 11, the resolution interface 930 is displayed as a pop-up window. In other embodiments, however, the resolution interface 930 may include a toolbar or section thereof, a drop down menu or portion thereof, or other such display interface.

Figure 12:
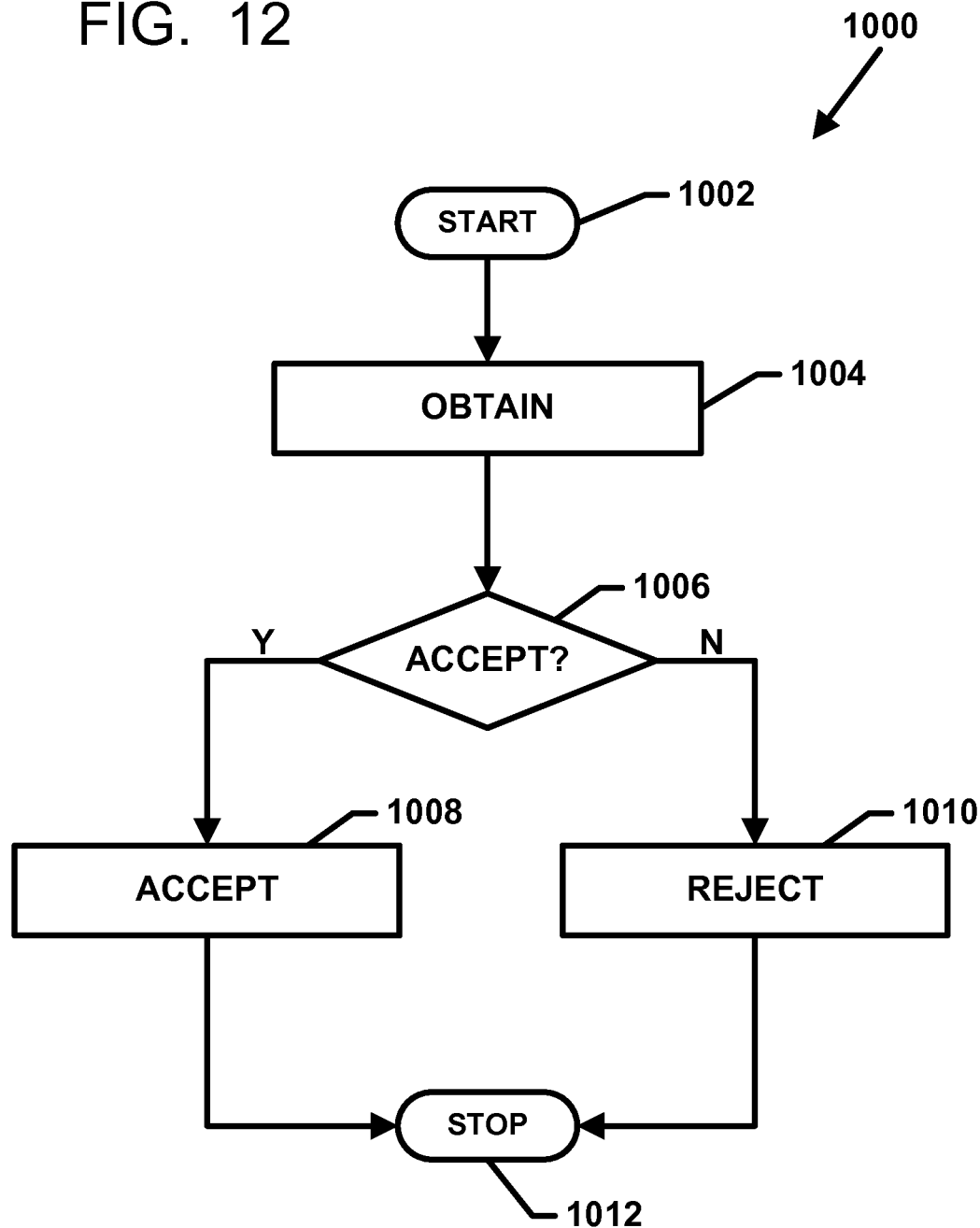
FIG. 12 is a flowchart illustrating an operational flow for an example implementation process by which the authoring application implements resolution instructions provided by the user in accordance with the principles of the disclosure.

FIG. 12 is a flowchart illustrating an operational flow for an example implementation process 1000 by which the authoring application implements resolution instructions provided by the user. The implementation process 1000 initializes and begins at a start module 1002 and proceeds to an obtain operation 1004. The obtain operation 1004 receives a resolution instruction from the user for resolving conflicting content. For example, the obtain operation 1004 may determine a given section of conflicting content has been selected by the user and a particular button, menu option, or other resolution interface tool has been selected by the user.

A determination module 1006 determines whether the resolution instruction indicates the selected conflicting content is to be accepted or rejected. If the determination module 1006 determines the obtain operation 1004 receives an accept instruction, then the implementation process 1000 proceeds to an accept operation 1008. If the determination module 1006 determines the obtain operation 1004 receives a reject instruction, however, then the implementation process 1000 proceeds to a reject operation 1010. Details regarding example processes for implementing the accept and reject operations 1008, 1010 are discussed below with reference to FIGS. 13 and 14. The implementation process 1000 completes and ends at a stop module 1012.

Figure 13:
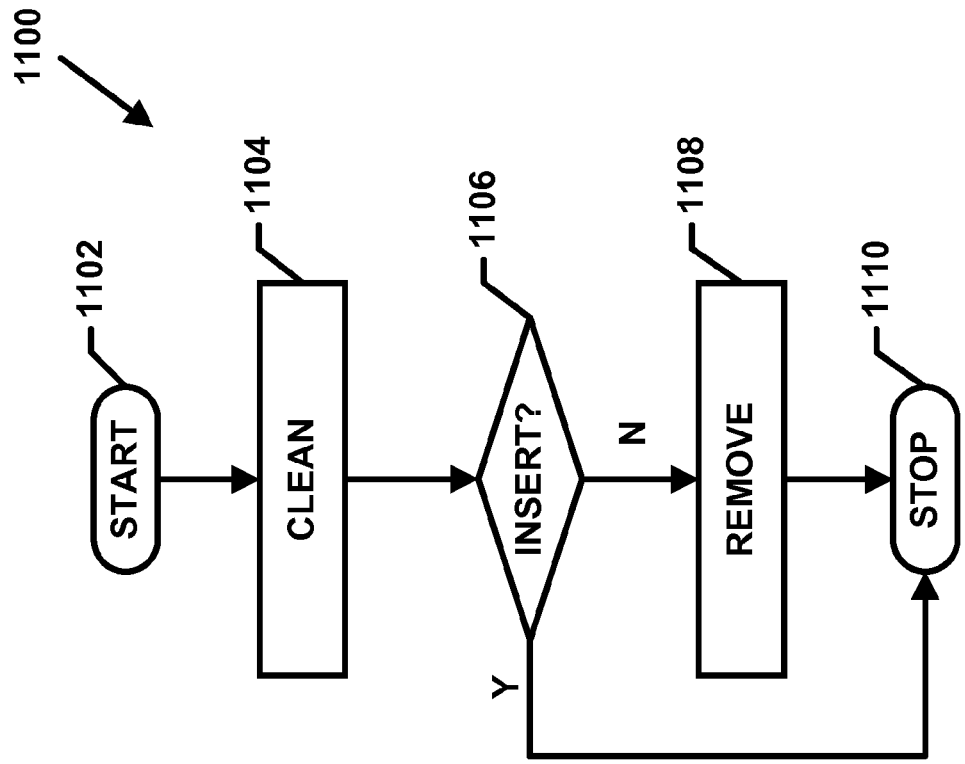
FIG. 13 is a flowchart illustrating an operational flow for an example accept process by which an accepted editing operation may be instantiated into the merged version of the data file in accordance with the principles of the disclosure.

FIG. 13 is a flowchart illustrating an operational flow for an example accept process 1100 by which an accepted editing operation may be instantiated into the merged version of the data file. The accept process 1100 initializes and begins at a start module 1102 and proceeds to a clean operation 1104. The clean operation 1104 removes any annotations or other indicia from the accepted content. For example, any underlining, strikethroughs, coloring, or other such annotations of the accepted content are removed from the merged version of the data file.

A determination module 1106 determines whether or not the accepted content resulted in content and/or formatting being added into the data file. For example, in one embodiment, the determination module 1106 determines whether or not the accepted content includes a character, word, table, column, graphic, or other data unit to the data file. In another embodiment, the determination module 1106 determines whether the accepted content added any formatting (e.g., bold, underlining, font color, highlighting, etc.) to the data file.

If the determination module 1106 determines the accepted editing operation resulted in content and/or formatting being added, then the accept process 1100 complete and ends at the stop module 1110. If the determination module 1106 determines the accepted editing operation removes content and/or formatting from the data file, however, then a remove operation 1108 deletes the content and/or formatting from the merged version of the data file. The accept process 1100 completes and ends at the stop module 1110 after completion of the remove operation 1108.

Figure 14:
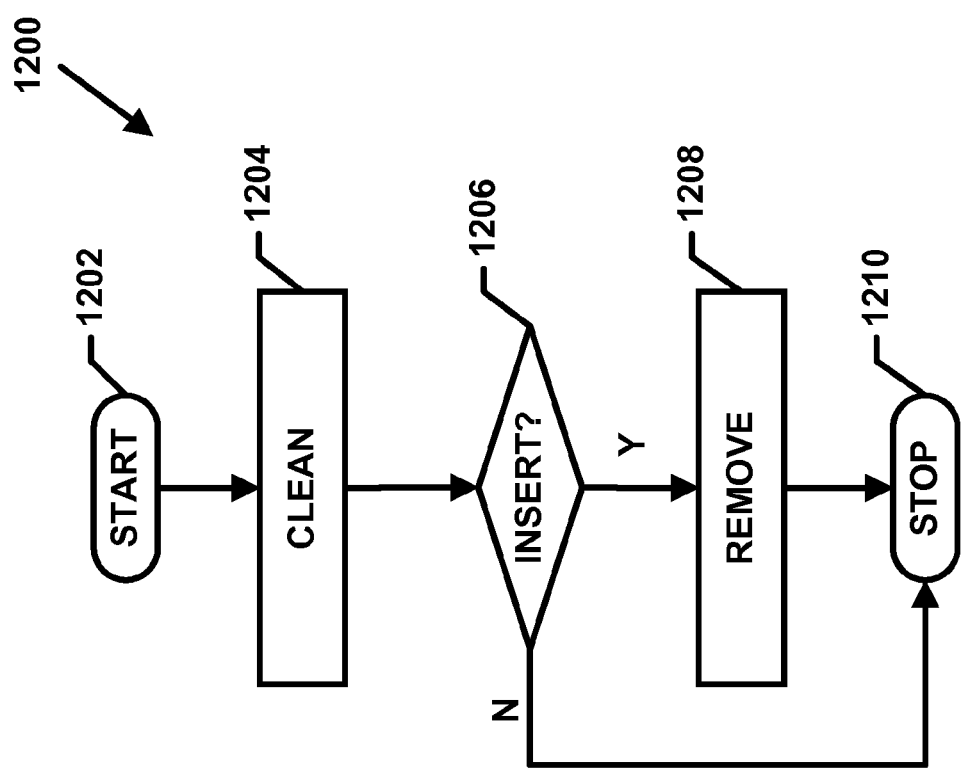
FIG. 14 is a flowchart illustrating an operational flow for an example reject process by which a rejected editing operation may be removed from or undone within the merged version of a data file in accordance with the principles of the disclosure.

FIG. 14 is a flowchart illustrating an operational flow for an example reject process 1200 by which a rejected editing operation may be removed from or undone within the merged version of a data file. The reject process 1200 initializes and begins at a start module 1202 and proceeds to a clean operation 1204. The clean operation 1204 removes any annotations or other indicia from the content resulting from the rejected editing operation. For example, any underlining, strikethroughs, coloring, or other such annotations of the content are removed from the merged version of the data file.

A determination module 1206 determines whether or not the rejected editing operation would have resulted in content and/or formatting being added to the data file. For example, in one embodiment, the fourth determination module 1206 determines whether or not the rejected editing operation would have added a character, word, row, cell, or other data unit or content object to the data file. In another embodiment, the determination module 1206 determines whether the rejected editing operation would have added any formatting (e.g., bold, underlining, font color, highlighting, etc.) to the data file.

If the determination module 1206 determines the rejected editing operation would not have resulted in content and/or formatting being added to the data file, then the reject process 1200 complete and ends at the stop module 1210. If the determination module 1206 determines the rejected editing operation would have added content and/or formatting, however, then a remove operation 1208 deletes the content and/or formatting from the merged version of the data file. The reject process 1200 completes and ends at the stop module 1220 after completion of the remove operation 1208.

The principles of the present disclosure can be better understood by walking through example applications. In a first example application, FIGS. 15-22 illustrate changes to an example user interface displayed by an authoring application as a first user is editing a user copy of a data file online. In a second example application, FIGS. 23-29 illustrate changes to an example user interface displayed by an authoring application as a first user is editing a user copy of a data file offline.

Figure 15:
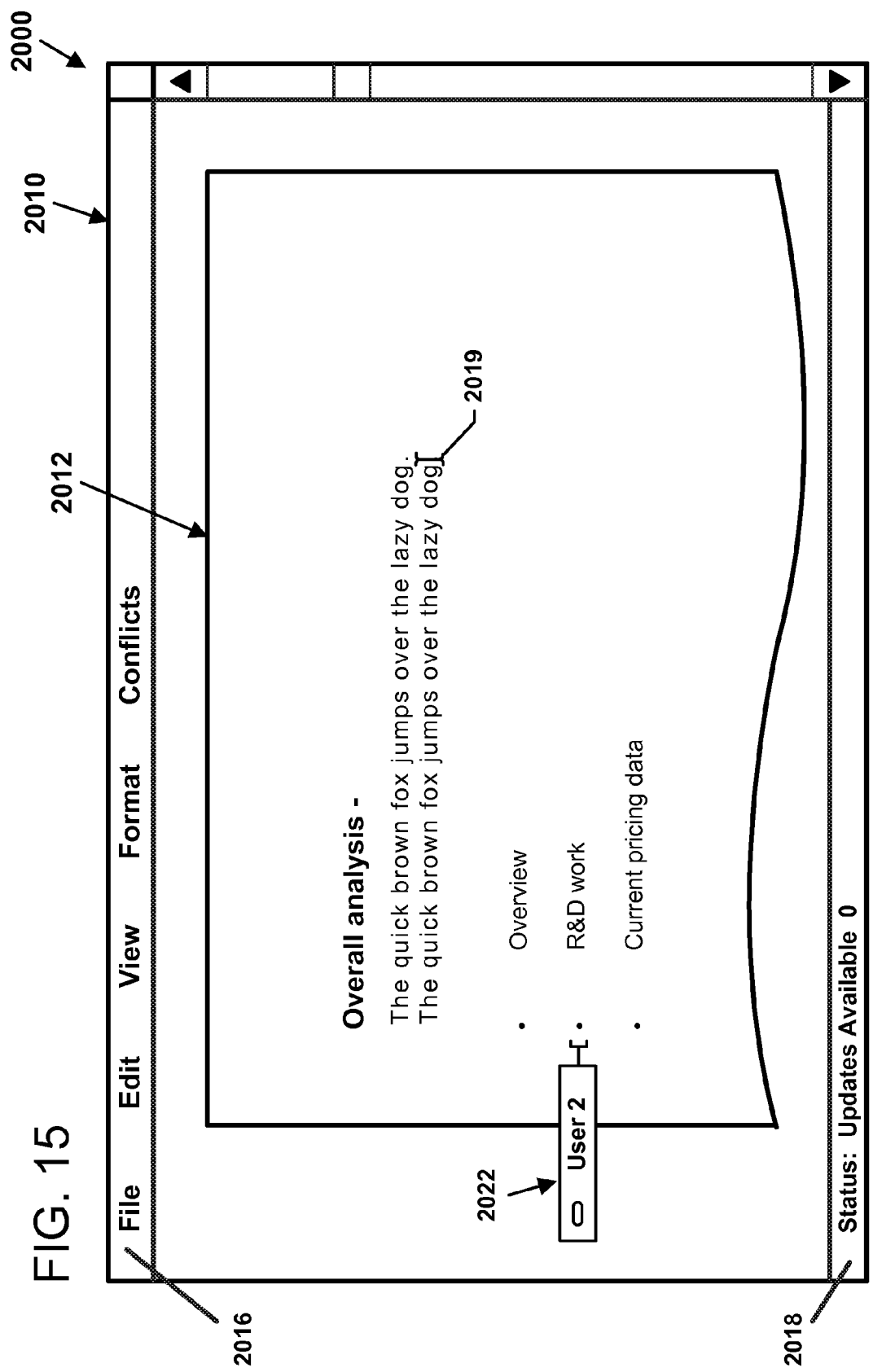
FIGS. 15-22 illustrate changes to an example user interface displayed by an authoring application as a first user is editing a user copy of a data file online in accordance with the principles of the disclosure.

In FIG. 15, a user interface 2000 of an authoring application includes a display window 2010 including an editing area 2012 displaying content of the user copy of the data file, a command toolbar 2016 providing command options, and a status bar 2018 indicating a status of the user copy of the data file. For example, the status bar 2018 may indicate when content updates are available for instantiation into the user copy of the data file. The status bar 2018 also may indicate when editing conflicts have been identified. In the example shown, the status bar 2018 indicates no content updates are available from the master copy of the data file.

The authoring application enables editing of the user copy of the data file, for example, using the example authoring process 300 of FIG. 3. In the example shown, the authoring application enables the first user to edit the user copy of the data file freely (see edit operation 304 of FIG. 3) within the editing area 2012 of the display window 2010. In FIG. 15, the first user is editing a first data unit of content displayed in the editing area 2012. The first user has arranged a cursor 2019 over the first data unit to enable editing of the first data unit. A second user has obtained a lock 2022 on a second data unit of content within the editing area 2012. The lock 2022, which is displayed within the editing area 2012, inhibits the first user from freely editing the second data unit.

Figure 16:
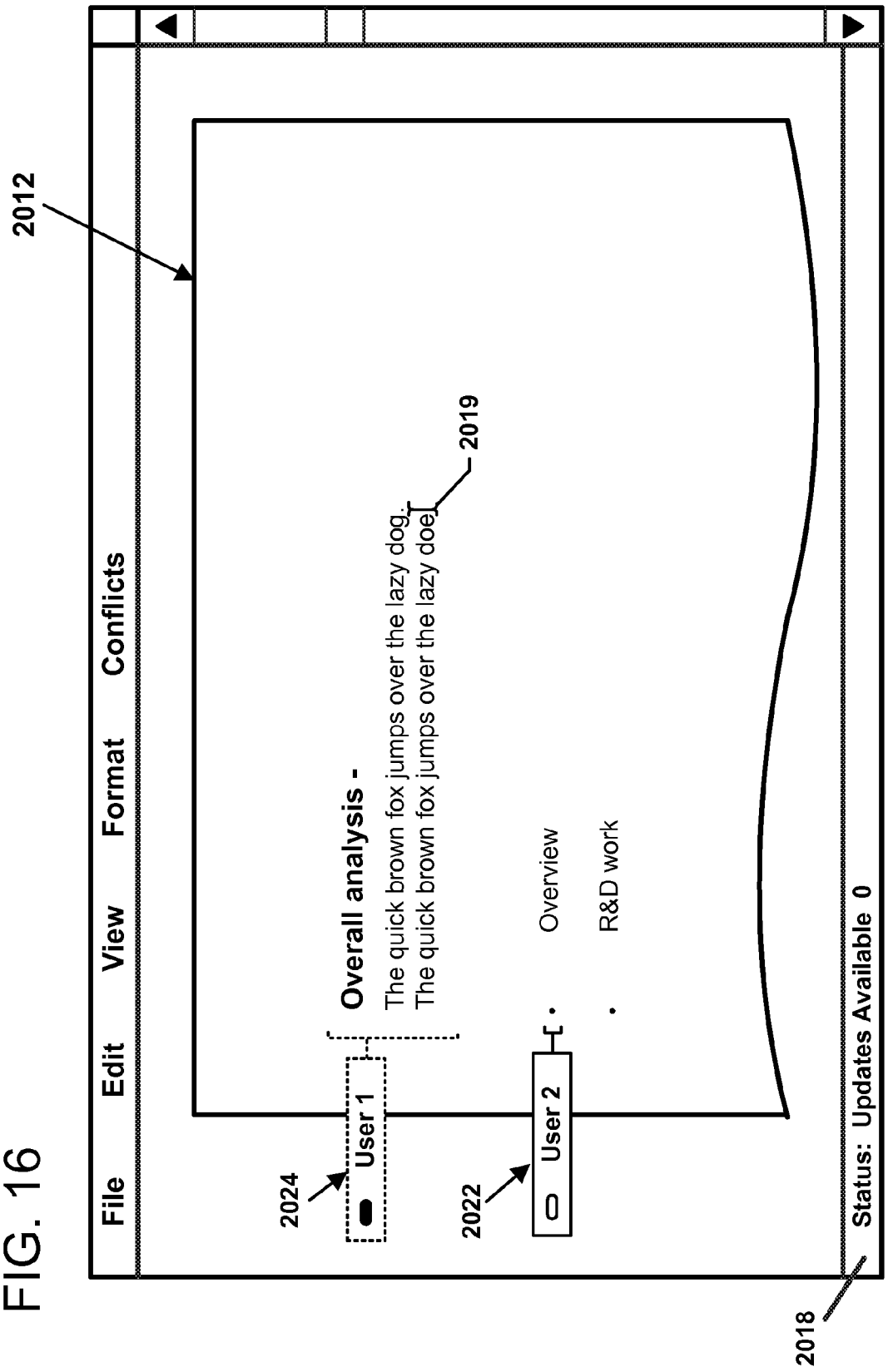

In FIG. 16, the first user has edited the first data unit to change the word "dog" to "doe". In one embodiment, changing the word "dog" to "doe" includes providing an editing operation to delete the word "dog" and an editing operation to insert the word "doe". In another embodiment, changing the word "dog" to "doe" includes providing an editing operation to delete the character "g" and an editing operation to insert the character "e". In other embodiments, other editing operations may be utilized to achieve the same results.

In one embodiment, editing of the first data unit initiates a transmission to the master copy of the data file of a request by the first user to lock the first data unit. In another embodiment, the first user may provide express instructions to lock the first data unit. For example, the first user may select the first data unit and select a lock option on the user interface 2000. Accordingly, a lock 2024 owned by the first user has been placed around the first data unit in FIG. 16. In the example shown, the lock 2024 is distinguished from the lock 2022 owned by the second user. For example, the lock 2024 owned by the first user is displayed in dotted lines and the lock 2022 owned by the second user is displayed in solid lines. Distinguishing locks owned by the first user from locks owned by other users may enable the first user to know which data unit the first user has locked without deterring the first user from editing the data unit. In one embodiment, each user may have a distinct lock (e.g., each user's lock may have a distinct color, shading, formatting, etc.).

In FIG. 16A, the authoring application obtains updates indicating intervening changes made to the master copy of the data file (see receive operation 306 of FIG. 3). In one embodiment, the authoring application receives the update after a predetermined interval of time elapses. In another embodiment, the authoring application receives the update in response to a request to synchronize the user copy with the master copy. For the purposes of this example application, the authoring application is assumed to have received the update automatically after a predetermined time interval. The status bar 2018 of the display window 2010 has been updated in FIG. 16A to indicate an update has been received.

In one embodiment, the authoring application receives a metadata update from the master copy. In another embodiment, the authoring application receives a content update from the master copy. In the example application, the authoring application receives both a metadata update and a content update. The metadata update indicates the second user has released the lock 2022 on the second data unit and has obtained a lock (see lock 2028 of FIG. 17) on the first data unit. In this example, the second user synchronized a lock request for the first data unit with the master copy before the first user. Accordingly, the second user was awarded the lock on the first data unit. The metadata update also indicates a third user has obtained a third lock 2026 on the third data unit. The content update indicates the second user has edited the first data unit to change the word "lazy" to "lively".

When the authoring application receives the update, the authoring application determines whether any editing conflicts exist between the user copy and the received update. If no editing conflicts exist, then the authoring application instantiates the metadata updates automatically (see update operation 308 of FIG. 3). In the example application, the metadata update indicates the third user has established a lock on the third data unit. Accordingly, the third lock 2026 is shown around the third data unit in FIG. 16A.

In one embodiment, if a metadata update conflicts with a user change, however, then the metadata update is not instantiated until the user attempts to synchronize the user copy with the master copy. In the example application, the metadata update indicates the second user has a lock on the first data unit, which conflicts with the first user's request to lock the first data unit. Accordingly, the second user's lock on the first data unit is not instantiated into the user copy automatically. In another embodiment, a release of a content lock is not instantiated until any identified editing conflicts are resolved. Accordingly, the second user's release of the lock 2022 on the second data unit is not instantiated into the user copy automatically.

If no editing conflicts exist, then the authoring application also enables the user to determine when the content updates should be instantiated (e.g., merged) into the user copy of the data file (see update operation 308 of FIG. 3). For example, the authoring application may provide an instantiation interface by which the first user may provide instructions to instantiate the update. Non-limiting examples of instantiation interfaces include buttons, menu options, and other interface tools.

If the authoring application identifies an editing conflict, however, then the authoring application inhibits the user from instantiating the updates into the user copy. In one embodiment, the authoring application does not display an instantiation interface. In another embodiment, the authoring application does not display an indication of the availability of the update. In the example application, the metadata update conflicts with a user change. Accordingly, the authoring application does not provide the first user with an opportunity to instantiate the content update.

Figure 17:
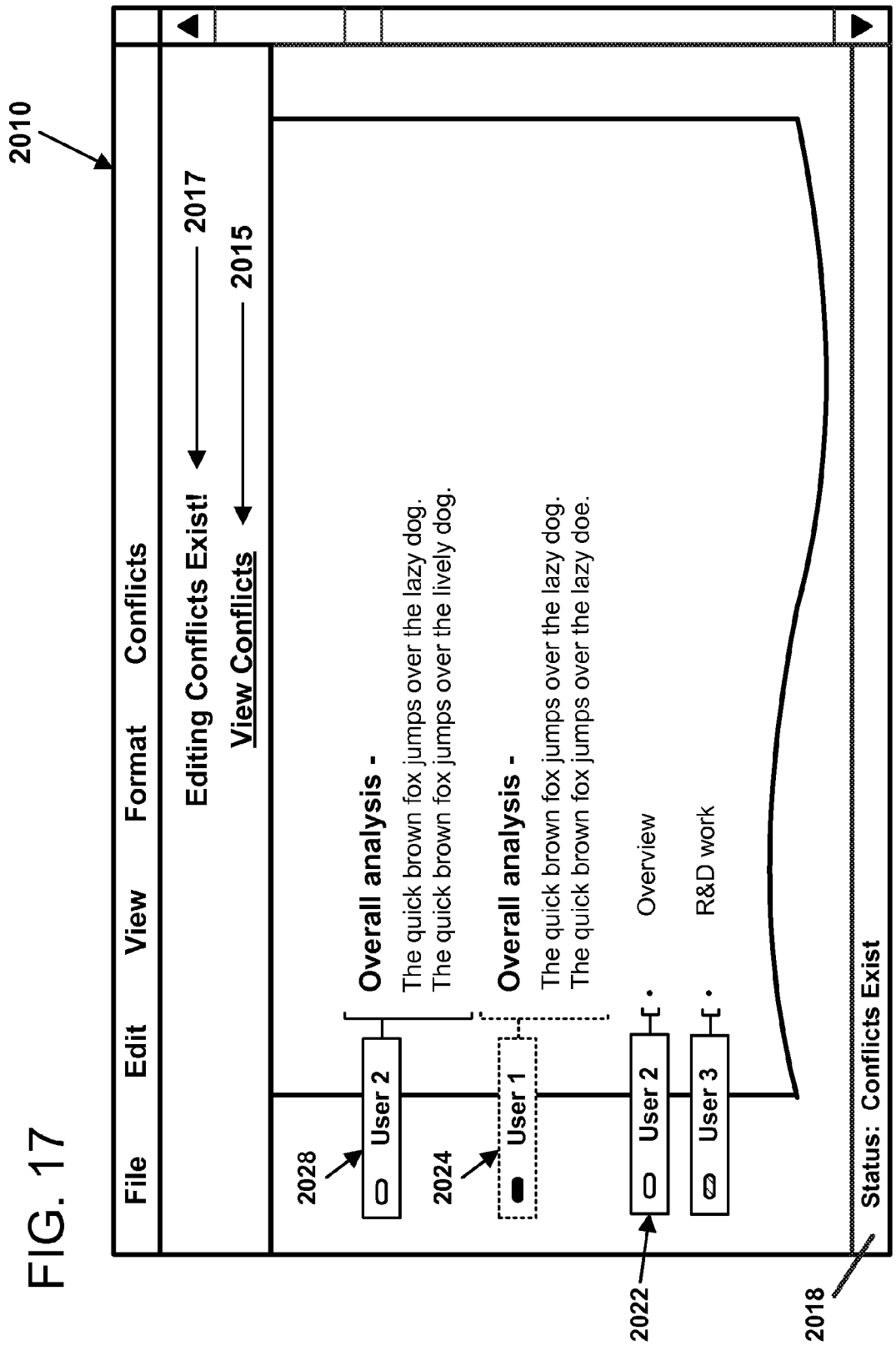

In FIG. 17, the first user instructs the authoring application to attempt to synchronize the user copy of the data file with the master copy (see synchronize operation 310 of FIG. 3). In one embodiment, the authoring application implements the synchronize process 500 shown in FIG. 5. The authoring application obtains an updates from the master copy if appropriate (see obtain operation 504 of FIG. 5) and determines whether any editing conflicts result from the update (see identify operation 506 of FIG. 5). In the example shown, the authoring application does not obtain any new updates (i.e., no intervening changes have been made to the master copy since the last update). The authoring application determines that intervening changes represented by the previously received update conflict with user changes.

The authoring application then merges the user copy of the data file with the master copy of the data file (see merge operations 508 of FIG. 5) and displays the merged copy of the data file to the first user. In the example shown, the authoring application displays the merged version of the data file in the editing area 2012 in FIG. 17. In general, the authoring application may integrate the user and master copies using any desired merge technique. For example, in one embodiment, the authoring application displays all content added to, deleted from, and/or revised in the user copy of the data file and the master copy of the data file.

In another embodiment, the authoring application may determine the version of the data file represented by the master copy and may perform any content or formatting additions, deletions, and/or revisions from the user copy on unlocked data units of the master copy version of the data file (i.e., instantiates mergeable conflicts). For unmergeable conflicts, such as user edits to data units locked on the master copy (e.g., user edits performed prior to receiving the metadata update indicating the lock), the authoring application may add a duplicate data unit adjacent the locked data unit and may revise the duplicate data unit based on the revisions made in the user copy (e.g., change content, add a content lock, etc.). Accordingly, the data unit remains locked and unchanged in accordance with the state of the master copy. However, changes to the data unit by the first user are retained in the merged version of the data file until the first user chooses to remove them.

In the example shown in FIG. 17, the first data unit is shown locked by the second user (see lock 202) and changed by editing operations performed by the second user. For example, the second occurrence of the word "lazy" has been changed to "lively". A duplicate of the first data unit has been generated and arranged adjacent the first data unit. The duplicate is locked to the first user (see lock 2024) and includes revisions made by the first user prior to the attempt to synchronize (e.g., the second occurrence of "dog" has been changed to "doe"). The second data unit is still locked to the second user in FIG. 17. In one embodiment, the authoring application only releases locks when the user copy is synchronized with the master copy. In another embodiment, the authoring application only releases locks when the locked data unit is fully synchronized. In other embodiments, the authoring application may indicate the lock has been released.

Because the authoring application has identified editing conflicts, the authoring application does not continue to save to the master copy (see first determination module 510 of FIG. 5). Rather, the authoring application displays one or more alert messages to notify the first user of the existence of the editing conflicts (see alert operation 512 of FIG. 5). For example, in FIG. 17, an alert 2017 is displayed in the display window 2010 to inform the first user of the presence of editing conflicts. In the example shown, the status bar 2018 also has been updated to indicate the presence of editing conflicts. In other embodiments, the status bar 2018 may be updated to indicate a number of updates that have not yet been instantiated, a number of editing conflicts identified, or other such information. In still other embodiments, other types of alerts or indicia may provide notice of the existence of editing conflicts to the first user.

The authoring application also presents a toggle interface 2015 to the first user in FIG. 17 to enable the user to choose between continuing to edit the data file without viewing conflicts and reviewing the editing conflicts (see second determination module 514). The first user may choose to continue editing the data file without reviewing the editing conflicts (see continue operation 516 of FIG. 5). The first user also may choose to select the toggle interface 2015 to reveal the editing conflicts (see review operation 518 of FIG. 5). In one embodiment, selection of the toggle interface 2015 also activates a summary window 2030. The first user may continue to edit the merged version of the data file regardless of whether the first user chooses to view the editing conflicts.

One example process by which the authoring application may implement the review operation 518 of FIG. 5 includes the review process 700 of FIG. 7. When the user selects the toggle interface 2015 (FIG. 17), the authoring application presents the editing conflicts to the user (see display operation 704 of FIG. 7). For example, in one embodiment, selecting the toggle interface 2015 splits the display window 2010 between the editing area 2012 and a summary window 2030 in which the editing conflicts are listed (see list 2034 of FIG. 18) and summary information about the conflicts may be displayed (see summary area 2032 of FIG. 18).

In general, the editing area 2012 displays the merged version of the data file and enables the user to freely edit the merged version. In some embodiments, the merged version of the data file displayed in the editing area 2012 is annotated to indicate which portions of content are in conflict. For example, in one embodiment, the merged version of the data file is annotated to indicate whether the conflicting content resulted from insertions (e.g., via underlining or other formatting, text color, highlighting, or other such indicia) or deletions (e.g., via strikethroughs or other formatting, text color, highlighting, or other such indicia).

Figure 18:
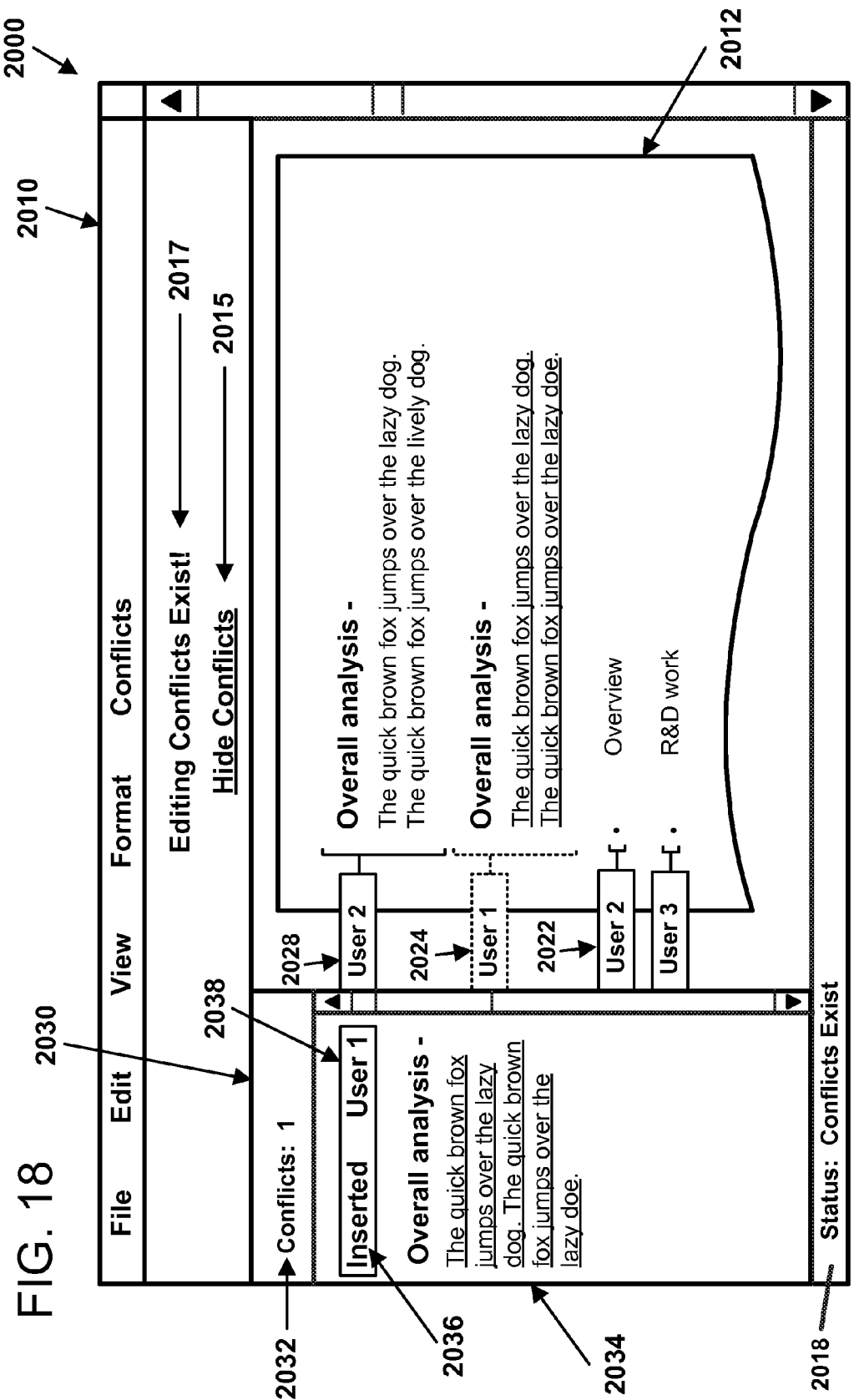

In the example shown, revisions to content are shows as a series of deletions and insertions. In other embodiments, however, revisions to content may be distinctly annotated. In other embodiments, the metadata (e.g., locks) also may be annotated to indicate which portions of metadata conflict. In the example shown in FIG. 18, the first data unit does not contain any editing conflicts since the first data unit is locked on the server to the second user. Accordingly, the first data unit is not annotated. The duplicate data unit, which is shown in FIG. 18 as locked to the first user, is underlined to indicate the data unit has been inserted into the data file.

The conflicting editing operations also are displayed by the summary window 2030. The summary area 2032 of the resolution interface indicates the number of conflicting editing operations contained within the merged version of the data file. In the example shown, the summary area 2032 indicates one conflicting editing operation has been identified. The listing 2034 of the summary window 2030 displays the conflicting content. In one embodiment, the listing 2034 displays the conflicting content separate from the non-conflicting content. In another embodiment, the listing 2034 annotates the conflicting content to indicate whether the content as inserted and/or deleted (e.g., see indicia 2036 of FIG. 18). In another embodiment, the listing 2034 annotates the conflicting content to indicate the origin (e.g., user copy or master copy) of the conflicting content (e.g., see indicia 2038 of FIG. 18).

The first user of the authoring application may interact with either the editing area 2012 or the summary window 2030 (FIG. 18) to provide instructions (see obtain operation 706 of FIG. 7) either to return to editing the data file or to resolve any of the editing conflicts displayed (see first determination module 708 of FIG. 7). For example, in one embodiment, the user may select the toggle interface 2015 again to hide the editing conflicts. Choosing to hide the conflicts removes the annotations from the editing conflicts. In one embodiment, choosing to hide the editing conflicts will cause the user interface 2000 of FIG. 17 to be displayed. The synchronize process 700 would end (see stop module 714 of FIG. 7), the authoring application would determine that at least one editing conflict remained unresolved (see first determination module 510 of FIG. 5), and the first user would again be able to choose between freely editing the data file and resolving conflicts.

Alternatively, the first user may provide instructions to accept or reject conflicting content or portions thereof. In one embodiment, the first user may select content displayed within the editing area 2012 of the display window 2010 and may select an option on a resolution interface to provide instructions to resolve the editing operation. For example, the first user may select the content on which instructions are to be provided and may select a menu option from a resolution mention 2040 (see FIG. 19). In other embodiments, the first user may provide the resolution instruction using another type of resolution interface tool.

Figure 19:
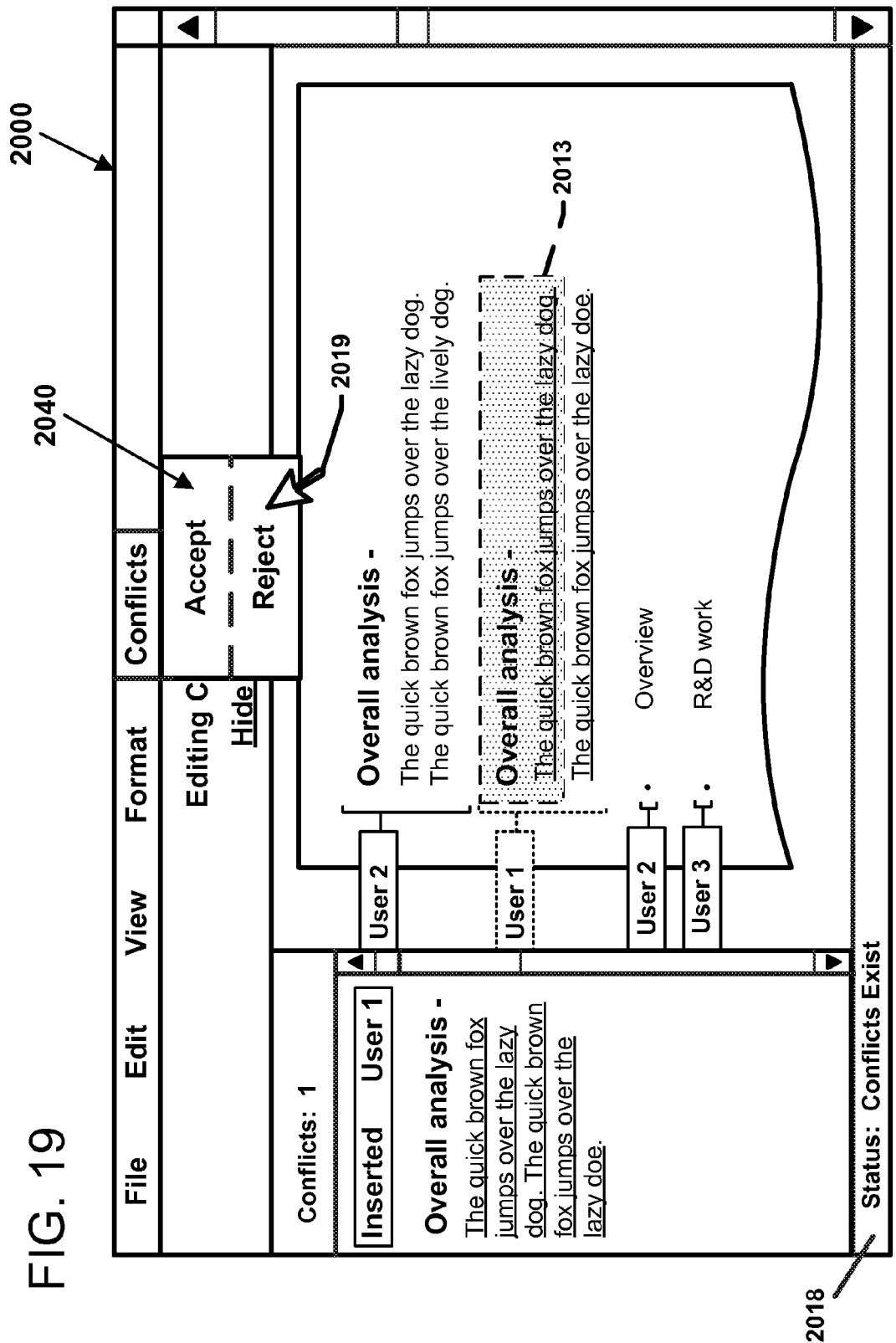

In the example shown in FIG. 19, the first user selects (see selection indicia 2013) a first portion of the conflicting content and selects a reject option on the resolution menu 2040 via the cursor 2019. Accordingly, the authoring application determines the user has not provided instructions to return to editing (see first determination module 708 of FIG. 7) and performs the resolution instruction (see implement operation 710 of FIG. 7). In other embodiments, the first user may have selected all or a different portion of the conflicting content.

One example process by which the authoring application may perform the rejection of the selected portion of the conflicting content is the reject process 1200 of FIG. 14. The authoring application removes the annotations from the selected conflicting content in the editing area 2012 of the display window 2010 (see clean operation 1204 of FIG. 14). The authoring application also determines (see determination module 1206 of FIG. 14) the rejected editing operation resulted in the selected conflicting content being added into the data file. Accordingly, the authoring application removes the selected conflicting content from the merged version of the data file (see remove operation 1208 of FIG. 14). If the editing operation had resulted in content being deleted, then the reject process 1200 would have ended without removing the selected conflicting content from the data file.

Returning to the review process 700 of FIG. 7, the authoring application determines that at least one of the identified editing conflicts remains unresolved (see second determination module 712 of FIG. 7), thereby restarting the review process 700. By restarting the review process 700, the first user may choose to continue resolving editing conflicts (e.g., using the review process 700 of FIG. 7) while the user interface is configured in the conflict resolution mode. Alternatively, the first user may choose to hide the editing conflicts at any time by selecting the toggle interface 2015.

Figure 20:
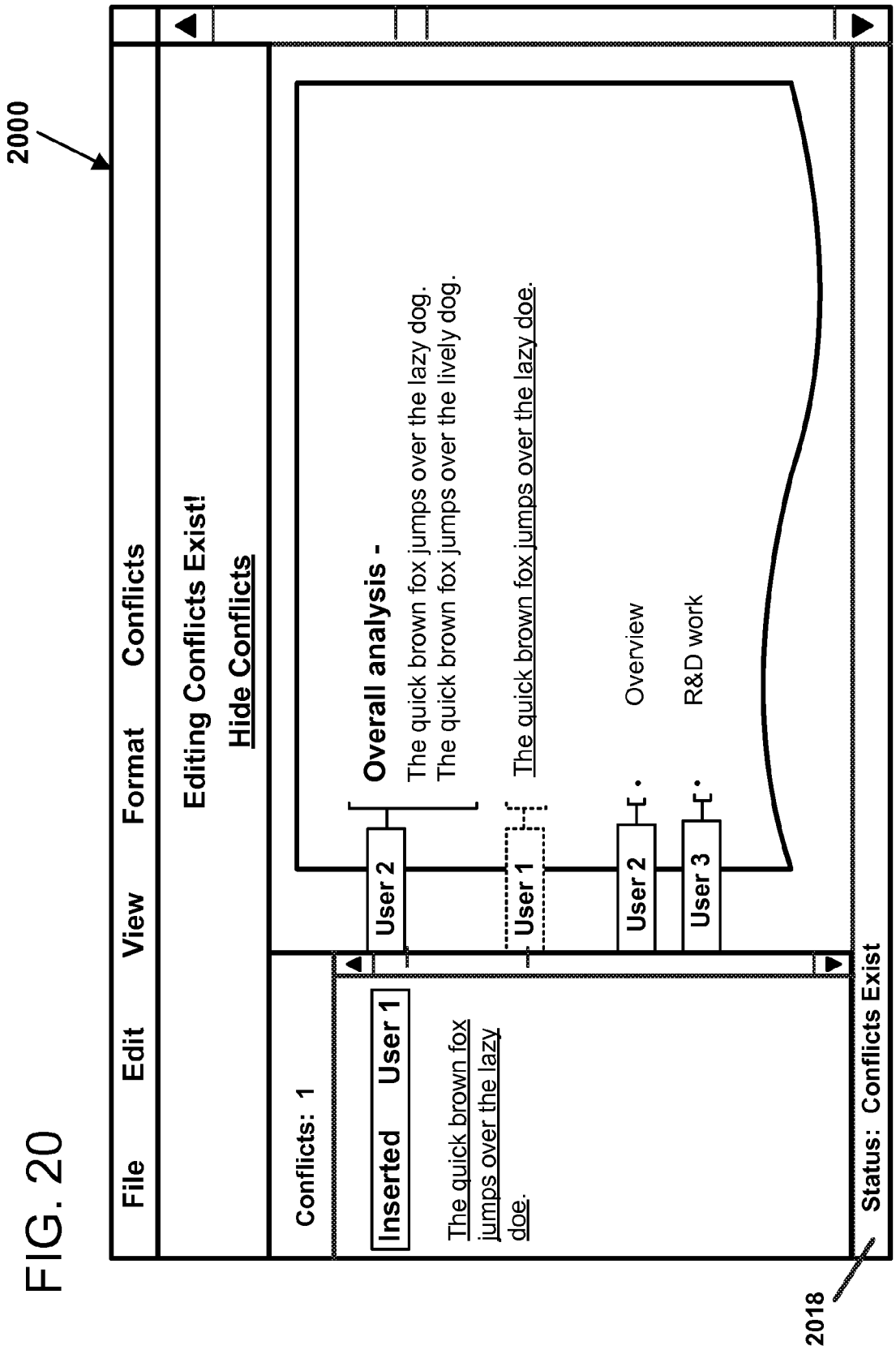

FIG. 20 shows the user interface 2000 after the first user has rejected the selected conflicting content (see display operation 704 of FIG. 7). The rejected conflicting content has been removed from the editing area 2012. Furthermore, the authoring application updates the summary window 2030 to reflect the resolution of the conflicting content by removing the rejected content from the listing 2034 within the summary window 2030. Because the conflicting content was not completely resolved, the summary area 2032 remains unchanged.

Figure 21:
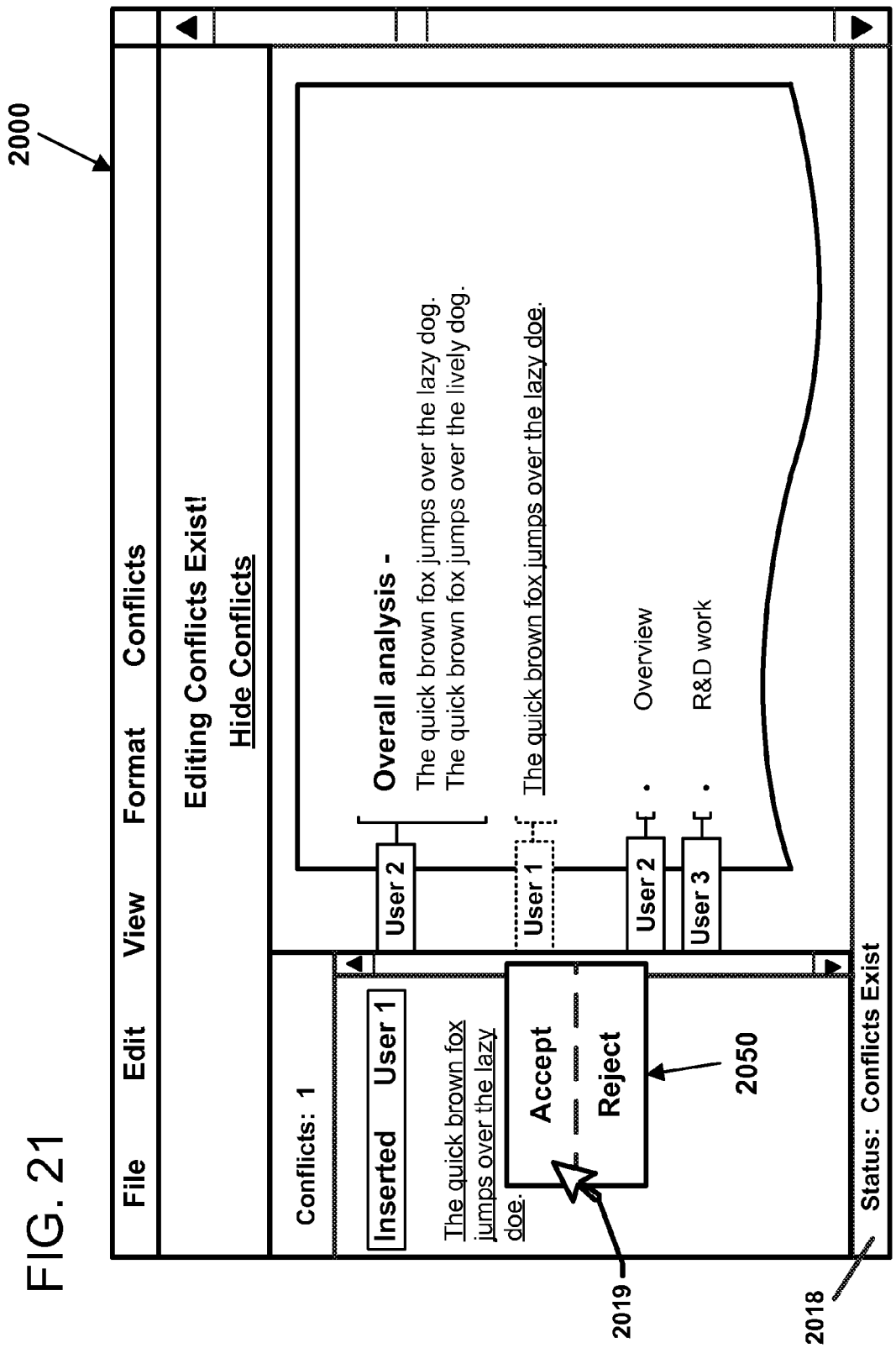
Figure 22:
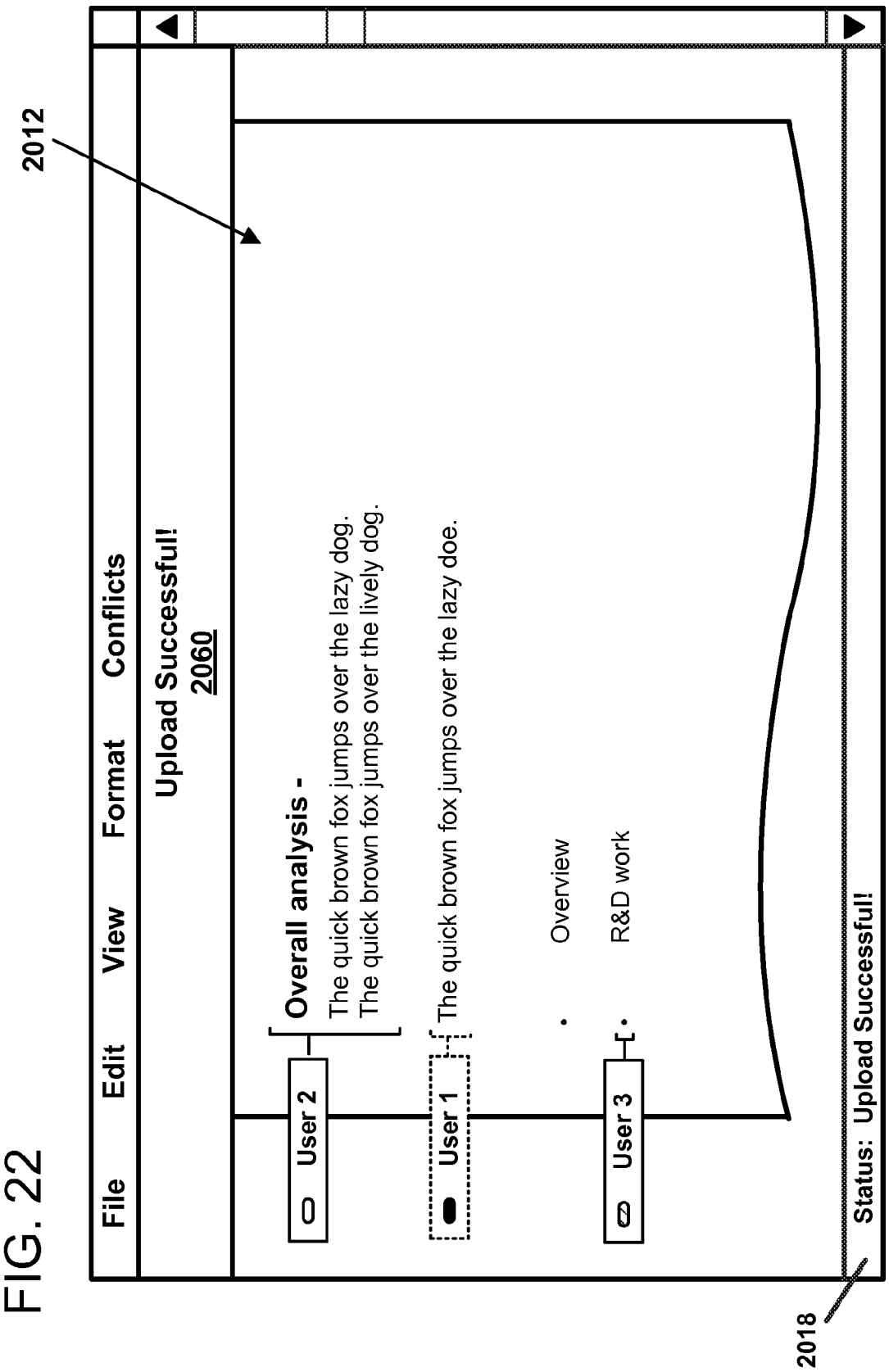

Continuing with the review process 700, the authoring application obtains another set of instructions from the first user (see obtain operation 706 of FIG. 7). In this example application, the authoring application obtains instructions to resolve the remaining conflicting content. For example, FIG. 21 illustrates another resolution interface 2050 with which the first user may provide resolution instructions to the authoring application. The resolution interface 2050 is a menu listing resolution options (e.g., accept, reject, etc.). The menu is arranged adjacent the selected conflicting content. In one embodiment, the authoring application displays the resolution interface 2050 when the user selects conflicting edits from the listing 2034 within the summary window 2030. In another embodiment, the authoring application may display the resolution interface 2050 within the editing area 2012 when conflicting content is selected within the editing area 2012. In other embodiments, however, the first user may use any desired type of resolution interface to provide resolution instructions to the authoring application.

In FIG. 21, the user selects (e.g., via a right mouse click, via a left mouse click, hovers over, or otherwise selects via another input device) the remaining conflicting content within the listing 2034 of the summary window 2030 and selects the accept option on the resolution interface 2050 (e.g., using the cursor 2019). Accordingly, the authoring application determines the first user did not provide instructions to hide the editing conflicts and return to editing (see determination module 708 of FIG. 7) and implements the accept instruction (see implement operation 710 of FIG. 7).

One example process by which the authoring application may accept the selected conflicting content includes the accept process 1100 of FIG. 13. The authoring application removes any annotations from the selected conflicting content (see clean operation 1104 of FIG. 13). The authoring application determines the selected conflicting content was inserted into the data file (see determination module 1106 of FIG. 13). Accordingly, the accept process 1100 completes and ends (see stop module 1110 of FIG. 13). If the authoring application had determined the conflicting content was deleted from the data file, then the authoring application would have deleted the conflicting content from the data file (see remove operation 1108 of FIG. 13).

Returning to the review process 700 of FIG. 7, the authoring application determines no more editing conflicts remain unresolved (see second determination module 712). Accordingly, the review process 700 completes and ends (see stop module 714 of FIG. 7), thereby completing the review operation 514 of the synchronize process 500 of FIG. 5. The synchronize process 500 proceeds back to the first determination module 510 at which the authoring application determines whether any identified editing conflicts remain unresolved.

Since the first user resolved all identified editing conflicts in this example application, the authoring application determines that no editing conflicts remain unresolved. Accordingly, the authoring application checks with the master copy to determine whether additional updates are available (see the second determination module 520 of FIG. 5). If additional updates have become available, then the synchronization process 500 cycles back to obtain and merge the new updates. The new update includes any intervening changes made since the previous update was obtained. Any conflicts stemming from the new update are resolved as discussed above. This process of obtaining updates and resolving any identified conflicts repeats until the first user has resolved all editing conflicts between the user copy of the data file and the current state of the master copy of the data file.

When the authoring application determines no editing conflicts exist (see first determination module 510 of FIG. 5) and no new updates are available (see second determination module 520 of FIG. 5), the authoring application sends an update from the user copy to the master copy (see store operation 522 of FIG. 5) to complete synchronization of the user and master copies. For example, in one embodiment, the authoring application may send the user copy in its entirety to a storage device with instructions to overwrite the master copy. In another embodiment, the authoring application may send an incremental update indicating how the user copy differs from the master copy.

The authoring application alerts the first user when the authoring application successfully uploads the update to the master copy (see indicate operation 524 of FIG. 5). For example, in FIG. 22, the status bar 2018 has been updated to indicate the update was successfully transmitted. In some embodiments, the authoring application also may display an alert window 2060 indicating the success of the upload. In one embodiment, the alert window 2060 may provide further explanation, e.g., indicating consequences of the upload. In the example shown in FIG. 22, the summary window 2030 is removed from the user interface since no editing conflicts are identified. In other embodiments, however, the summary window 2030 may remain until toggled by the first user.

Figure 23:
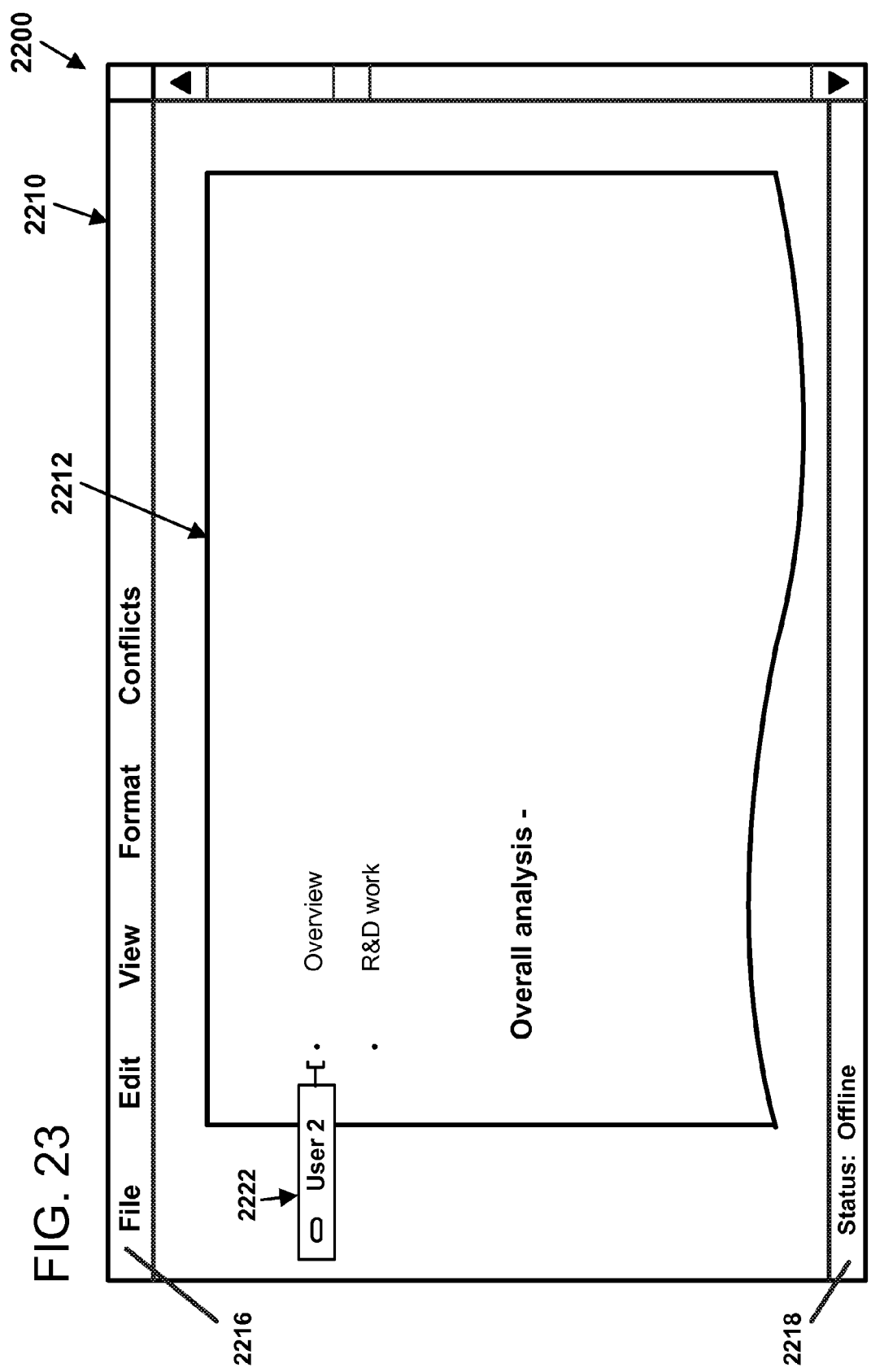
FIGS. 23-29 illustrate changes to an example user interface displayed by an authoring application as a first user is editing a user copy of a data file offline in accordance with the principles of the disclosure.

The second example application, in which the first user is editing a data file offline, is provided in FIGS. 23-29. In FIG. 23, a user interface 2200 of an authoring application includes a display window 2210 including an editing area 2212 displaying content of the user copy of the data file, a command toolbar 2216 providing command options, and a status bar 2218 indicating a status of the user copy of the data file. For example, the user interface 2200 may be the same as user interface 2000 of FIG. 15.

In the example shown, the status bar 2218 indicates the first user is editing a user copy of a data file offline (i.e., is not communicatively connected to a storage device storing a master copy of the data file). Another user has a lock 2222 on the first data unit within the editing area 2212. Accordingly, the authoring application inhibits the first user from editing the first data unit.

Figure 24:
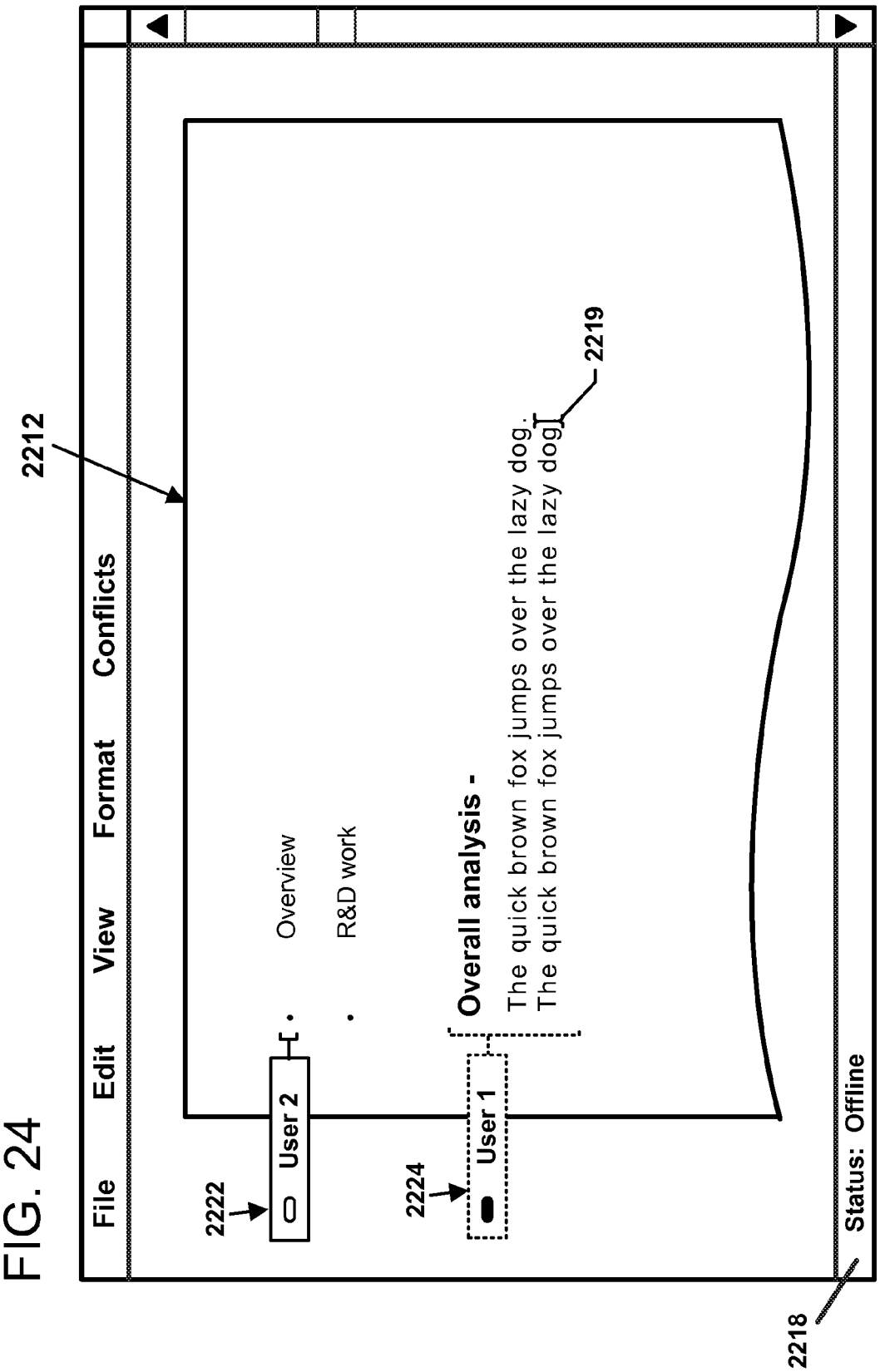

The authoring application enables editing of the user copy of the data file, for example, using the example authoring process 300 of FIG. 3. In the example shown, the authoring application enables the first user to edit the user copy of the data file freely (see edit operation 304 of FIG. 3) within the editing area 2012 of the display window 2010. FIG. 24 illustrates editing changes made by the first user to the user copy of the data file. In particular, the first user has added two sentences to the third data unit. In other embodiments, however, the first user may have added, revised, and/or deleted any content or metadata within the user copy of the data file.

Because the first user is editing the user copy offline, the authoring application cannot synchronize a lock request for the third data unit. In one embodiment, the authoring application stores the lock request until the user logs online. In such an embodiment, the authoring application may display a lock 2224 around the third data unit. In another embodiment, the authoring application does not attempt to lock the third data unit. In one embodiment, the authoring application alerts the first user that a lock request cannot be synchronized and, accordingly, that editing the data unit may result in editing conflicts. For the purposes of this example application, the authoring application stores the lock request for later synchronization with the master copy.

Figure 25:
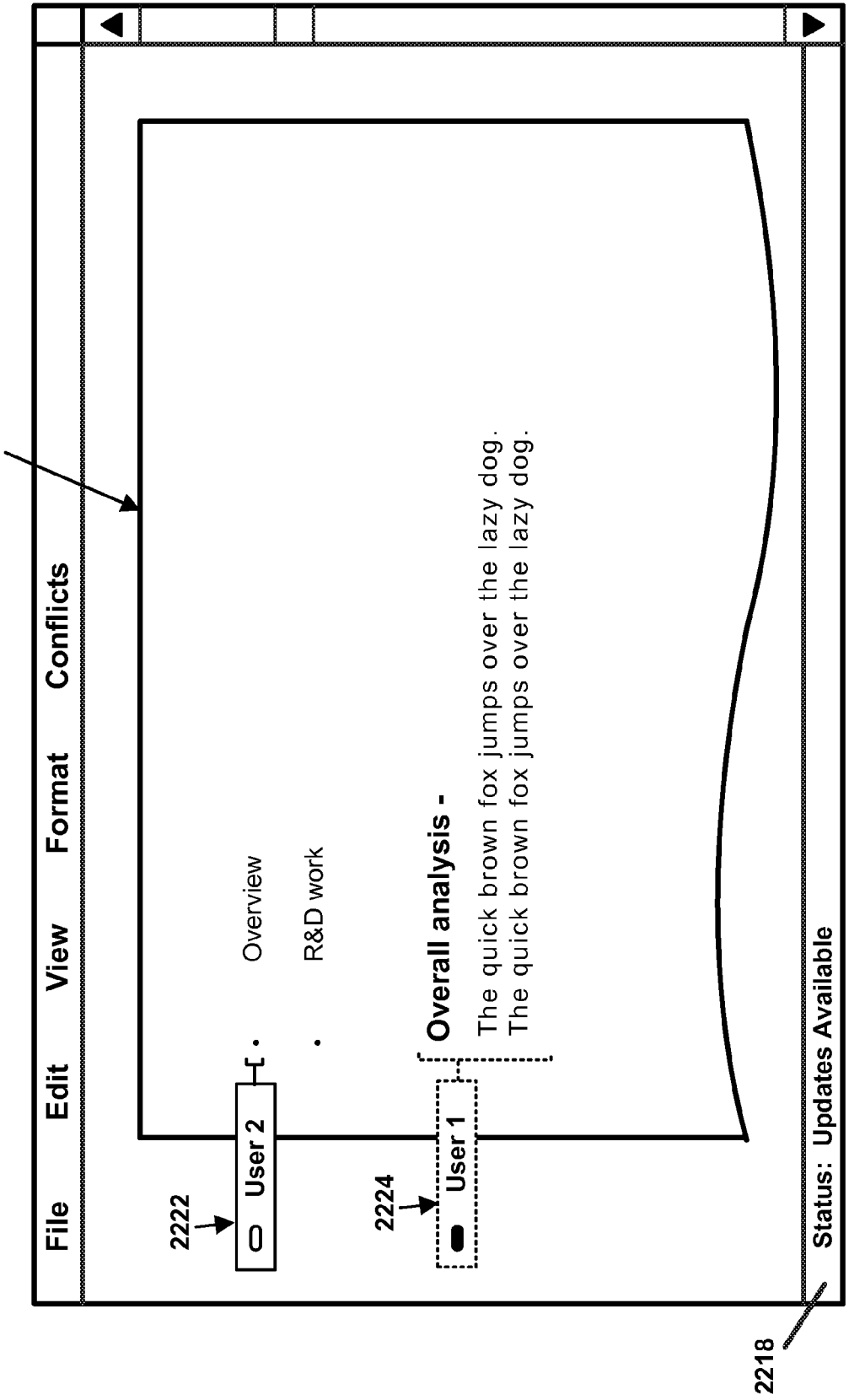

In FIG. 25, the authoring application obtains updates indicating intervening changes made to the master copy of the data file (see receive operation 306 of FIG. 3). In one embodiment, the authoring application receives the update after a predetermined interval of time elapses. In another embodiment, the authoring application receives the update in response to a request to synchronize the user copy with the master copy. For the purposes of this example application, the authoring application is assumed to have received the update automatically after a predetermined time interval. The status bar 2218 of the display window 2210 has been updated in FIG. 25 to indicate an update has been received.

When the authoring application receives the update, the authoring application determines whether any editing conflicts exist between the user copy and the received update. If no editing conflicts exist, then the authoring application instantiates the metadata updates automatically (see update operation 308 of FIG. 3). For the purposes of this example application, the authoring application is assumed to have received a content update indicating changes made to the third data unit, which conflicts with the first user's lock request for the third data unit. However, the update does not indicate a lock around the third data unit (e.g., the other user may have locked the third data unit when making the edit and subsequently released the lock). Accordingly, the authoring application does not provide the first user with an instantiation interface or otherwise inhibits instantiation of the update.

Figure 26:
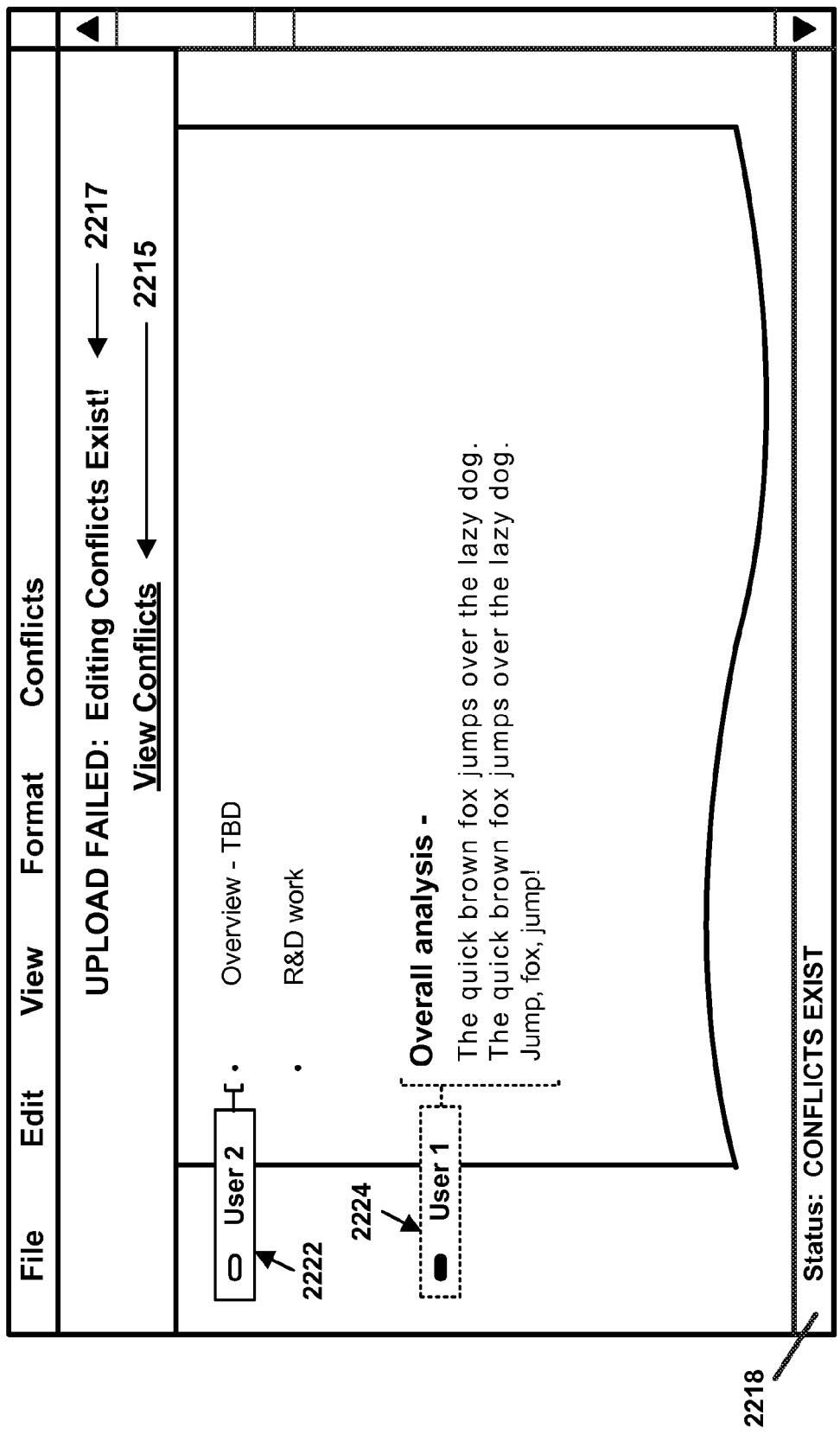
Figure 27:
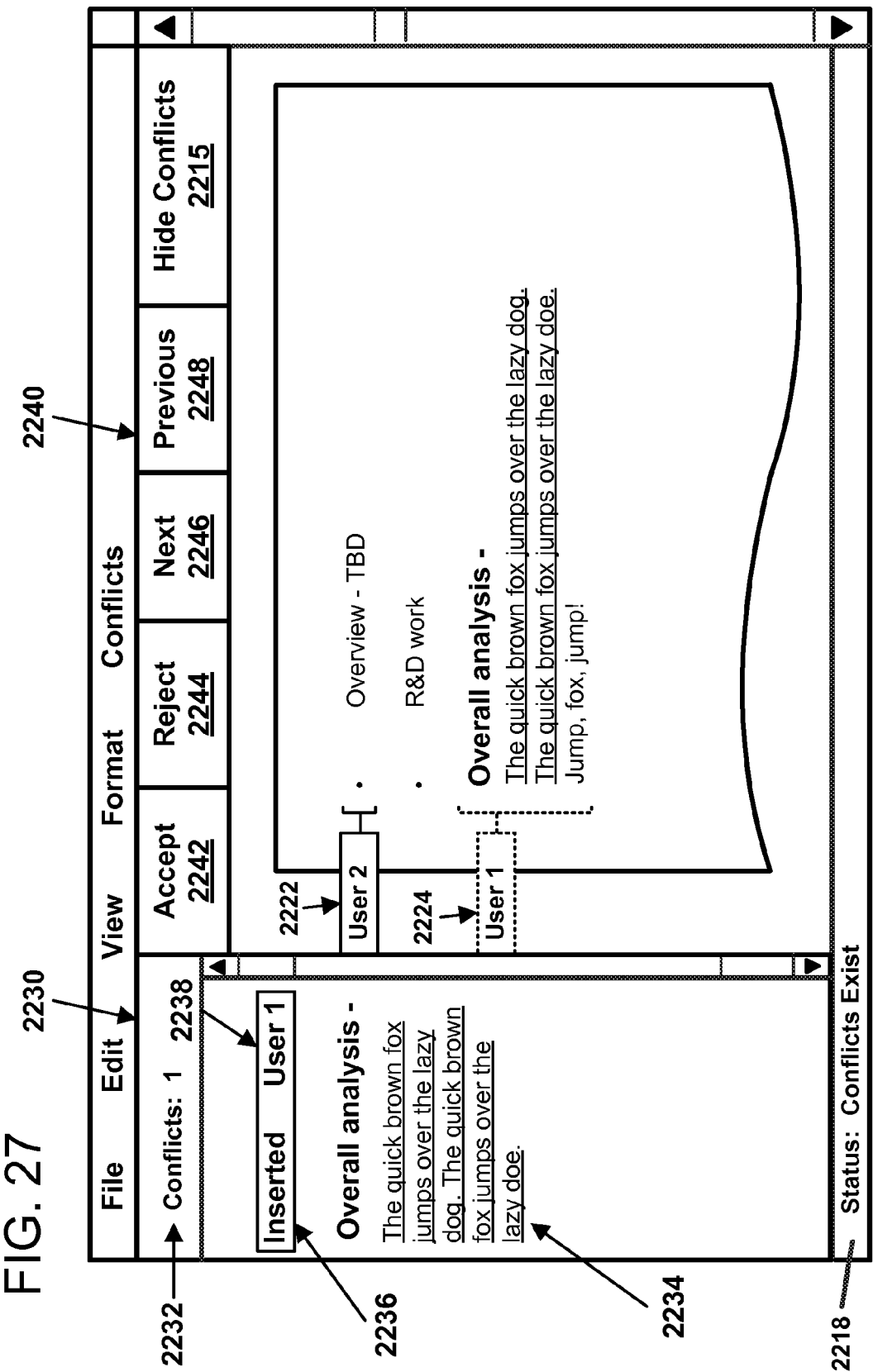

In FIG. 26, the first user connects to the storage device (i.e., logs online) and instructs the authoring application to attempt to synchronize the user copy of the data file with the master copy (see synchronize operation 310 of FIG. 3). In one embodiment, the authoring application implements the synchronize process 500 shown in FIG. 5. The authoring application obtains an updates from the master copy if appropriate (see obtain operation 504) and determines whether any editing conflicts result from the update (see identify operation 506). In the example shown, the authoring application does not obtain any new updates (e.g., no intervening changes have been made to the master copy since the last update). The authoring application determines that intervening changes represented by the previously received update (e.g., the added content to the third data unit) conflict with user changes (e.g., the lock request for the third data unit).

The authoring application then merges the user copy of the data file with the master copy of the data file (see merge operations 508 of FIG. 5) and displays the merged copy of the data file to the first user. In the example shown, the authoring application displays the merged version of the data file in the editing area 2212 in FIG. 26. As noted above, the authoring application may integrate the user and master copies using any desired merge technique. In the example shown, the authoring application has added new content from the master copy to the first and third data units of the user copy.

The first set of new content, "TBD," which was added to the first data unit, does not result in an editing conflict. The first user did not edit the first data unit. The second set of new content, "Jump, fox, jump!", which was added to the third data unit, results in an editing conflict since the first user attempted to lock the third data unit. The other user was able to edit the third data unit since the first user's lock request has not yet been synchronized with the master copy prior to the edit. However, since the update does not indicate the third data unit is locked by another user, the first user's lock is maintained around the third data unit.

Because the authoring application has identified an editing conflict, the authoring application does not continue to save to the master copy (see first determination module 510 of FIG. 5). Rather, the authoring application displays one or more alert messages to notify the first user of the existence of the editing conflicts (see alert operation 512 of FIG. 5). For example, in FIG. 26, an alert 2217 is displayed in the display window 2210 to inform the first user of the presence of editing conflicts. In the example shown, the status bar 2218 also has been updated to indicate the presence of editing conflicts. In other embodiments, the status bar 2218 may be updated to indicate a number of updates that have not yet been instantiated, a number of editing conflicts identified, or other such information. In still other embodiments, other types of alerts or indicia may provide notice of the existence of editing conflicts to the first user.

The authoring application also presents a toggle interface 2215 to the first user in FIG. 26 to enable the user to choose between continuing to edit the data file without viewing the editing conflicts and reviewing the editing conflicts (see second determination module 514 of FIG. 5). The first user may choose to continue editing the data file without reviewing the editing conflicts (see continue operation 516 of FIG. 5). The first user also may choose to select the toggle interface 2215 (FIG. 26) to reveal the editing conflicts (see review operation 518 of FIG. 5). In one embodiment, selection of the toggle interface 2215 also activates a summary window 2230 (see FIG. 27). The first user may continue to edit the merged version of the data file regardless of whether or not the first user chooses to view the editing conflicts.

One example process by which the authoring application may implement the review operation 518 of FIG. 5 includes the review process 700 of FIG. 7. When the user selects the toggle interface 2215, the authoring application presents the editing conflicts to the user (see display operation 704 of FIG. 7). For example, in one embodiment, selecting the toggle interface 2215 splits the display window 2210 between the editing area 2212 and a summary window 2230 in which the editing conflicts are listed (see list 2234) and summary information about the conflicts may be displayed (see summary area 2232).

In general, the editing area 2212 displays the merged version of the data file and enables the user to freely edit the merged version. In some embodiments, the merged version of the data file displayed in the editing area 2212 is annotated to indicate which portions of content are in conflict. For example, in one embodiment, the merged version of the data file is annotated to indicate whether the conflicting content resulted from insertions (e.g., via underlining or other formatting, font color, highlighting, opacity, or other such indicia) or deletions (e.g., via strikethroughs or other formatting, font color, highlighting, opacity, or other such indicia).

In the example shown, the first data unit does not contain any editing conflicts since the first data unit is locked on the server to the second user. Accordingly, the first data unit is not annotated. The second data unit also does not contain any editing conflicts so the second data unit is not annotated. Some content within the third data unit, which is shown as locked to the first user, is underlined to indicate the content has been inserted into the data unit.

In one embodiment, only conflicting content originating from the user copy is annotated. Advantageously, only annotating user created conflicts allows the user to understand the state of the master copy of the data file and differences between the master copy and the user copy. In other embodiments, however, conflicting content originating from the master copy may be annotated as well as or in place of the conflicting content from the user copy.

The conflicting editing operations also are displayed by the summary window 2230. The summary area 2232 of the resolution interface indicates the number of conflicting editing operations contained within the merged version of the data file. In the example shown, the summary area 2232 indicates one conflicting editing operation has been identified. The listing 2234 of the summary window 2230 displays the conflicting content. In one embodiment, the listing 2234 displays the conflicting content separate from the non-conflicting content. In another embodiment, the listing 2234 annotates the conflicting content to indicate whether the content as inserted and/or deleted (e.g., see indicia 2236 of FIG. 27). In another embodiment, the listing 2234 annotates the conflicting content to indicate the origin (e.g., user copy or master copy) of the conflicting content (e.g., see indicia 2238 of FIG. 27).

The first user of the authoring application may interact with a resolution interface (e.g., see resolution interface 2240 of FIG. 27) to provide instructions (see obtain operation 706 of FIG. 7) either to return to editing the data file or to resolve any of the editing conflicts displayed (see first determination module 708 of FIG. 7). For example, in one embodiment, the user may select the toggle interface 2215 again to hide the editing conflicts as discussed above.

Alternatively, the first user may provide instructions to accept or reject conflicting content or portions thereof. In one embodiment, the first user may select content displayed within the editing area 2012 of the display window 2010 and may select an option on a resolution interface 2240 to provide instructions to resolve the editing operation. For example, the first user may select the content on which instructions are to be provided and may select an accept button 2242 or a reject button 2244 from an example resolution interface 2040 (see FIG. 27). The example resolution interface 2040 also may include a next button 2246 and a previous button 2248 for sequencing among conflicts. In other embodiments, the first user may provide the resolution instruction using another type of resolution interface tool.

Figure 28:
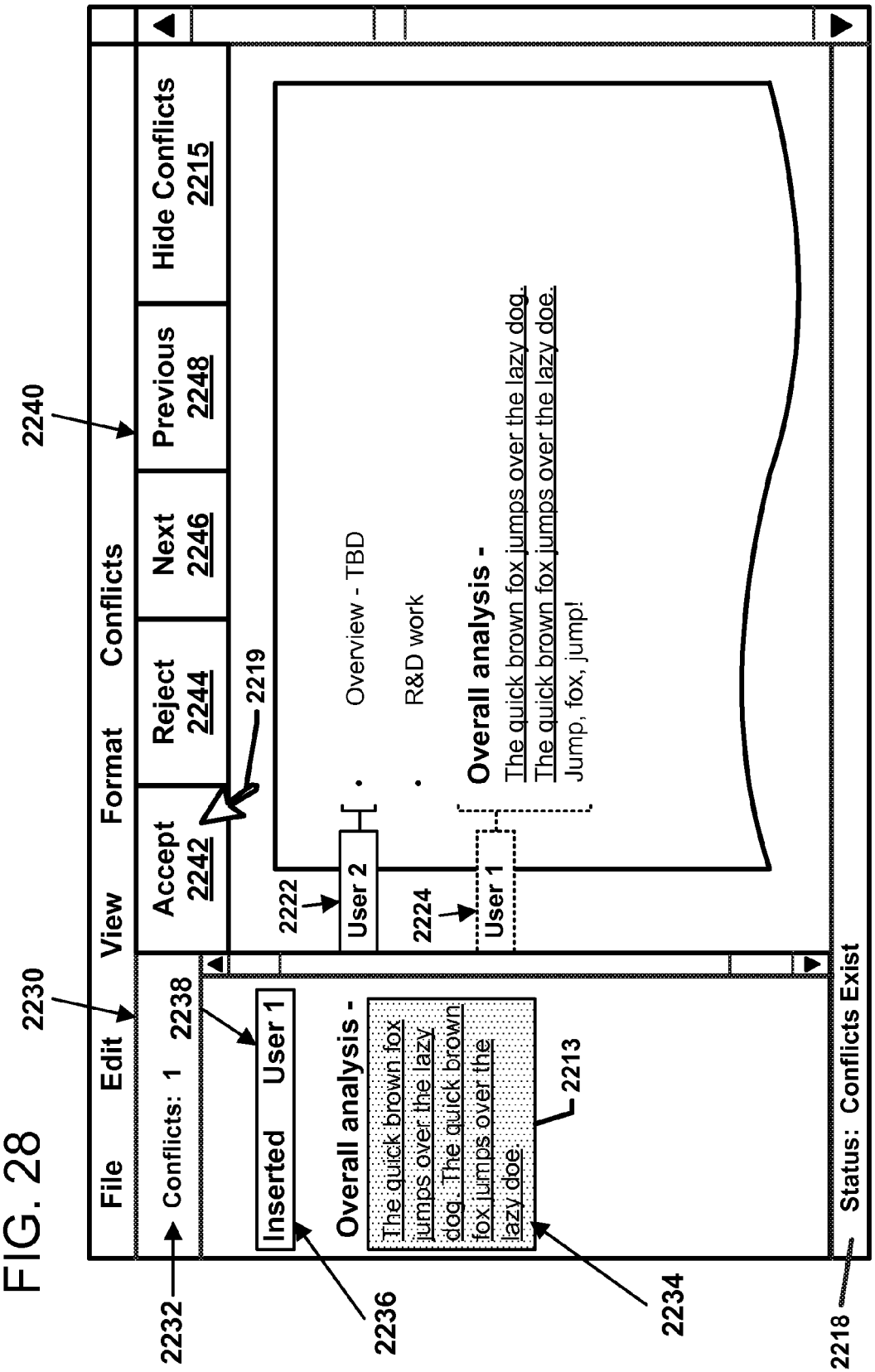
Figure 29:
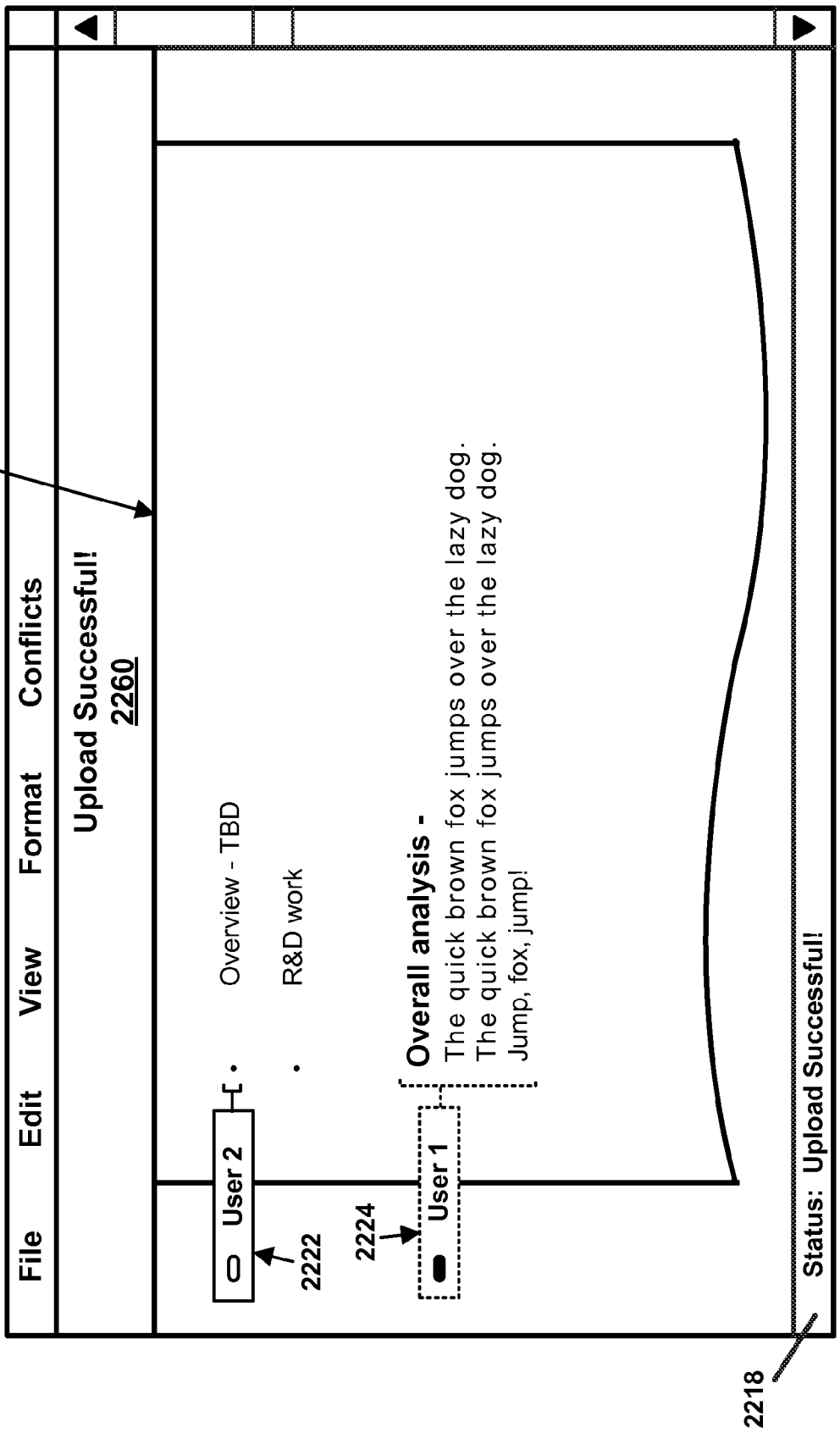

In the example shown in FIG. 28, the first user selects a first portion of the conflicting content (see selection indicia 2213 in the summary window 2230) and selects an accept button 2242 on the resolution interface 2040 via a cursor 2219. In other embodiments, however, the first user may have provided the instruction via any desired resolution interface. Accordingly, the authoring application determines the user has not provided instructions to return to editing (see first determination module 708 of FIG. 7) and performs the resolution instruction (see implement operation 710 of FIG. 7).

One example process by which the authoring application may accept the selected conflicting content includes the accept process 1100 of FIG. 13. The authoring application removes any annotations from the selected conflicting content (see clean operation 1104 of FIG. 13). The authoring application determines the selected conflicting content was inserted into the data file (see determination module 1106 of FIG. 13). Accordingly, the accept process 1100 completes and ends (see stop module 1110 of FIG. 13). If the authoring application had determined the conflicting content was deleted from the data file, then the authoring application would have deleted the conflicting content from the data file (see remove operation 1108 of FIG. 13).

Returning to the review process 700 of FIG. 7, the authoring application determines no more editing conflicts remain unresolved (see second determination module 712 of FIG. 7). Accordingly, the review process 700 completes and ends (see stop module 714 of FIG. 7), thereby completing the review operation 514 of the synchronize process 500 of FIG. 5. The synchronize process 500 proceeds back to the first determination module 510 (FIG. 5) at which the authoring application determines no editing conflicts remain unresolved. The authoring application also determines no additional updates are available from the master copy (see the second determination module 520 of FIG. 5) and, accordingly, sends an update from the user copy to the master copy (see store operation 522 of FIG. 5) to complete synchronization of the user and master copies.

The authoring application alerts the first user when the authoring application successfully uploads the update to the master copy (see indicate operation 524 of FIG. 5). For example, in FIG. 29, the status bar 2218 has been updated to indicate the update was successfully transmitted. In some embodiments, the authoring application also may display an alert window 2260 indicating the success of the upload. In one embodiment, the alert window 2260 may provide further explanation, e.g., indicating consequences of the successful upload. In the example shown in FIG. 29, the summary window 2230 is removed from the user interface 2200 since no identified editing conflicts remain unresolved. In other embodiments, however, the summary window 2230 may remain until deactivated by the first user (e.g., via toggle interface 2215 of FIGS. 27 and 28).

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

What is claimed is:

1. A method of collaboratively authoring a data file, comprising:
    displaying the data file in an authoring window within a user interface;
    presenting to a user an interface enabling selection between displaying an editing conflict and hiding the editing conflict;
    in response to receiving a selection to display an editing conflict, displaying the authoring window and a conflict summary window within the user interface, the conflict summary window including a listing of unresolved editing conflicts and identifying a type of editing operation for each of the unresolved editing conflicts, wherein the type of editing operation identifies whether an edit was inserted, deleted or revised;
    in response to receiving a selection of one of the unresolved editing conflicts, displaying an accept control and a reject control; and
    allowing the user to select the accept control, resulting in accepting the editing conflict, or the reject control, resulting in rejecting the editing conflict.

2. The method of claim 1, further comprising displaying the editing conflict within context of non-conflicting content.

3. The method of claim 2, further comprising identifying the editing conflict to distinguish the editing conflict from the non-conflicting content.

4. The method of claim 3, further comprising displaying an origin of the editing conflict.

5. The method of claim 3, wherein hiding the editing conflict comprises removing identification of the editing conflict.

6. The method of claim 1, further comprising visually alerting the user when the editing conflict is identified.

7. The method of claim 1, further comprising allowing the user to toggle between displaying the editing conflict and hiding the editing conflict.

8. A computer readable storage hardware device, not including a propagating signal, storing executable instructions, which perform a method of resolving editing conflicts in a data file, the method comprising:
    displaying the data file in an authoring window within a user interface;
    presenting to a user an interface enabling selection between displaying an editing conflict and hiding the editing conflict;
    in response to receiving a selection to display an editing conflict, displaying the authoring window and a conflict summary window within the user interface, the conflict summary window including a listing of unresolved editing conflicts and identifying a type of editing operation for each of the unresolved editing conflicts, wherein the type of editing operation identifies whether an edit was inserted, deleted or revised;
    in response to receiving a selection of one of the unresolved editing conflicts, displaying an accept control; and
    allowing the user to select the accept control, resulting in accepting the editing conflict.

9. The computer readable storage device of claim 8, further comprising displaying the editing conflict within context of non-conflicting content.

10. The computer readable storage device of claim 9, further comprising identifying the editing conflict to distinguish the editing conflict from the non-conflicting content.

11. The computer readable storage device of claim 10, further comprising displaying an origin of the editing conflict.

12. The computer readable storage device of claim 10, wherein hiding the editing conflict comprises removing identification of the editing conflict.

13. The computer readable storage device of claim 8, further comprising visually alerting the user when the editing conflict is identified.

14. The computer readable storage device of claim 8, further comprising allowing the user to toggle between displaying the editing conflict and hiding the editing conflict.

15. A system for collaboratively editing a data file, the system comprising:
    a computer processing unit; and
    a memory encoding instructions that, when executed by the processing unit, cause the processing unit to:
        display the data file in an authoring window within a user interface;
        present to a user an interface enabling selection between displaying an editing conflict and hiding the editing conflict;
        in response to receiving a selection to display an editing conflict, displaying the authoring window and a conflict summary window within the user interface, the conflict summary window including a listing of unresolved editing conflicts and identifying a type of editing operation for each of the unresolved editing conflicts, wherein the type of editing operation identifies whether an edit was inserted, deleted or revised;
        in response to receiving a selection of one of the unresolved editing conflicts, display a reject control; and
        allow the user to select the reject control, resulting in rejecting the editing conflict.

16. The system of claim 15, wherein the processing unit is further caused to display the editing conflict within context of non-conflicting content.

17. The computer readable storage medium of claim 16, wherein the processing unit is further caused to identify the editing conflict to distinguish the editing conflict from the non-conflicting content.

18. The computer readable storage medium of claim 17, wherein the processing unit is further caused to display an origin of the editing conflict.

19. The computer readable storage medium of claim 15, wherein the processing unit is further caused to visually alert the user when the editing conflict is identified.

20. The computer readable storage medium of claim 15, wherein the type of editing operation is associated with one or more indicia including a predetermined color, a strikethrough, underlining, a predetermined opacity, or highlighting.

* * * * *